US005764030A

United States Patent [19]

Gaza

[11] Patent Number: 5,764,030

[45] Date of Patent: Jun. 9, 1998

[54] MICROCONTROLLED BATTERY CHARGER

[75] Inventor: Brian Scott Gaza, Naperville, Ill.

[73] Assignee: International Components Corporation, Chicago, Ill.

[21] Appl. No.: 818,313

[22] Filed: Mar. 14, 1997

[51] Int. Cl.[6] .................. H01M 10/46

[52] U.S. Cl. .................. 320/116; 320/120; 320/145

[58] Field of Search .................. 320/15, 21, 22, 320/23, 30, 31, 49, 116, 120, 124, 139, 145, 114, 121, 122, 129, 130, 148

[56] References Cited

U.S. PATENT DOCUMENTS

| | | | |
|---|---|---|---|
| 4,006,396 | 2/1977 | Bogut . | |
| 4,472,672 | 9/1984 | Pacholok | 320/21 |
| 4,670,703 | 6/1987 | Williams . | |
| 4,673,861 | 6/1987 | Dubovsky et al. . | |
| 4,684,870 | 8/1987 | George et al. . | |
| 4,686,444 | 8/1987 | Park . | |
| 4,727,306 | 2/1988 | Misak et al. . | |
| 4,742,290 | 5/1988 | Sutphin et al. . | |
| 4,755,733 | 7/1988 | Laliberte . | |
| 4,766,361 | 8/1988 | Pusateri . | |
| 4,792,743 | 12/1988 | Tsujino et al. . | |
| 4,816,735 | 3/1989 | Cook et al. . | |
| 4,849,682 | 7/1989 | Bauer et al. . | |
| 5,028,859 | 7/1991 | Johnson et al. | 320/15 |
| 5,166,596 | 11/1992 | Goedken | 320/35 |
| 5,315,228 | 5/1994 | Hess et al. | 320/31 |
| 5,442,274 | 8/1995 | Tamai | 320/23 |
| 5,481,730 | 1/1996 | Brown et al. | 395/750 |
| 5,576,609 | 11/1996 | Brown et al. | 320/30 |
| 5,666,006 | 9/1997 | Townsley et al. | 307/66 |

FOREIGN PATENT DOCUMENTS 2 399 150 2/1979 France .

OTHER PUBLICATIONS

Jasinski, "Chargers for Batteries with Auxiliary Cells," Motorola Technical Developments, vol. 8, Oct., 1988, pp. 107–108.

Radio Shack, 1988 Catalog No. 419, p. 150.

Duracell, Inc., Intel Corporation, Product Literature entitled, "Smart Battery Specifications", 1993, 94.

Gates Energy Products Inc., Product Literature entitled, Sealed Rechargeable Batteries –Application Manual, 1989.

Sanyo, Product Literature entitled, Sanyo Smart Chip–Model S1-101 Hybrid IC Fast Charge Control Unit.

*Primary Examiner*—Edward Tso
*Attorney, Agent, or Firm*—Fitch, Even, Tabin & Flannery

[57] ABSTRACT

A battery charger for use with different types of batteries, such as batteries requiring constant current charging, such as nickel cadmium (NiCd) and nickel metal hydride (NiMH) batteries, as well as batteries which not only require constant current charging, but also require constant voltage charging, such as lithium ion batteries. The battery charger includes a pulse width modulator circuit for controlling a power transistor to provide a constant current or a constant voltage output as a function of the battery characteristics. The battery charger may include dual pockets for charging two modular batteries on a time division multiplex basis. In the dual pocket application, power is divided between the two pockets as a function of the charging characteristics of the battery and the power dissipation of the power transistors used for supplying charging current to the pockets.

18 Claims, 28 Drawing Sheets

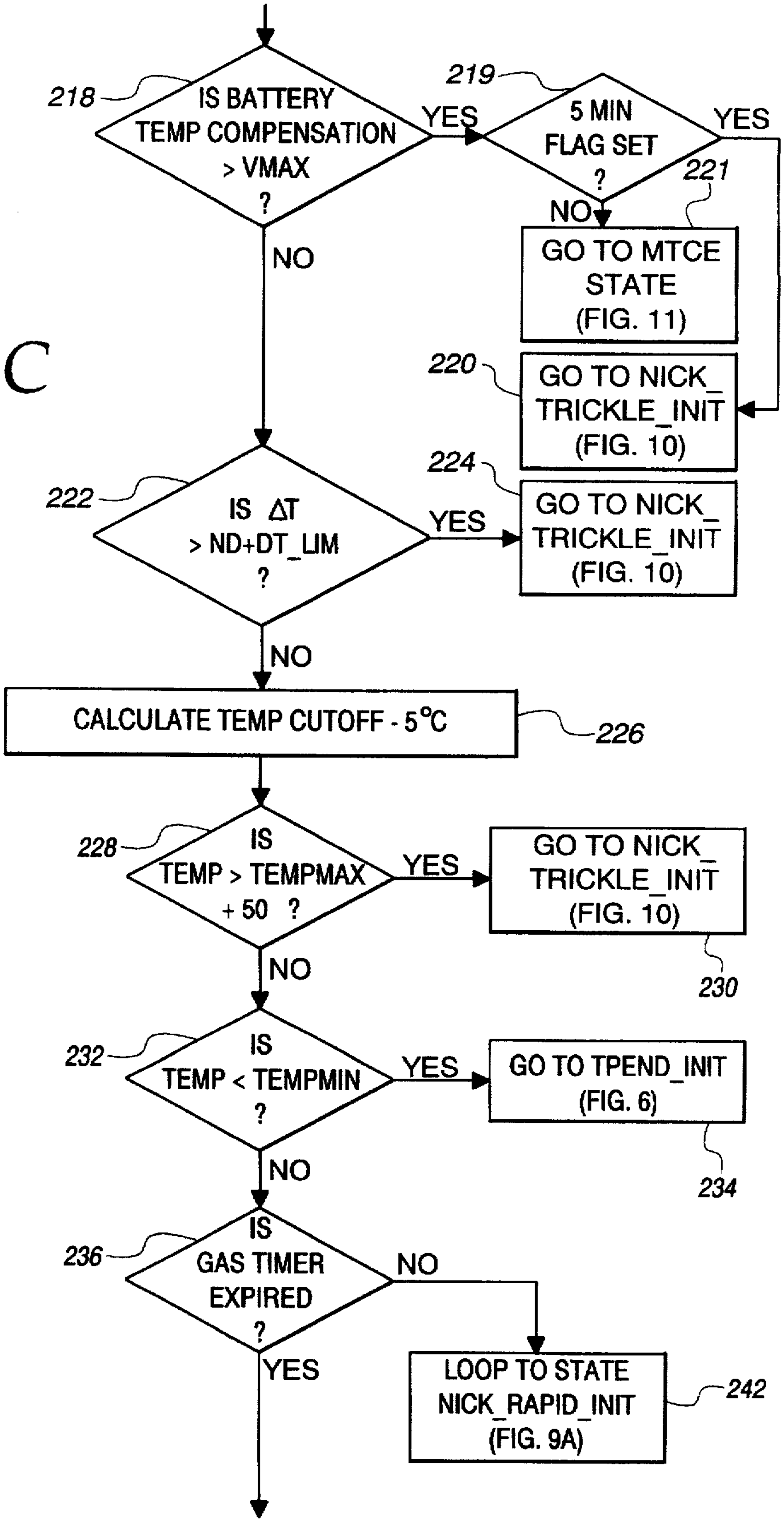
*Fig. 9C*
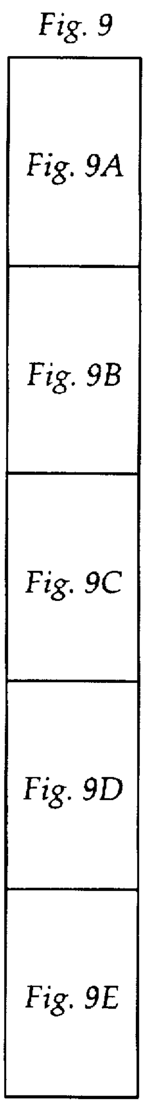

MICROCONTROLLED BATTERY CHARGER

BACKGROUND OF THE INVENTION

1. Field of the Invention

The present invention relates to a battery charger and, more particularly, to a battery charger for providing both constant current and constant voltage outputs suitable for charging batteries requiring constant current charging, such as nickel—cadmium (NiCd) and nickel metal hydride (NiMH), as well as batteries requiring both constant current and constant voltage charging, such as lithium ion batteries. The battery charger includes a pulse width modulator (PWM) for controlling a power transistor to provide a constant current or a constant voltage output to the battery being charged as a function of the battery characteristics. The battery charger may include dual pockets for charging two modular batteries at a time. In the dual pocket application, charging is divided between the two pockets on a time slice basis. In such a configuration, the power dissipation of the power supply and the power transistors used for supplying charging current to the pockets is monitored and controlled.

2. Description of the Prior Art

Various portable devices and appliances, such as cellular phones, require rechargeable batteries. Various types of rechargeable batteries are known to be used in such applications. For example, nickel—cadmium (NiCd), nickel metal hydride (NiMH), as well as lithium ion batteries are known to be used. Because of the different charging characteristics of such batteries, different battery chargers are required. For example, both nickel—cadmium (NiCd), as well as nickel metal hydride (NiMH), require constant current charging. On the other hand, lithium ion batteries require constant current charging up to a certain voltage value and constant voltage charging thereafter. Because of the different charging requirements, different charging circuits are often required.

Standard battery packs normally consist of one or more battery cells disposed in a modular housing with external contacts for easy and convenient coupling with the portable device in which it is used. Smart battery packs, in addition to the battery cells, normally include a memory storage device which contains information regarding the characteristics of the battery as well as the battery type. Some smart battery packs are known to include a microcontroller which allows communication by way of a bi-directional communication line with the battery charger regarding various battery characteristics. Examples of such smart battery packs are disclosed in: "Smart Battery Specifications", ®1993 Duracell Inc., Intel Corporation, hereby incorporated by reference. Because of the differences between the standard battery packs and the smart battery packs, different chargers are used for the smart battery packs and the standard battery packs.

Battery chargers for charging batteries which require constant current charging and batteries which require constant current and constant voltage charging, such as lithium batteries, are known in the art. Battery chargers are also known that are adapted to automatically sense the type of battery connected to the battery charger and provide the appropriate charging characteristic. As mentioned above, such battery chargers are used for various portable devices, such as cellular phones. Cellular phone battery chargers are commonly available as single pocket and dual pocket devices. Dual pocket devices are known to be used for charging a spare battery, as well as the battery connected to the cellular phone. Unfortunately, with known dual pocket battery chargers, each pocket is known to be treated independently. In particular, in situations in which batteries to be charged are disposed in both pockets, the battery in the active pocket is normally fully charged before any servicing of the battery in the other pocket is done. Lithium ion batteries are known to take 3–4 hours to charge. Should a second battery be placed in the inactive pocket while a lithium battery is being charged in an active pocket, the second battery could remain in the inactive pocket for 3–4 hours before charging is even commenced. If the second battery also happens to be a lithium battery, it could take from 6–8 hours for the second battery to be charged from the time the second battery is inserted in the inactive pocket. Unfortunately, the end user will normally not be aware of such a limitation in the charging system.

SUMMARY OF THE INVENTION

It is an object of the present invention to provide a battery charger that solves various problems in the prior art.

It is yet another object of the present invention to provide a battery charger that is adapted for use with various types of batteries, such as nickel cadmium (NiCd), nickel metal hydride (NiMH), as well as lithium ion.

It is yet another object of the present invention to provide a battery charger having a relatively simple circuit for providing constant current and/or constant voltage charging.

It is yet another object of the present invention to provide a dual pocket battery charger which alternatively charges batteries in the two pockets on a time slice basis.

It is yet another object of the present invention to provide a dual pocket battery charger in which the charging is controlled as a function of the power dissipation.

Briefly, the present invention relates to a battery charger that can be used with different types of batteries, such as batteries requiring constant current charging, such as nickel cadmium (NiCd) and nickel metal hydride (NiMH) batteries, as well as batteries which not only require constant current charging, but also require constant voltage charging, such as lithium ion batteries. The battery charger includes a pulse width modulator (PWM) for controlling a power transistor to provide a constant current or a constant voltage output as a function of the battery characteristics. The battery charger may include dual pockets for charging two modular batteries at a time. In the dual pocket application, charging is divided between the two pockets on a time division multiplex basis as a function of the charging characteristics of the battery and the power dissipation of the power supply and the power transistors used for supplying charging current to the pockets.

BRIEF DESCRIPTION OF THE DRAWING

These and other objects of the present invention will be readily understood with reference to the following specification and attached drawing, wherein.

DETAILED DESCRIPTION OF THE INVENTION

Figure 1:
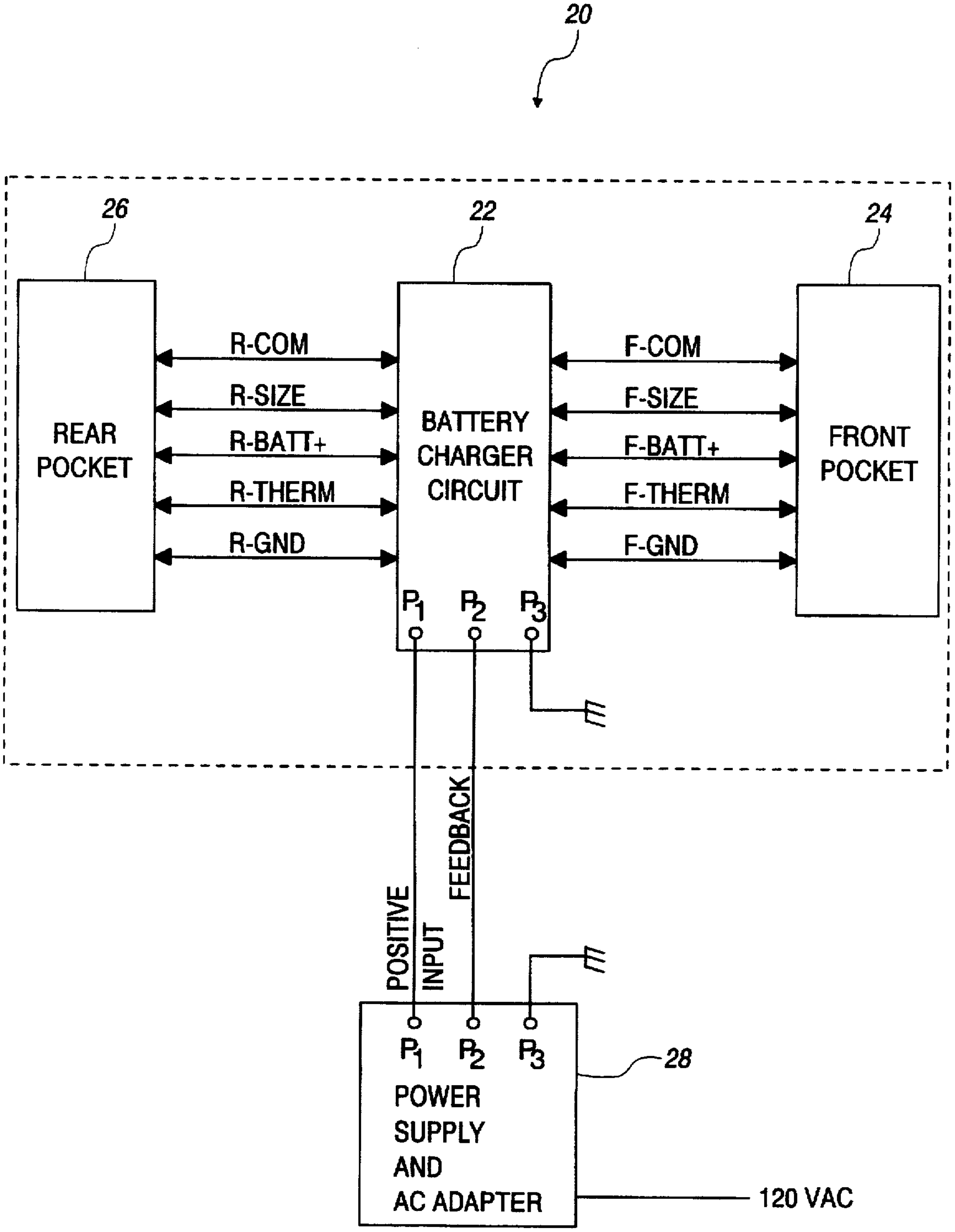
FIG. 1 is a block diagram of the battery charger in accordance with the present invention.

The battery charger in accordance with the present invention is generally identified with the reference numeral 20 and includes a battery charger circuit 22. As shown and illustrated herein, the battery charger 20 includes dual pockets, a front pocket 24 and a rear pocket 26.

An important aspect of the invention is that the battery charger is adapted to charge batteries in both pockets 24, 26 on a time division multiplex basis without waiting for the battery in one pocket to be fully charged. In particular, each pocket 24, 26 is alternatively serviced for a time slice, i.e., 62.5 microseconds. During servicing of the two pockets 24, 26, power dissipation measurements for the power supply 28 and the power transistors $Q_1$ and $Q_4$ (discussed below) are made every interrupt cycle, i.e., 244 µsec. Should the power dissipation of either the power supply or the power transistors $Q_1$ and $Q_4$ exceed acceptable levels, the charging current is controlled to cause the power dissipation to be within acceptable limits, as discussed in detail below.

As used herein, the "F" and "R" prefixes in the signal names refer to the front and rear pockets 24 and 26, respectively. The signals −BATT+ and −GND are used to provide the charging to any modular battery packs installed in the front pocket 24 or rear pocket 26. The battery voltage VBATT of the battery installed in the front and rear pockets 24, 26 is read by way of the −BATT+ signal. Certain batteries require that the rate of change of temperature over time of the battery be maintained within a certain range. Such battery packs are normally provided with a thermistor for the purpose of reading the temperature of the battery pack. As such, both the front pocket 24 and rear pocket 26 are provided with a −THERM signal for reading the thermistor value of the battery packs with integral thermistors. The −COMM and −SIZE signals, provided between the battery charger circuit 22 and the front and rear pockets 24, 26, are used with certain battery packs which provide a signal indicating the size of the battery or with other battery packs that enable bi-directional communication between the battery pack and the battery charger. As will be discussed in more detail below, the battery charger circuit 22 reads the −SIZE and −COMM signals to determine the size and/or type of battery in the front and rear pockets 24 and 26. Normally, only one of these signals, −SIZE or −COMM is provided with a particular battery pack. The −SIZE signal merely identifies the size of the battery to the battery charger circuit 22. The −COMM signal is normally used with battery packs which include an internal memory storage device, such as an electrically erasable programmable read only memory (EEPROM). Such integral EEPROMs are known to be provided with lithium ion modular battery packs which provide various information, including information that the battery is a lithium ion battery.

POWER SUPPLY AND AC ADAPTER

As mentioned above, the battery charger circuit 22 is adapted to be utilized with a power supply 28, for example, a switching or linear power supply, and an AC adapter 28. For example, the AC adapter may include a step-down transformer T, (FIG. 2) with its primary winding adapted to be connected to a 120/240 VAC voltage supply. A conventional rectifier RECT, for example, a full-wave bridge rectifier circuit, electrically coupled to the secondary winding of the transformer $T_1$, converts the unregulated AC voltage at the transformer secondary winding to an unregulated DC voltage. The unregulated DC voltage is input to a DC—DC converter circuit as described and illustrated below. Various types of DC—DC converter circuits are suitable for use with the battery charger 20 in accordance with the invention.

As shown in FIG. 1, the power supply 28 includes three terminals; $P_1$, $P_2$ and $P_3$. The $P_1$ terminal is used for charging batteries in the front and rear pockets 24 and 26 while the $P_3$ terminal is used for system ground. The $P_2$ terminal is used for monitoring the battery voltage of the batteries installed in the front and rear pockets 24 and 26, respectively. If batteries are installed in both the front and rear pockets 24 and 26, respectively, the battery with the highest voltage will control the operation of the power supply 28. In particular, the battery voltage for the front and rear pockets 24 and 26 is diode ORed by way of the diodes $D_1$ and $D_2$ to the $P_2$ terminal. Thus, the battery with the largest voltage will control the power supply.

Figure 2A:
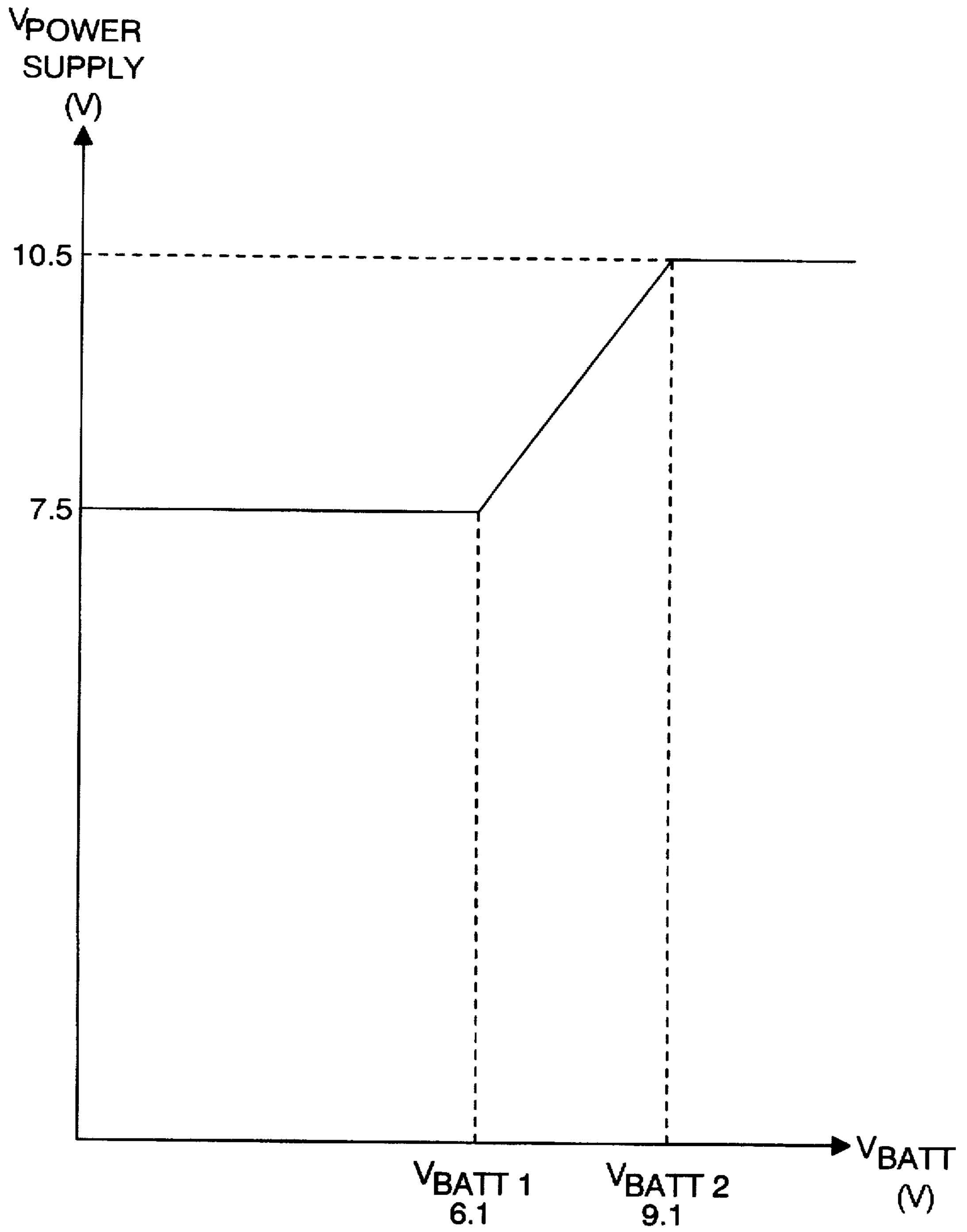
FIG. 2 is a schematic diagram of a power supply and AC adapter for use with the present invention.
Figure 2B:
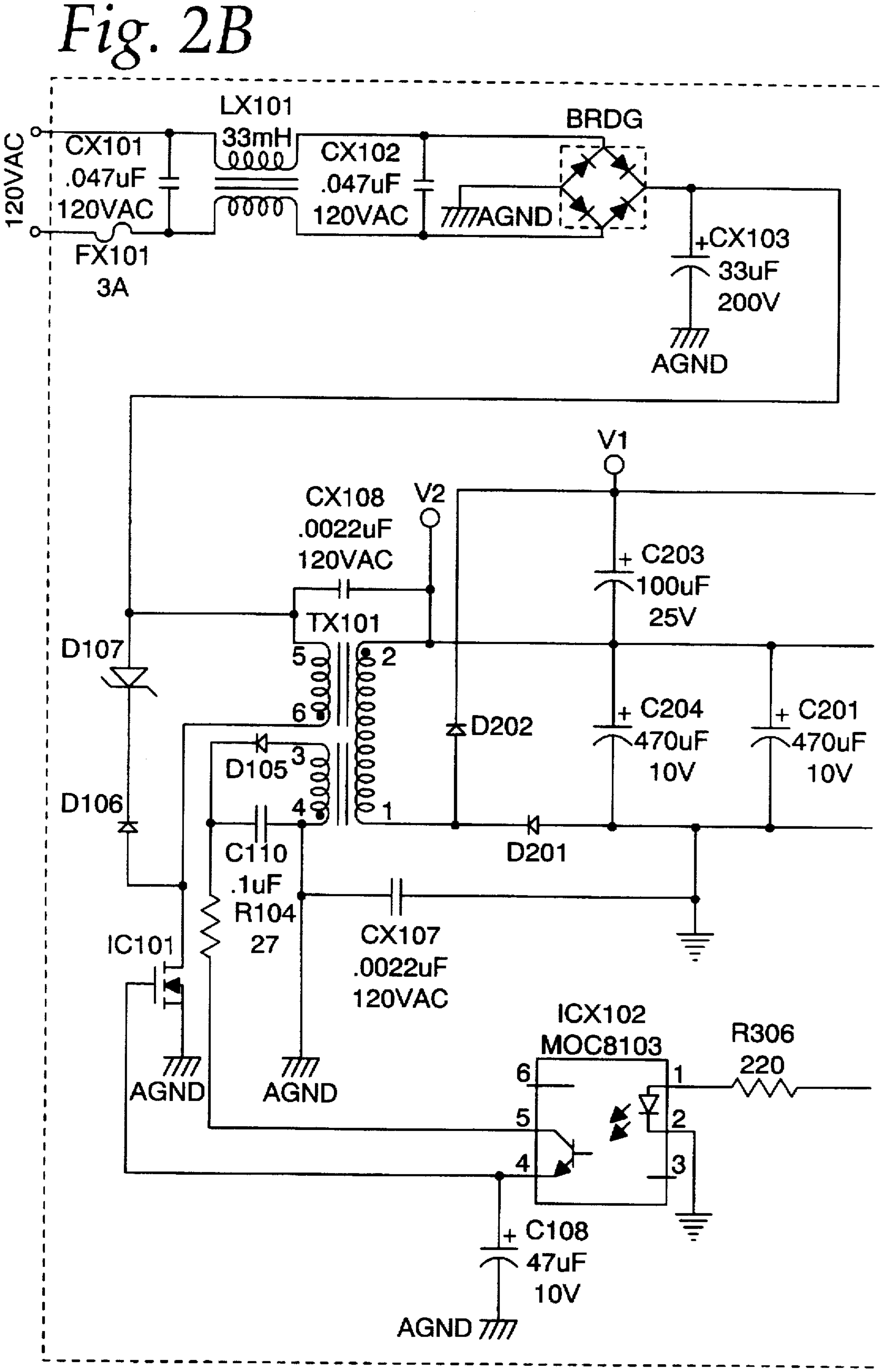

FIG. 2A represents an exemplary characteristic diagram for the DC—DC converter circuit illustrating the DC—DC converter circuit voltage (i.e., the output of the power supply 28 on the $P_1$ terminal) on the vertical axis as a function of the highest sensed battery voltage on the horizontal axis. Referring to FIG. 2A, the DC—DC converter circuit provides a constant output voltage $V_1$, for example 7.5 volts, up to a sensed battery of VBATT1, for example 6.1V. Above a battery voltage of VBATT1, the power supply 28 produces coupled output, adding a fixed voltage, for example 1.4V to the highest sensed voltage up to a second power supply voltage $V_2$, for example 10.5 volts which corresponds to a battery voltage VBATT2, for example 9.1 volts. Above VBATT2, the power supply maintains a constant output voltage of $V_2$. An exemplary DC—DC converter circuit is illustrated in FIG. 2B.

BATTERY CHARGER HARDWARE

Figure 3A:
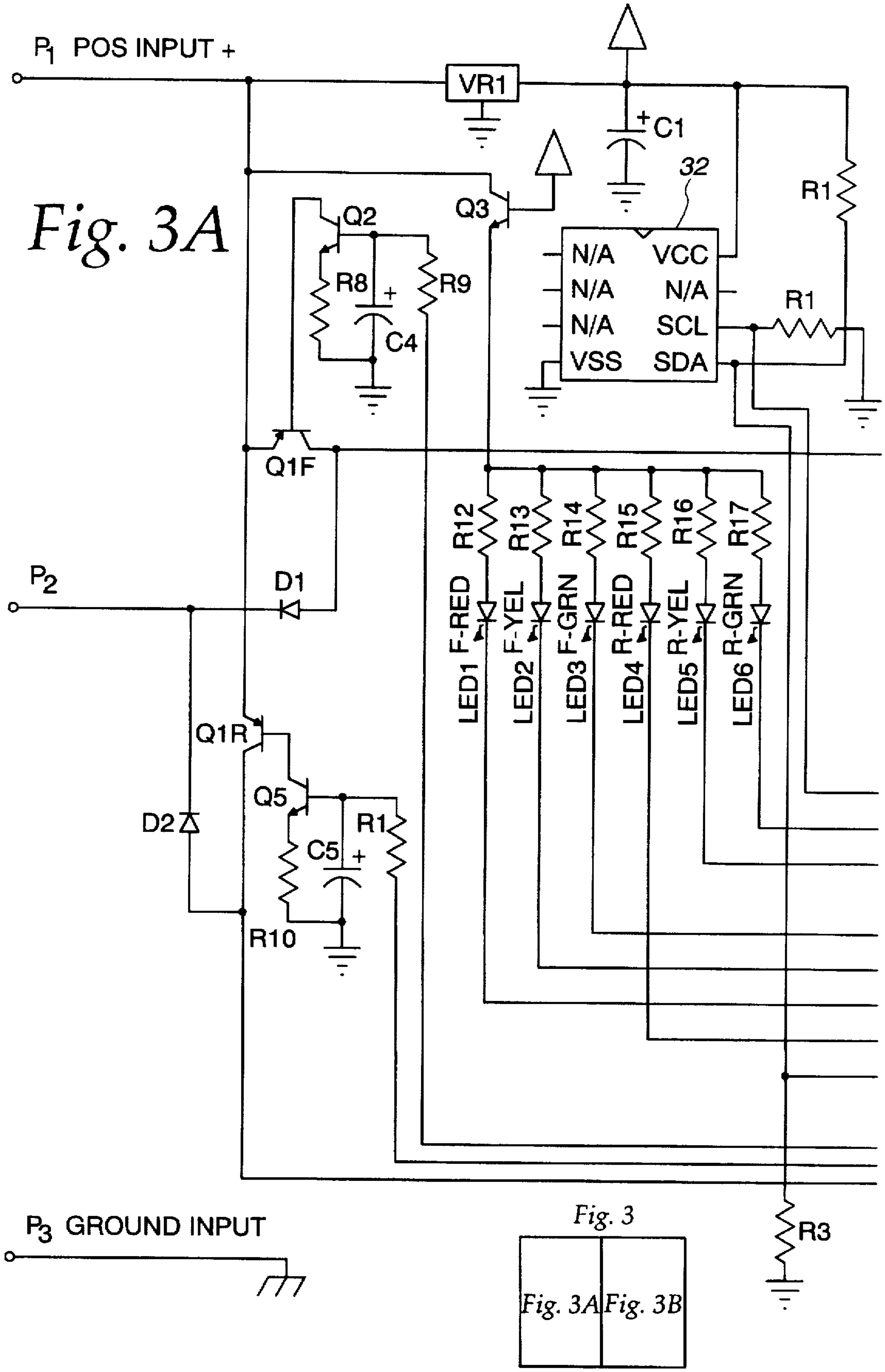
FIGS. 3A and 3B are a schematic diagrams of the battery charging circuit for the battery charger in accordance with the present invention.
Figure 3B:
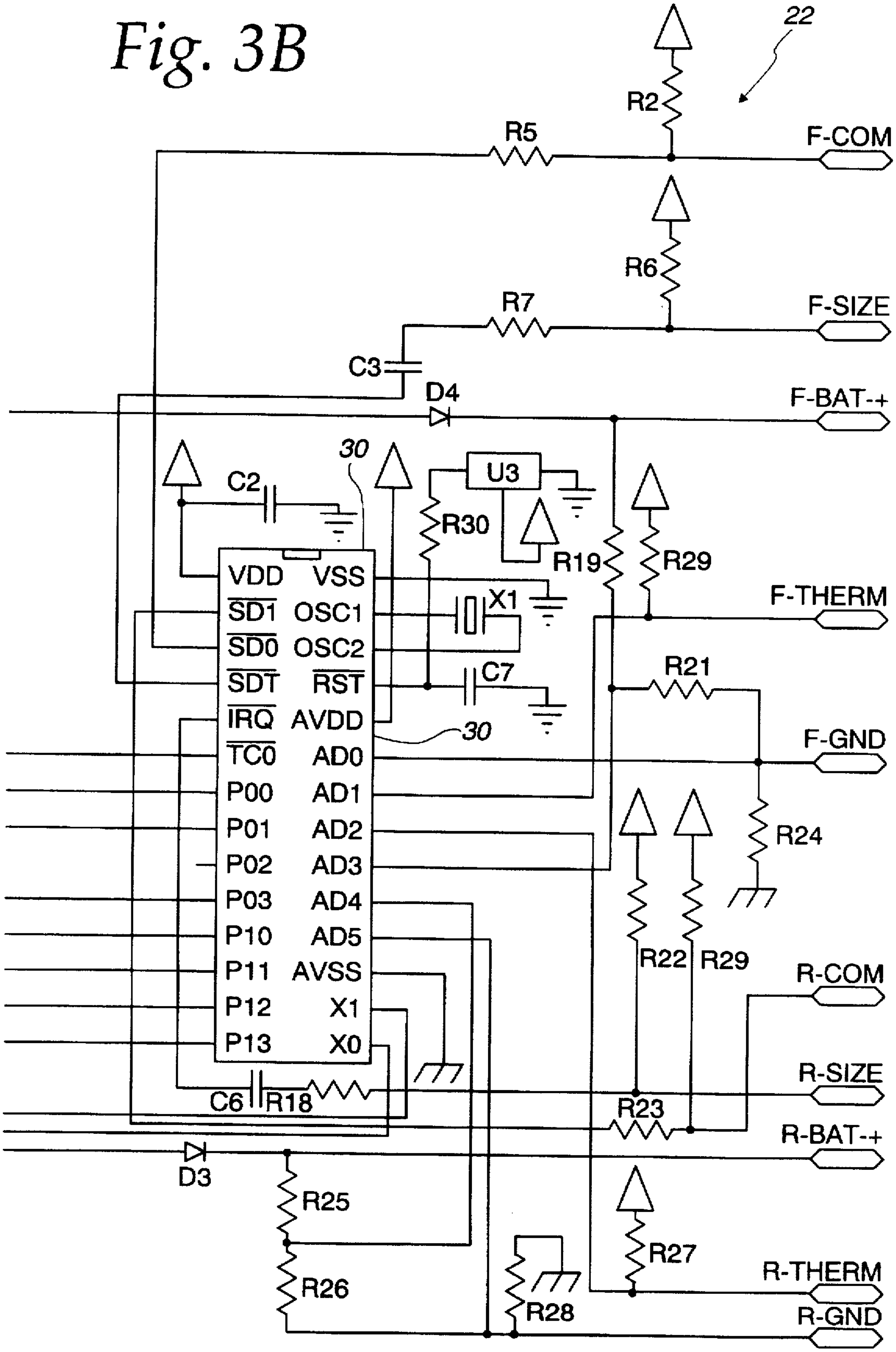

The battery charger circuit 22 is illustrated in FIGS. 3A–3B. The battery charger circuit 22 is shown with circuitry for both a front pocket 24 and rear pocket 26. At the heart of the battery charger circuit 22 is a microcontroller 30. The microcontroller 30 may be a four-bit microcontroller, such as a Panasonic Series MN1500 described in detail in "MN1500 Series Four-Bit, One-Chip Microcomputers Users' Manual", published by Matsushita Electronics Corporation, herein incorporated by reference. Other microcontrollers may also be suitable. The microcontroller 30 includes an on-board 256X4 random access memory (RAM), as well an on-board 4096X8 EEPROM for program instructions. The microcontroller 30 also includes a plurality of programmable input/output ports P00–P13, as well as an internal hardware timer and an on-board analog to digital (A/D) converter with six A/D input/output ports AD0–AD5.

As will be discussed in more detail below, the system is interrupt-driven. In particular, an internal interrupt counter generates interrupts at predetermined time periods to measure various battery parameters, such as battery voltage, current and temperature, for example, every 244 µsec.

In a two-pocket configuration, a time slice is allotted to each pocket 24, 26 (context) so that the batteries in each pocket 24, 26 can be alternatively charged on a time division multiplex basis with constant current or constant voltage, as opposed to known systems where the battery in one pocket is fully charged before any charging begins on the other pocket. In order to prevent overdriving of the battery charger circuit 22, the power dissipation is continuously checked on an interrupt basis. In particular, the battery voltage VBATT is determined by sensing the voltage across the voltage divider circuits R19/R21 and R25/26 and subtracting the voltage across the shunt resistors R24 and R28 for the front and rear pockets 24 and 26, respectively. The sensed battery voltage VBATT is applied to an A-D port on the microcontroller 30. The battery current is sensed by way of the sensing resistors R24 and R28 connected in series with the batteries in the front and rear pockets 24 and 26, respectively. Any time the power dissipation for either of the pockets 24, 26 becomes excessive, the respective power transistors $Q_1$ and $Q_4$ under the control of a pulse width modulator (PWM) are operated to control the power dissipation to an acceptable level.

A plurality of light-emitting diodes, LED1, LED2, LED3, LED4, LED5 and LED6, are provided for each of the front pocket 24 and rear pocket 26. In particular, each pocket 24, 26 is provided with a red, yellow and green LED. These LEDs provide the status of the charging system. The LEDs, LED1, LED2, LED3, LED4, LED5 and LED6 are connected between the various input/output ports on the microcontroller 30 and a power transistor Q3. More particularly, the emitter terminal of the transistor Q3 is coupled to the LEDs, LED1, LED2, LED3, LED4, LED5 and LED6 by way of a plurality of current-limiting resistors, R12, R14, R13, R15, R16 and R17. The collector of the transistor Q3 is coupled to the positive output terminal P1 of the power supply and AC adapter 28. The base of the transistor Q3 is tied high to cause the transistor Q3 to conduct anytime the power supply and the AC adapter 28 is connected to a 120-volt supply.

External power for the microcontroller 30 is developed by a linear regulator VR1, for example, a National Semiconductor Model LM 78L-05LZ, whose input terminal VCC is connected to the positive output P1 of the power supply and AC adapter 28, which provides a 5.0+/−5% VDC supply for both the analog and digital supply terminals AVDD and VDD of the microcontroller 30, as well as an EEPROM 32, discussed below. In order to provide a relatively constant voltage source to the microcontroller 30, a capacitor C1 is tied at the output of the linear regulator R1 and ground. In addition, a second capacitor, C2, is connected between the power supply input VDD and ground. Both the analog and digital ground pins of the microcontroller 30 VSS and AVSS are tied directly to ground.

The microcontroller 30 is an 8 MHz device. The clock signal for the microcontroller 30 may be provided by an 8 MHz crystal connected between its OSC1 and OSC2 pins. The reset pin (RST) is connected to ground by way of a capacitor C7, in order to prevent instantaneous fluctuations in the reset signal. The reset terminal (RST) is also connected by way of a resistor R30 to a device to measure the power supply voltage, such as a Schmitt trigger, for example, as manufactured by Panasonic, Model No. MN1381.

The front pocket signals F-COMM, F-SIZE and F-THERM are pulled high by way of pull-up resistors R2, R6, and R20, respectively. The F-COMM signal is applied to a serial input SDO of the microcontroller 30 by way of an input resistor R5. The F-SIZE signal is applied to a serial input pin SDT of the microcontroller 30 by way of an input resistor R7 and a serially coupled capacitor C3. The serial port SDO (or alternatively an I/O port) enables the battery charger circuit 22 to communicate with smart battery packs as discussed above. The F-THERM signal, an analog signal, is tied directly to an A/D input port AD1 of the microcontroller 30.

The battery signals from the rear pocket 26, R-COMM, R-SIZE and R-THERM are connected to the microcontroller 30. In particular, the R-COMM signal is connected to a bidirectional serial communication port SD1 on the microcontroller 30 by way of an input resistor R23. The R-SIZE signal from the rear pocket 26 is connected to an interrupt terminal IRQ on the microcontroller 30, by way of an input resistor R18 and serially coupled capacitor C6.

Charging power is applied to the battery in the pockets 24, 26 by way of the −BATT+ and −GND signals. As such, the $P_2$ terminal of the power supply 28 is connected to the positive battery terminal F-BATT-+ for the front pocket 24 by way of a power transistor Q1F and a diode D4 as well as to the positive battery terminal R-BATT-+ for the rear pocket 26 by way of a power transistor Q1R and a diode D3. The negative battery terminal F-GND for the front pocket 24 is connected to ground by way of a current sensing transistor R24 while the negative battery terminal R-GND for the rear pocket 26 is connected to ground by way of a current sensing transistor R28.

The analog battery voltage VBATT for the front pocket 24 may be read by way of the F-BATT+ terminal, connected to an A/D input/output port AD3 of the microcontroller 30 by way of a voltage divider consisting of the resistors R19 and R21. Similarly, the analog battery voltage VBATT for the rear pocket 26 may be read by the R-BATT-+ terminal by way of a voltage divider consisting of the resistors R25 and R26, applied to the A/D input/output port AD4. As mentioned above, the system is interrupt-driven and as such the microcontroller 30 may read various parameters including the battery voltage VBATT, as well as the battery temperature BATT TEMP and charge current, every interrupt cycle, for example 244 μsec for both the front pocket 24 and rear pocket 26, which enables batteries with different charging characteristics to be charged at the same time.

Power to the batteries in the front and rear pockets 24, 26 is under the control of a pair of power transistors Q1 and Q4, by way of a pair of diodes D4 and D3, respectively. The diodes D4 and D3 prevent the batteries from backfeeding the circuitry during non-charging conditions. The power transistors Q1 and Q4 are under the control of a pair of pulse width modulators (PWM). The PWM for the front pocket 24 includes a transistor Q2, a capacitor C4 and a pair of resistors R8 and R9 which drives the power transistor Q1. The collector of the transistor Q2 controls the power transistor Q1F for the front pocket 24. The PWM for the rear pocket 26 includes a transistor Q5, a capacitor C5 and a pair of resistors R1 and R10. The collector for the transistor Q5 controls the power transistor for the rear pocket 26.

Both PWMs operate in real time and operate in essentially the same manner. Thus, only one PWM will be described. Both PWMs are driven by the microcontroller 30 and in particular the terminals Xo and X1, which, as used herein, is an input/output port. These outputs of the I/O ports Xo and X1 are applied to the PWMs for the front and rear pockets 24 and 26 respectively. In particular, the output of the PWMs is applied to the base of the transistors Q2 and Q5 by way of current limiting resistors R9 and R11 for the front and rear pockets 24 and 26, respectively.

The collector current of the PWM transistors Q2 and Q5 is used to control the operating region of the power transistors Q1F and Q1R. The collector current of the PWM transistors Q2 and Q5 is under the control of the RC circuit, connected between the emitter and base terminals. When the I/O port $X_0$, $X_1$ is high, the RC circuit begins charging and discharging if the I/O part of $X_0$, $X_1$ is low as function of the and its RC time constant. For exemplary values of the resistors R8 and R10 of 100 ohms exemplary values for the capacitors C4 and C5 of 10 μf, the time constant will be approximately 0.001 seconds. By selecting a relatively long time constant relative to the interrupt period 244 μsec, the PWM transistors Q2 and Q5 as well as the power transistors Q1F and Q1R will conduct all the time. The transistors Q1F, Q1R, Q2 and Q5 thus operate in the linear region to control the power transistors $Q_1$ and $Q_4$ to provide either constant current or constant voltage charging. More particularly, the battery voltage VBATT and charging current IBATT are continuously monitored as discussed above. The PWMs control the power transistors $Q_1$ and $Q_4$ to maintain either a constant voltage or constant current.

In order to avoid the need to use precision components, an EEPROM 32 is provided and used for storing calibration constants for the standard tolerance components used in the circuit. The EEPROM 32 may be a Xicor, for example, Model 24 with 16 bytes of storage space. As will be indicated in more detail below, one byte of the EEPROM 32 is provided with a unique identifying number to indicate whether the calibration constants have been downloaded to the EEPROM 32.

BATTERY CHARGER SOFTWARE

The flow diagrams for the microcontroller 30 are illustrated in FIGS. 4 through 15. For a two-pocket battery charger, the system treats the pockets independently. In particular, a flag is set for the active pocket to enable measurements and charging to be done for that pocket. Once the measurements and charging for the active pocket are complete, the flag is reset for that pocket and set for the other pocket to enable measurements and charging to be done for the other pocket.

There are various active states of the battery charger. Since the measurements and charging of both pockets is virtually identical, the active states are discussed for a single pocket battery charger.

POWER-UP STATE

Figure 4:
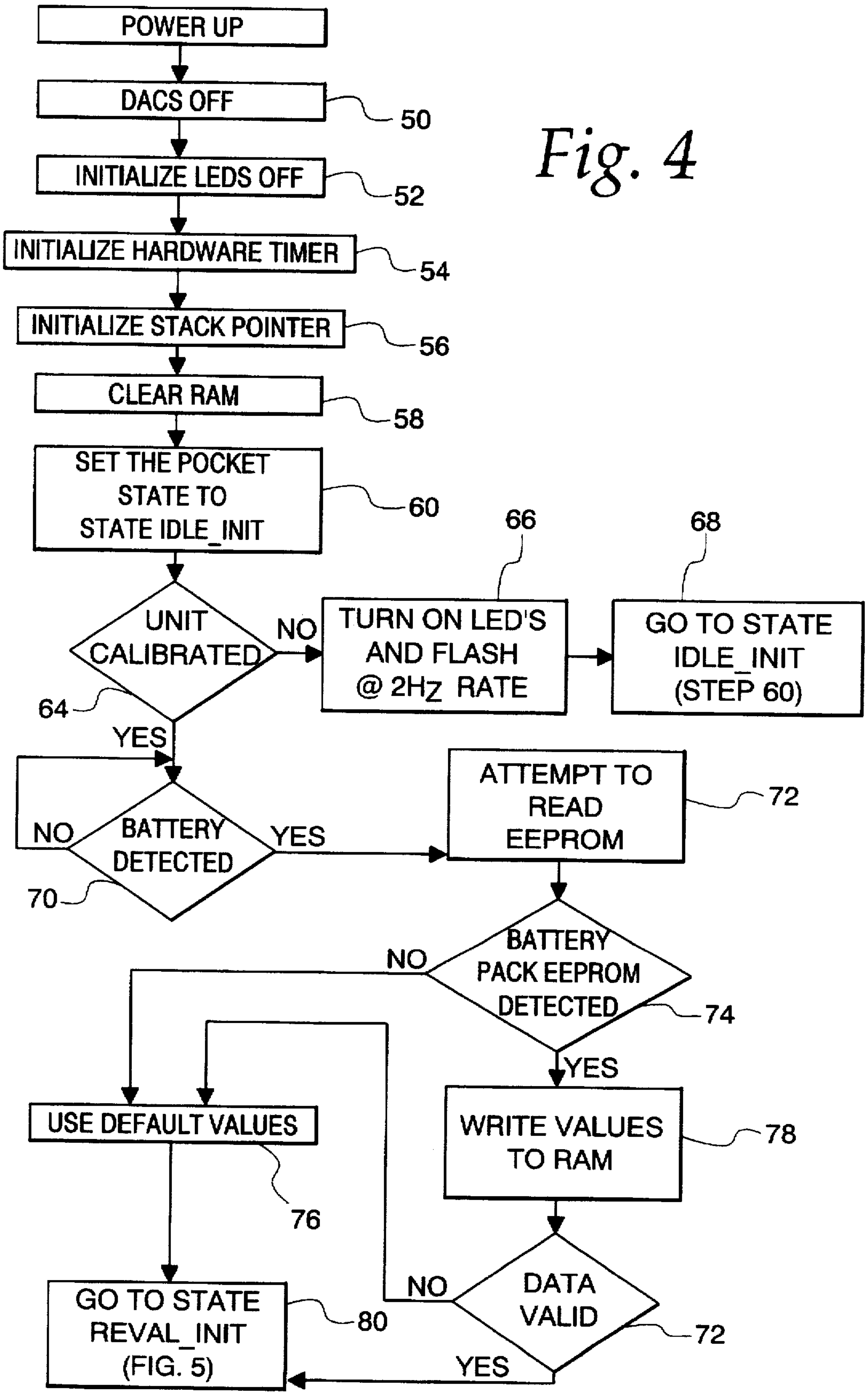
FIGS. 4–15 are flow diagrams for the battery charger in accordance with the present invention.

Referring first to FIG. 4, the power-up routine is illustrated. Initially, on power-up, the PWM transistors Q2 and Q5 are turned off by way of the microcontroller 30. By turning off the PWM transistors Q2 and Q5, the power transistors Q1 and Q4, respectively, are turned off which, in turn, cuts off battery charging current to both the front and rear pockets 24, 26, as illustrated in step 50. In addition to turning off the charging current to the front and rear battery pockets 24, 26, the LEDs, LED1, LED2, LED3, LED4, LED5 and LED6 for the front and rear pockets 24, 26 are initialized and turned off in step 52.

As will be discussed in more detail below, measurements of the battery voltage current and temperature are taken on an interrupt basis every predetermined time interval. As such, the microcontroller 30 includes an internal interrupt counter, set to interrupt the microcontroller 30 at predetermined time periods, for example, every 244 μsec. At each interrupt period, the microcontroller 30 reads various parameters for both of the front and rear pockets 24, 26 including the battery voltage, battery current and battery temperature. At power-up, the interrupt counter is initialized to zero in step 54.

The EEPROM 32 for the calibration constants is write-disabled during initialization. Also, the A/D ports, AD0-AD5, used for converting the battery parameters to digital values, are set to be inputs. The stack timer, as well as the internal RAM within the microcontroller 30, are also initialized in steps 56 and 58. After power-up, the battery charger circuit 22 goes through various states, as discussed below.

IDLE_INIT STATE

After power-up, the system goes into the idle-initiate state IDLE_INIT, as indicated in step 60. In this state, the battery charger reads various calibration constants for the various types of batteries from an EEPROM 32. In addition to the calibration constants, the EEPROM 32 also includes a unique number which indicates whether or not the calibration constants have been loaded into the EEPROM 32. Thus, in step 64, a predetermined byte, for example, the first byte which contains the unique number, is read. If the unique number is not found within the EEPROM 32, the system assumes that the EEPROM 32 does not include the calibration constants and proceeds to step 66. In step 66, the LEDs, LED1, LED2, LED3, LED4, LED5 and LED6 are flashed at the a 2 Hz rate to indicate that the system EEPROM 32 does not contain the calibration constants. Subsequently, in step 68, the system returns to step 60.

If the EEPROM 32 is found to include the calibration constants, the system proceeds to step 70 to determine if a battery has been detected in either the front pocket 24 or rear pocket 26. As mentioned above, the microcontroller 30 includes an interrupt counter which initiates detection of various battery parameters, including the battery voltage, current and temperature for both the front pocket 24 and rear pocket 26, every predetermined time period, such as 244 μsec. If no battery is detected, the system loops back to step 70 until a battery is detected. Once a battery is detected, a battery detection flag is set and the system attempts to read the EEPROM 32 in step 72. The first step in reading the EEPROM 32 is detecting the EEPROM 32 itself in step 74. If no EEPROM 32 is detected, the system goes to step 76 and utilizes default values. If an EEPROM 32 is detected, the constants are written to the on-board RAM on the microcontroller 30 in step 78. Once the values are written to the RAM, the data is analyzed in step 79 to determine if it is valid, for example, by way of a checksum. If not, the system loops to step 76 and uses default values. If the data is valid, the system goes to the pocket state REVAL_INIT in step 80.

REVAL_INIT STATE

Figure 5:
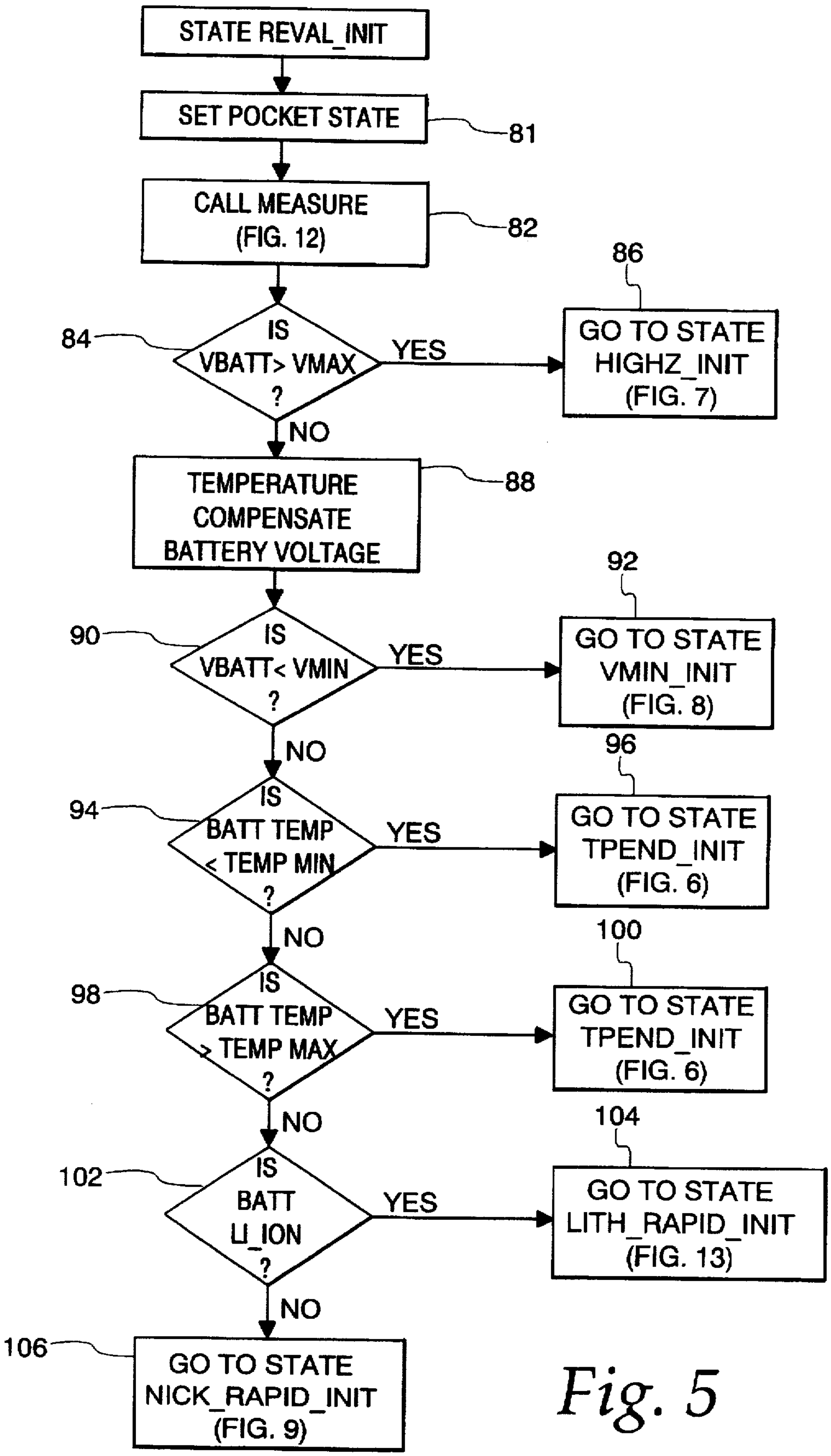

The state REVAL_INIT is illustrated in FIG. 5. Initially, in the REVAL_INIT state, the pocket state is set in step 81, after which the system calls a subroutine MEASURE (FIG. 12) which measures the battery parameters in the preselected interrupt intervals and stores them in the microcontroller 30 RAM in step 82 as well as other battery information including the battery size and type. These values are then compared with table values stored in the on-board EEPROM on the microcontroller 30 for the type of battery detected in the pocket. More particularly, the system checks to determine whether the battery voltage VBATT, as measured, is greater than VMAX, a value loaded into the EEPROM of the microcontroller 30 in step 84, indicating maximum voltage for the particular type battery. If so, the system proceeds to a pocket state HIGHZ_INIT in step 86.

If the battery voltage VBATT is less than the stored maximum value VMAX, the system next utilizes the calibration constants from the EEPROM 32 to provide temperature compensation of the measured battery voltage value VBATT in step 88. Subsequently, the system determines in step 90 if the battery voltage VBATT is less than a stored value VMIN, the minimum stored battery value. If so, the system proceeds to a pocket state VMIN_INIT in step 92. It not, the system proceeds to step 94, where the minimum stored temperature value TEMP MIN is compared with the measured value BATT TEMP. If the measured battery temperature value BATT TEMP is less than the stored value TEMP MIN, the system proceeds to a pocket state TPEND_INIT in step 96. If not, the system checks in step 98 whether the measured battery temperature BATT TEMP is greater than a maximum stored value TEMP MAX. If so, the system goes to state TPEND_INIT in step 100. If the battery temperature is less than the stored value for TEMP MAX, indicating maximum temperature for the battery, the system next checks in step 102 to determine if the battery is a lithium ion battery. More particularly, lithium ion battery packs normally include an internal EEPROM, which include data which indicates that the battery is a lithium ion type. As mentioned above, such data from the battery pack EEPROM is stored in state IDLE_INIT. If so, the system proceeds to lithium rapid initiation state in step 104. If not, the system assumes that the battery is a nickel metal hydride (NiMH) or a nickel cadmium (NiCd) battery, which merely require constant current charging in step 106 and proceeds to a NICK_RAPID_INIT state.

TPEND_INIT STATE

Figure 6:
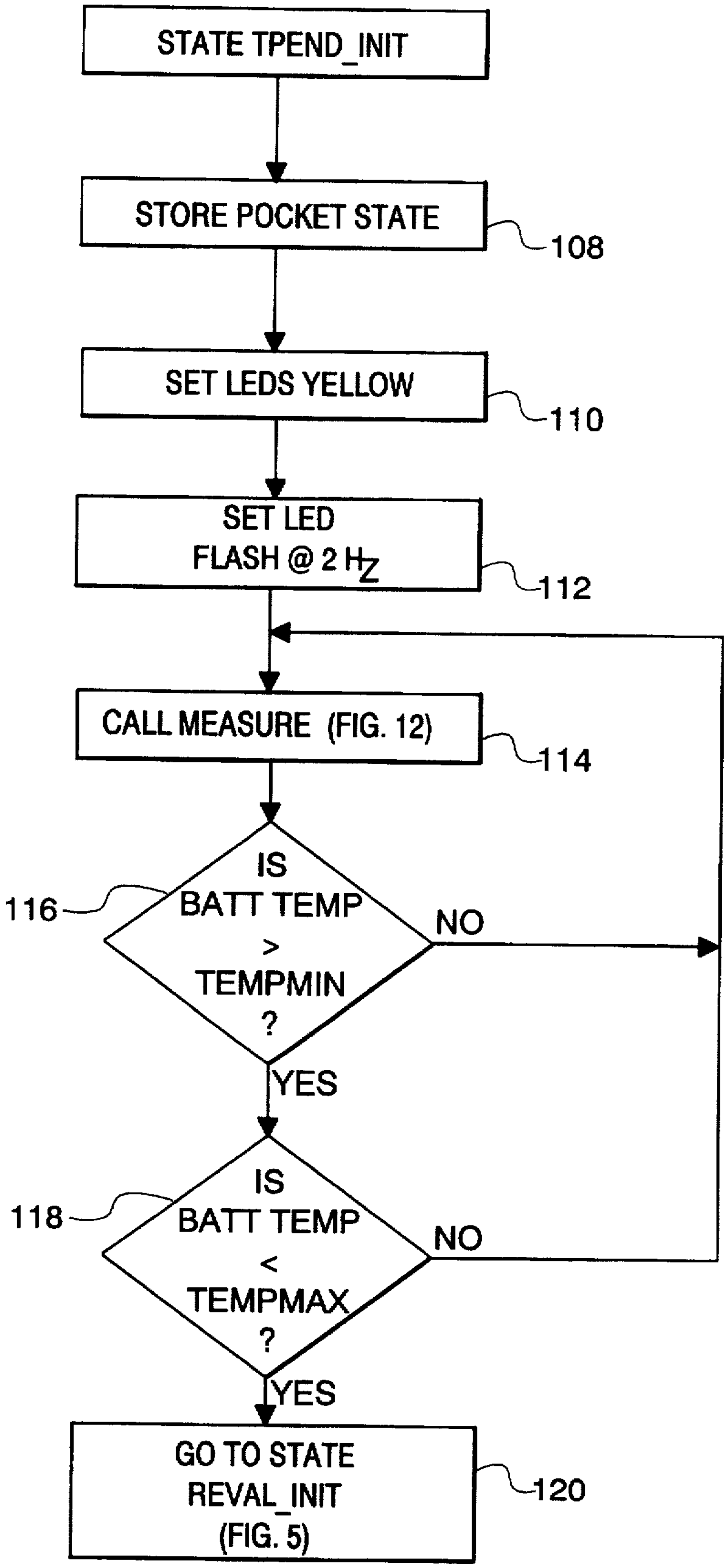

The TPEND_INIT pocket state is illustrated in FIG. 6. As indicated above, the system enters the TPEND_INIT state from steps 94 or 98, depending on whether the measured battery temperature BATT TEMP is less than the minimum TEMP MIN or greater than the maximum temperature TEMP MAX, stored in the on-board EEPROM in the microcontroller 30. The system remains in this state until the measured battery temperature BATT TEMP is within the proper limits (i.e., TEMP MIN<BATT TEMP<TEMP MAX). In order to provide relative stable operation of the system, hysteresis may be provided around the temperature constants such as TEMP MIN and TEMP MAX.

Initially, in step 108, the pocket state of the battery charger 22 is stored. After the state of the battery charger 22 is stored, the system sets the yellow LEDs LED2 or LED5, depending on the measured temperature in the particular pocket, front 24 or rear 26, in step 110. In step 112, the yellow LEDs are flashed at a 2 Hz rate to indicate that the measured battery temperature, either for the front 24 or rear pocket 26, is out of the proper temperature operating range. After flashing the yellow LEDs, LED2 and LED5, the system continues checking battery measurements of the front 24 and rear pocket 26, in step 114 by way of the MEASURE subroutine, discussed below. The system checks, in step 116, to determine if the measured battery temperature BATT TEMP is greater than the minimum temperature TEMP MIN. If not, the system continues reading battery temperature BATT TEMP until the measured battery temperature BATT TEMP is greater than the minimum recommended battery temperature TEMP MIN. Once the measured battery temperature BATT TEMP is found to exceed the minimum temperature TEMP MIN, the system next checks in step 118 to determine if the measured battery temperature BATT TEMP is less than the maximum temperature TEMP MAX. If not, the maximum temperature of the battery is assumed to be exceeded and the system stays in the loop, checking the measured temperature BATT TEMP until the measured battery temperature BATT TEMP drops down below the maximum temperature TEMP MAX. If the measured temperature BATT TEMP is found to be less than the temperature maximum TEMP MAX measured in step 118, the system returns to the REVAL_INIT state in step 120, as discussed above.

HIGHZ_INIT STATE

Figure 7:
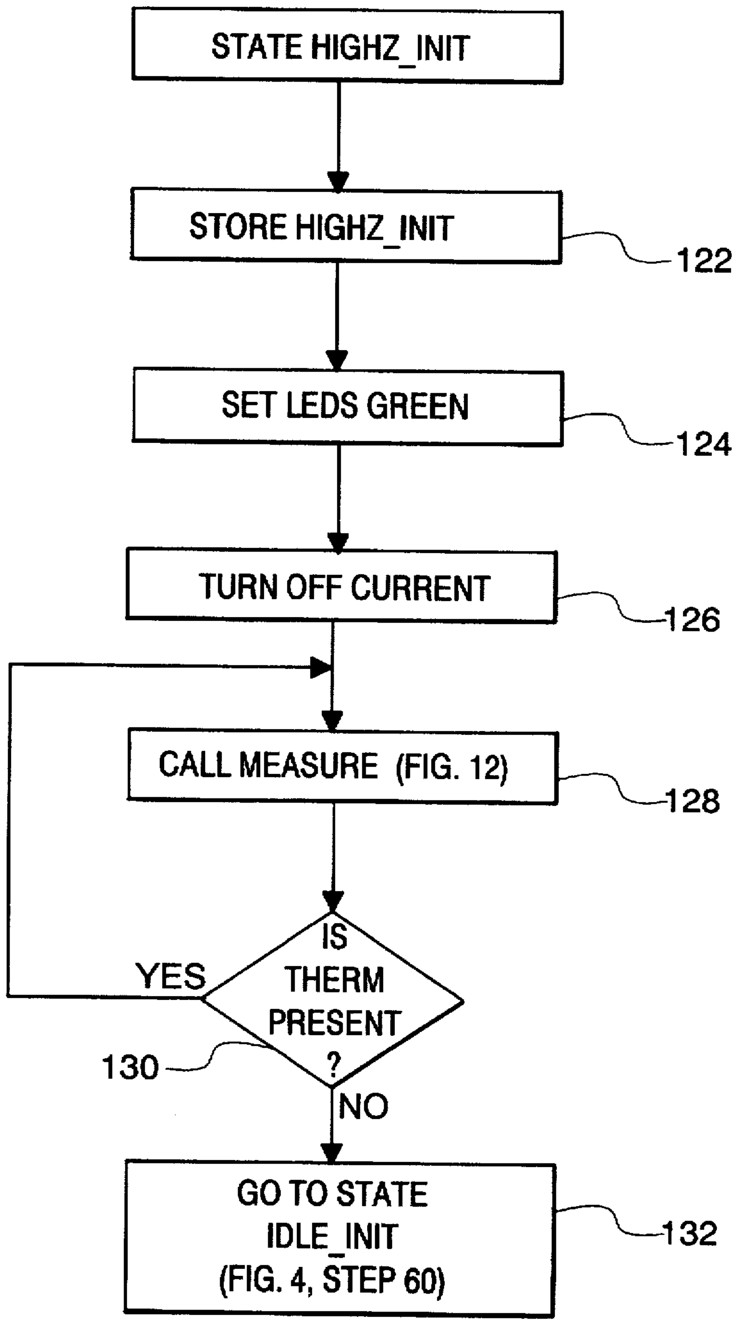

The HIGHZ_INIT state is illustrated in FIG. 7. As indicated above, the battery charger 20 enters this state when the measured battery voltage VBATT is found to be greater than a maximum voltage VMAX. In this state, the system initially sets the pocket state as the HIGHZ_INIT state in step 122. After the pocket state is set, the green LEDs, LED3 and LED6, are set in step 124, to indicate that the battery voltage VBATT is greater than the maximum voltage VMAX. Since the measured battery voltage VBATT exceeds the maximum battery voltage VMAX recommended, all charging current to the active pocket 24, 26 is turned off in step 126 by turning off the respective PWM transistors Q2 and Q5, which, in turn, turns of f the series power transistors Q1F and Q1R, respectively. After the current to the active pocket 24, 26 is turned off, the system continues to make temperature measurements as long as a battery pack is disposed in either the front or rear pocket 24, 26, respectively. Once the system determines in step 130 that a battery pack is no longer contained in either the front pocket 24 or rear pocket 26, the system goes to the state IDLE_INIT, as discussed above.

As discussed below, the determination of whether a battery pack is available in either the front or rear pocket 24, 26, is made by making voltage measurements and comparing these measurements with the values stored in the EEPROM on board the microcontroller 30. Should these values indicate no battery is present, the system will return to the IDLE_INIT state, awaiting another battery pack to be inserted into the battery charger 20 in step 132.

VMIN STATE

Figure 8A:
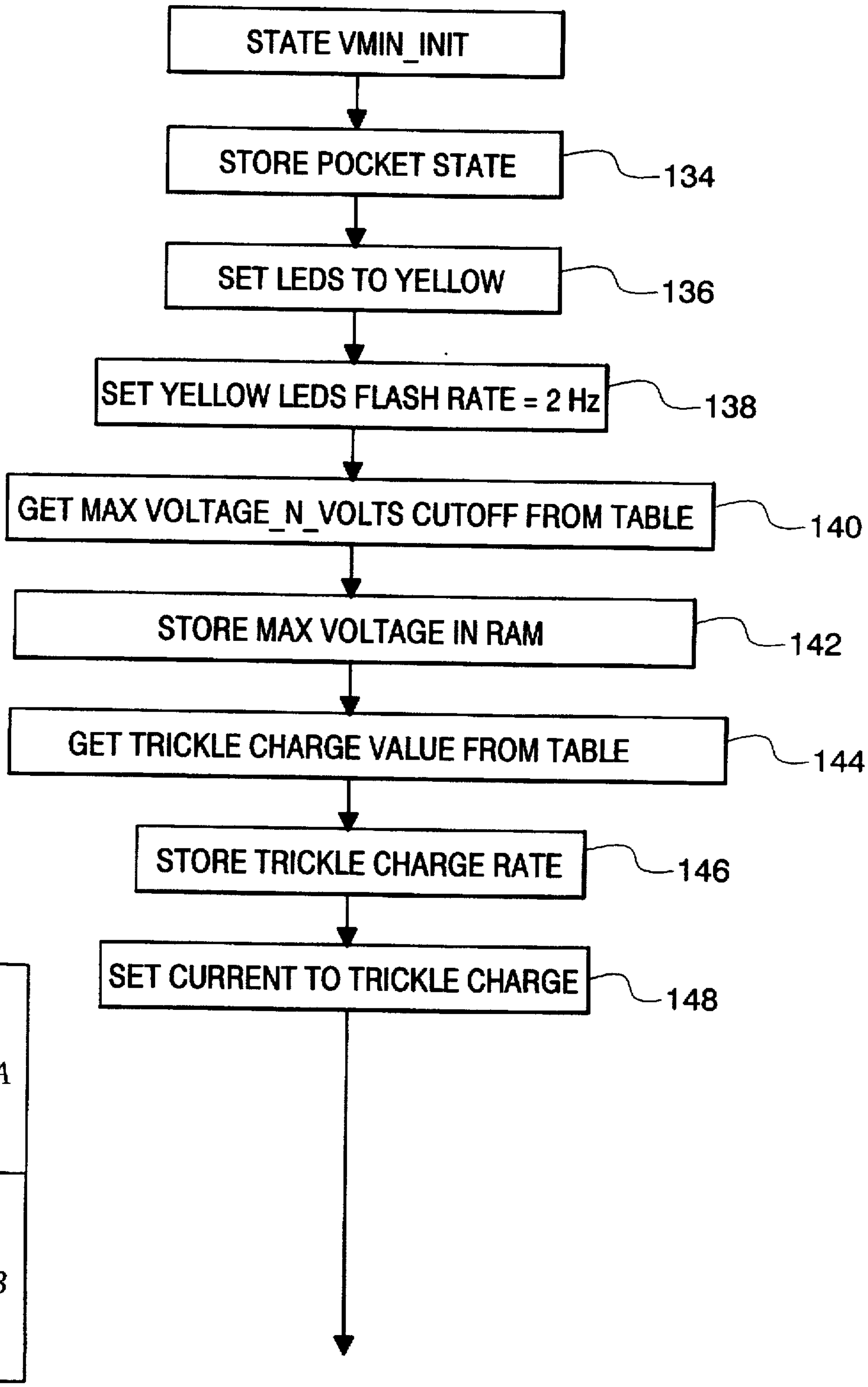
Figure 8:
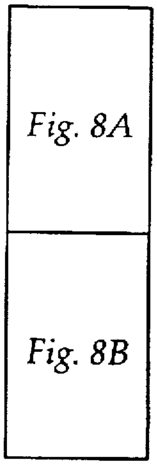
Figure 8B:
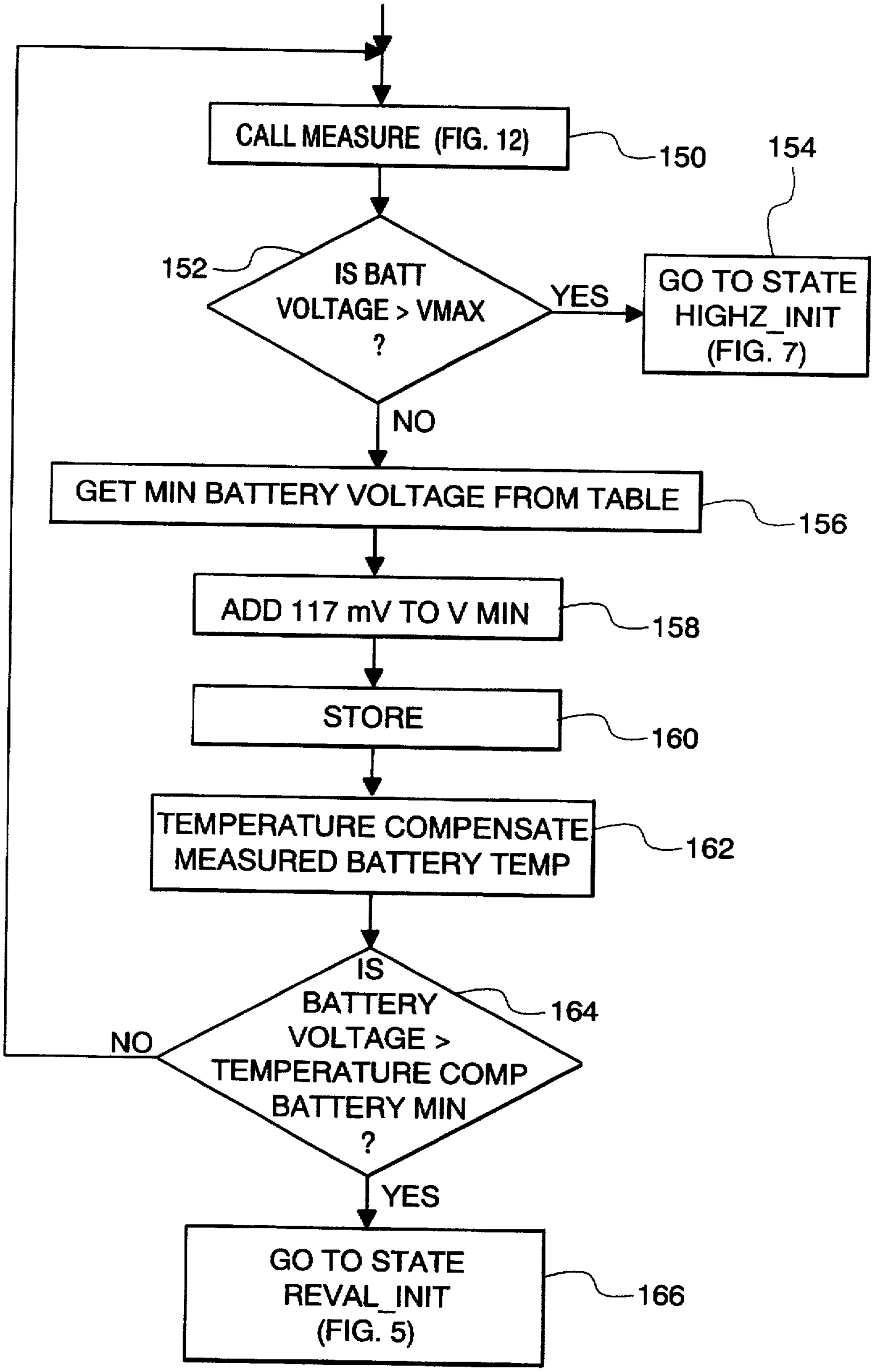

The VMIN_INIT state is illustrated in FIGS. 8A and 8B. As indicated above, the system goes to the VMIN state any time the measured battery voltage VBATT is determined to be less than a minimum voltage VMIN. When the battery is in such a state, the battery charger state is stored in step 134 and the battery is first preconditioned with a trickle charge before entering into a fast charge state in order to avoid damage to the battery. In this state, the yellow LEDs, LED2 and LED5, are flashed at a 2 Hz rate in step 138. Subsequently, in step 140, the maximum voltage VMAX, from the table in the EEPROM on board the microcontroller 30 is stored in the on-board RAM in step 142. Subsequently, in step 144, the trickle current value from the table is obtained in step 144 and stored in step 146. In step 148, the system is set to trickle charge the battery in either the front pocket 24 or rear pocket 26 by way of control of the PWM driver transistors Q2 and Q5, which, as mentioned above, drive the power transistors Q1 and Q4 to supply the trickle charge current to battery packs disposed in the front or rear pockets 24, 26, respectively. In step 150, the measured battery parameters are stored in the on-board RAM on the microcontroller 30. The measured battery voltage VBATT is compared with the maximum voltage VMAX for the battery in step 152. If the measured battery voltage VBATT is greater than the maximum voltage VMAX, the system goes to the HIGHZ_INIT state in step 154, as discussed above. If the measured battery voltage VBATT is determined not to be greater than the maximum voltage VMAX, the system proceeds to step 156 and obtains the minimum battery voltage VMIN from the table. In order to avoid cycling, hysteresis is added by adding a predetermined number, for example, 117 mV, to the minimum voltage value VMIN in step 158. The new value is stored in step 160. In step 162, the measured battery value VBATT is temperature compensated by way of a parameter value retrieved from the battery EEPROM or default tables. Subsequently, the temperature-compensated battery voltage VBATT is compared with the minimum voltage to determine if the battery voltage VBATT is greater than the temperature-compensated minimum battery voltage in step 164. If so, the system proceeds to the pocket state REVAL_INIT (FIG. 5). If not, the system returns back to step 150 and continues trickle charging the battery and checking the battery voltage VBATT. Once the measured battery voltage VBATT becomes greater than the minimum battery voltage, the system goes to step 166, which returns to REVAL_INIT state.

NICK_RAPID_INIT STATE

Figure 9A:
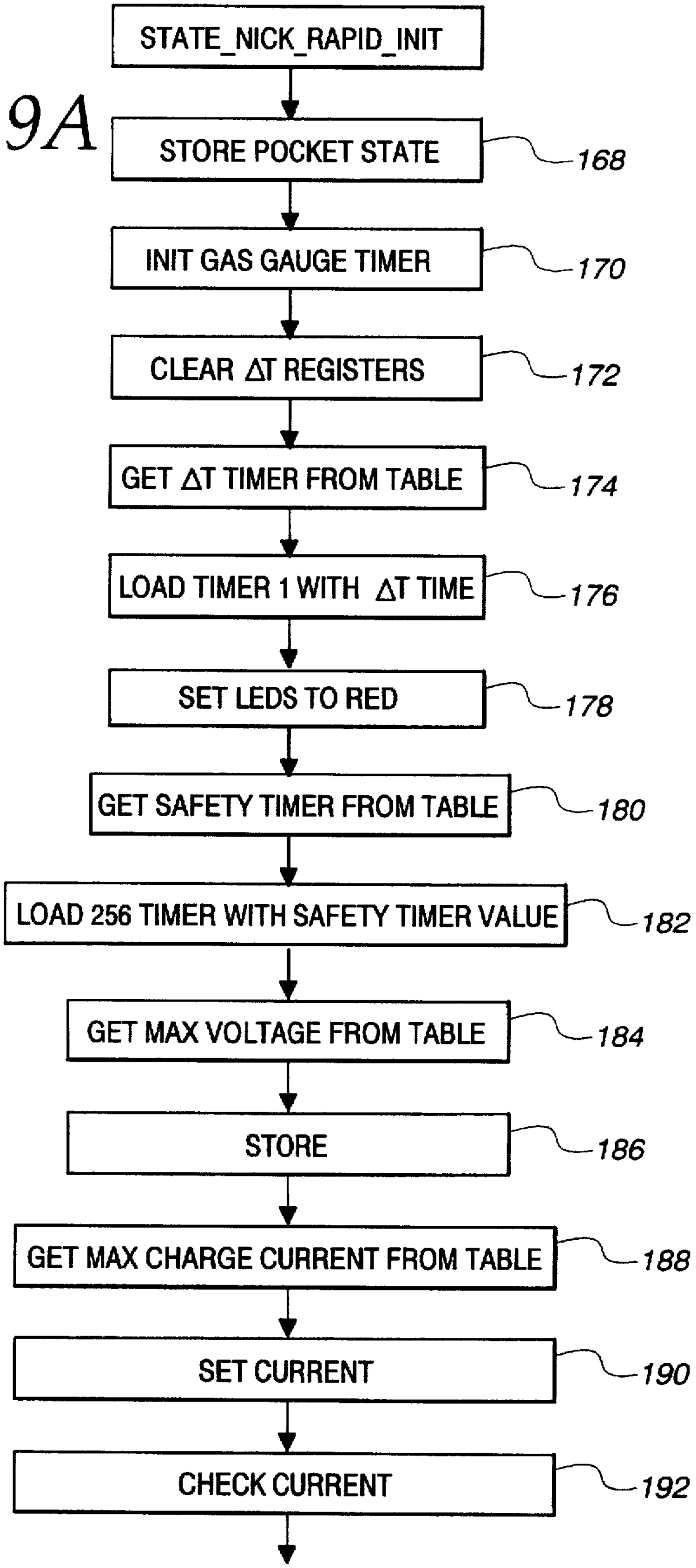
Figure 9B:
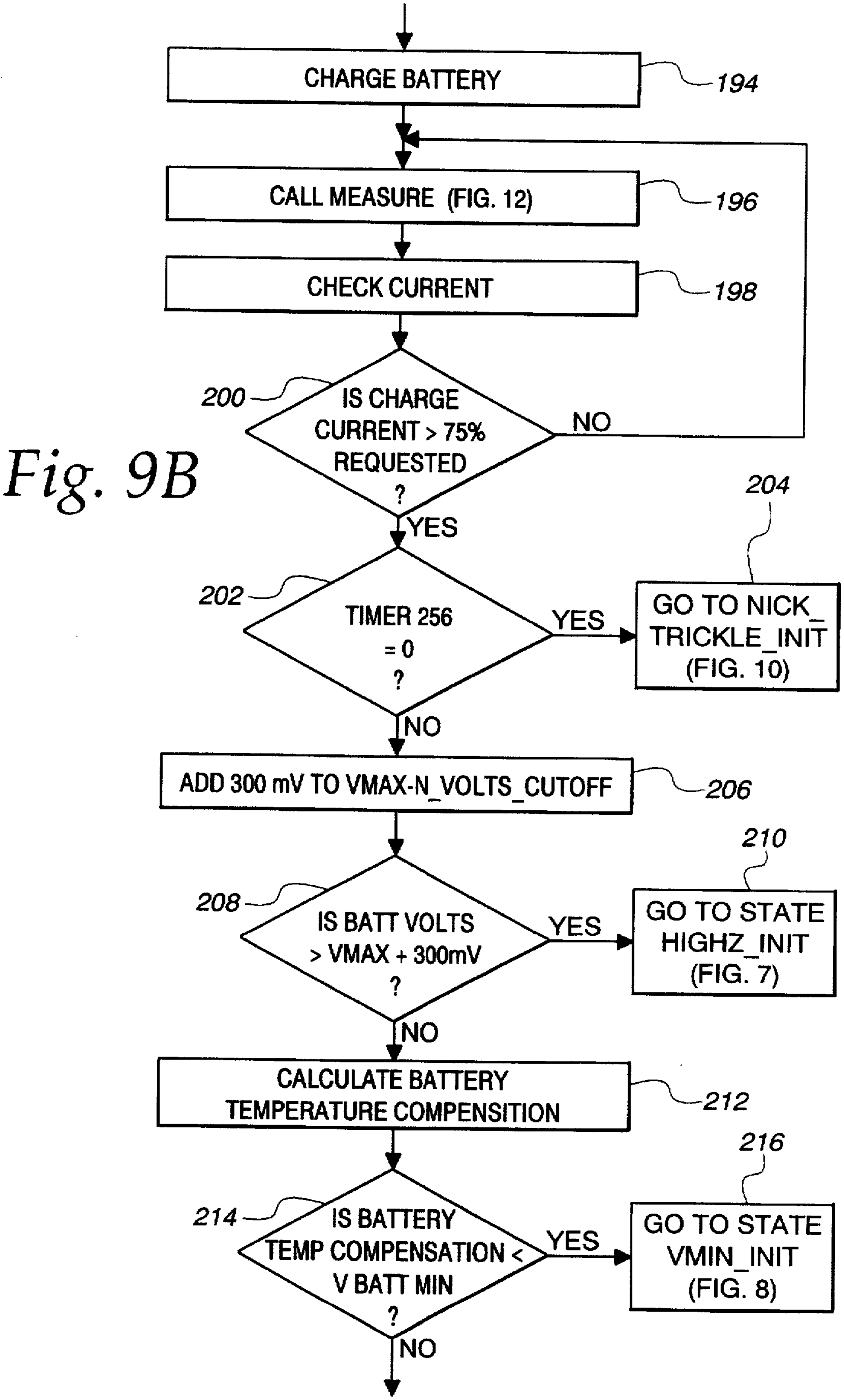

The flow diagram for rapid charging for nickel cadmium (NiCd) and nickel metal hydride (NiMH) batteries is identified as NICK_RAPID_INIT and is shown in FIGS. 9A, 9B and 9C. In this state, once the system determines that the battery in either the front pocket 24 or rear pocket 26 is not a lithium ion battery, the system goes to the NICK_RAPID_INIT state, assuming that the battery temperature BATT TEMP is less than the maximum temperature TEMP MAX. In this state, the pocket state is initially set as the NICK_RAPID_INIT state, indicating rapid charge for nickel metal hydride (NiMH) and nickel cadmium (NiCd) batteries in step 168.

In addition to the hardware interrupt counter discussed above, the system utilizes three software timers: a gas gauge timer; a ΔT timer and a safety timer. The gas gauge timer is used for timing both rapid and trickle charging of batteries requiring constant current charging, such as nickel cadmium and nickel metal hydride batteries. The stored charging values are retrieved for such batteries to cause the batteries to be charged at the stored values. After the pocket state is stored, the gas gauge timer within the microcontroller 30 is initiated in step 170. After the gas gauge timer is initiated in step 170, a plurality ΔT registers in the microcontroller 30 are cleared in step 172. Since both nickel metal hydride (NiMH) and nickel cadmium (NiCd) batteries are subject to a maximum temperature change per unit of time, stored ΔT timer values are retrieved from the table in step 174 and loaded into the ΔT timer in step 176. After the ΔT timer is initiated with the ΔT timer value, the red LEDs, LED1 and LED4, are set in step 178. The safety timer is set, for example, to a relatively long period, for example, a few hours. The safety timer returns the battery to a trickle charge after a predetermined time period irrespective of the rate of change of temperature with time of the battery. Thus, in step 180, the time period for the safety timer is retrieved from the table in step 180 and loaded into the safety timer in step 182. Subsequently, in step 184, the maximum allowable voltage VMAX is obtained from the table in step 184 and stored in 186. The maximum charging current IMAX is obtained from the table in step 188 and used in step 190 for setting the PWM control circuits, which, in turn, control the power transistors Q1 and Q4 for controlling charging current to the front and rear pockets 24, 26. The current is checked in step 192. Subsequently, in step 194, the system charges the battery with the current IMAX. The system then measures the current in step 196 to determine if the charging current required by the rapid charge can be delivered by the system. Thus, in step 200, the system checks whether the charge current is 75% of that requested. If not, the system continues looping until the system can deliver at least 75% of the required rapid charge current. Should the system decide in step 200 that at least 75% of the required rapid charge current can be delivered to either the front or rear pockets 24, 26, the system proceeds to step 202 and checks the safety timer. If the safety timer has expired, the system goes to step 204 and goes to the NICK_TRICKLE_INIT state for trickle charging both nickel metal hydride (NiMH) and nickel cadmium (NiCd) batteries. If the safety timer has not expired, a predetermined value, for example, 300 mv, is added to the maximum voltage VMAX for the battery in step 206 to generate a cut-off voltage value CUT-OFF_VOLTS. Subsequently, in step 208, the system checks if the battery voltage is greater than VMAX, the cut-off voltage CUT-OFF_VOLTS. If so, the system goes to the HIGHZ state in step 210. If not, the system proceeds to step 212 where the battery temperature compensation is determined for the measured battery voltage. In step 214, the system determines whether the temperature-compensated battery voltage determined in step 212 is less than the minimum battery voltage VMIN. If so, the system proceeds to step 216 to the VMIN_INIT state. If not, the system goes to step 218 and checks whether the temperature-compensated battery voltage value is greater than VMAX. The system then checks in step 219 whether the safety timer five minute flag has been set. If so, the system goes to the maintenance state MTCE (FIG. 11) in step 221. If not, the system goes to step 220 to the NICK_TRICKLE_INIT state for trickle charging both nickel metal hydride (NiMH) and nickel cadmium (NiCd) batteries. If not, the system goes to step 222 which checks whether the rate of change of temperature per unit of time is greater than the value from the table. If so, the system goes to step 224 to the NICK_TRICKLE_INIT state. If not, the temperature cut-off is determined in step 226. The system next checks in step 228 to determine if the battery temperature BATT TEMP is greater than the maximum temperature TEMP MAX. If so, the system goes to the trickle charge state NICK_TRICKLE_INIT in step 230. If not, the system checks in step 232 whether the measured temperature BATT TEMP is less than the minimum temperature TEMP MIN. If so, the system goes to the TPEND_INIT state in step 234. If the measured temperature BATT TEMP is not less than the minimum temperature TEMP MIN, the gas gauge timer is checked in step 236. If the gas gauge timer is not timed out, the system continues with rapid charging and proceeds to step 242. Otherwise, the system does gas gauge checking as illustrated in FIGS. 9D and 9E.

Figure 9D:
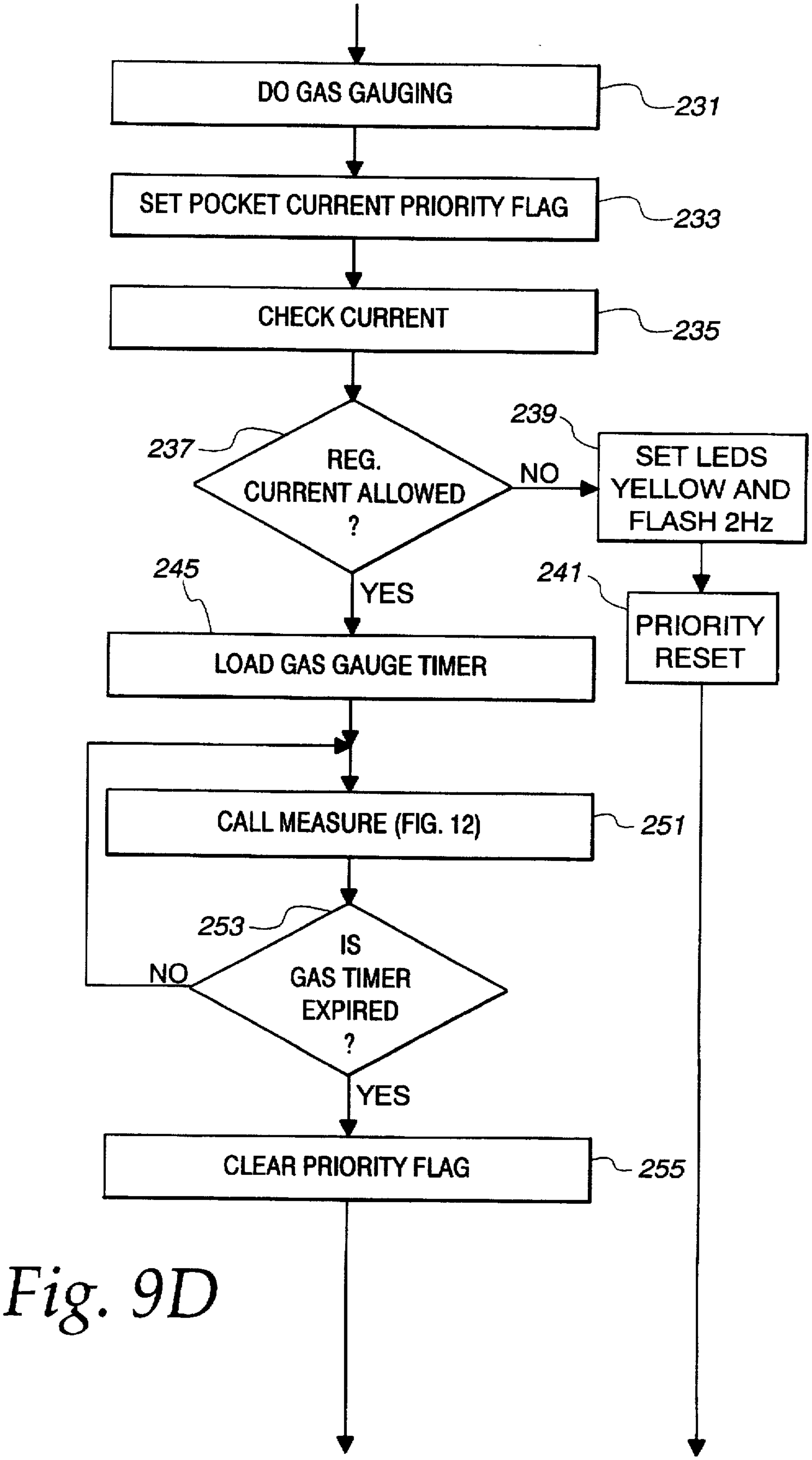
Figure 9E:
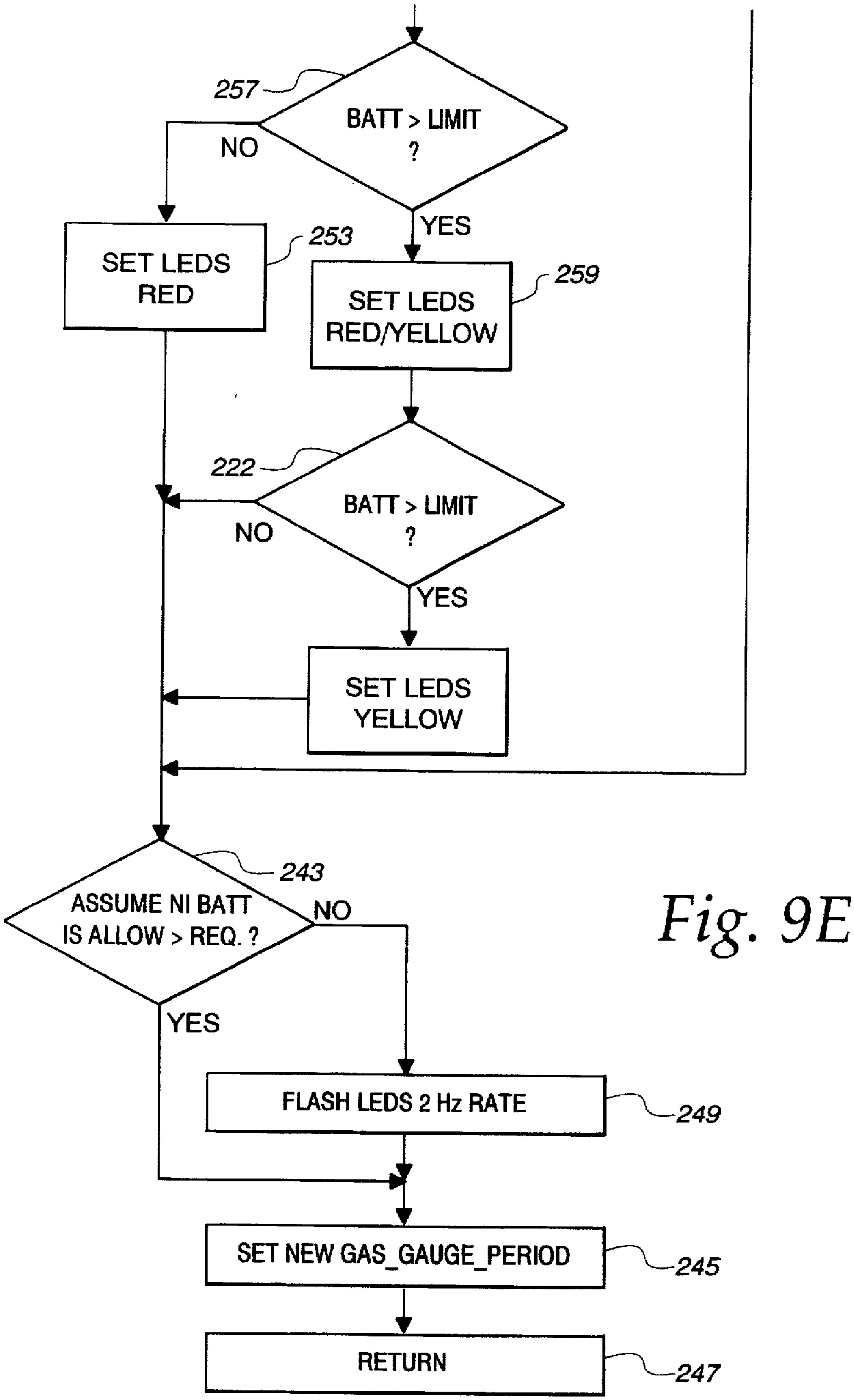

Referring to FIG. 9D, the gas gauge checking is initiated in step 231 by checking and calculating the allowable current to prevent damage to the power supply and to the power transistors $Q_1$ and $Q_4$. In particular, power dissipation of the power supply 28 and the power transistors $Q_1$ and $Q_4$ is checked. The power supply 228 may have an exemplary 850 milliamp maximum while the power transistors $Q_1$ and $Q_4$ may be subject to an exemplary 2-watt power dissipation limit. The maximum power dissipation levels (i.e., maximum battery current) is compared with a table value from the EEPROM 32 during gas gauge periods.

In step 233, a pocket priority flag is set. After the pocket priority flag is set, the system determines in step 235 whether the required charging current will exceed the maximum allowable current of the power supply 228. If not, the yellow LEDs are set to flash at a 2 hertz rate in step 239. Additionally, the priority flag is cleared in step 241. Once the priority flag is set, the other pocket is kept off as discussed above. The system then proceeds to step 243, assuming nickel type battery compares maximum allowable current for the power supply 28 with a value representative of seventy five percent (75%) of the required current to the active pocket. In other words, if the allowable current from the power supply 28 is greater than seventy five percent (75%) of the required current, the system proceeds to step 245 and sets a new gas gauge period and then returns in step 247. If not, the LEDs are flashed at a 2 Hz rate in step 249. If the current required by the active pocket can be sufficiently supplied by the power supply 28, the gas gauge timer is loaded in step 245 and measurements are made in steps 251 and 253 until the gas gauge timer has expired. Once the gas gauge timer expires, the priority flag is cleared in step 255. The system them checks in step 257 whether the battery voltage BATT is greater than a value LIM1, obtained from the EEPROM 32. If not, the system proceeds to step 253. If so, the system proceeds to step 259 and sets the red and yellow LEDs and again checks in step 261 whether the battery voltage BATT is greater than a second value LIM2 obtained from the EEPROM 32. If not, the system then returns to step 243, otherwise, the red LED is set.

NICK_TRICKLE_INIT STATE

Figure 10A:
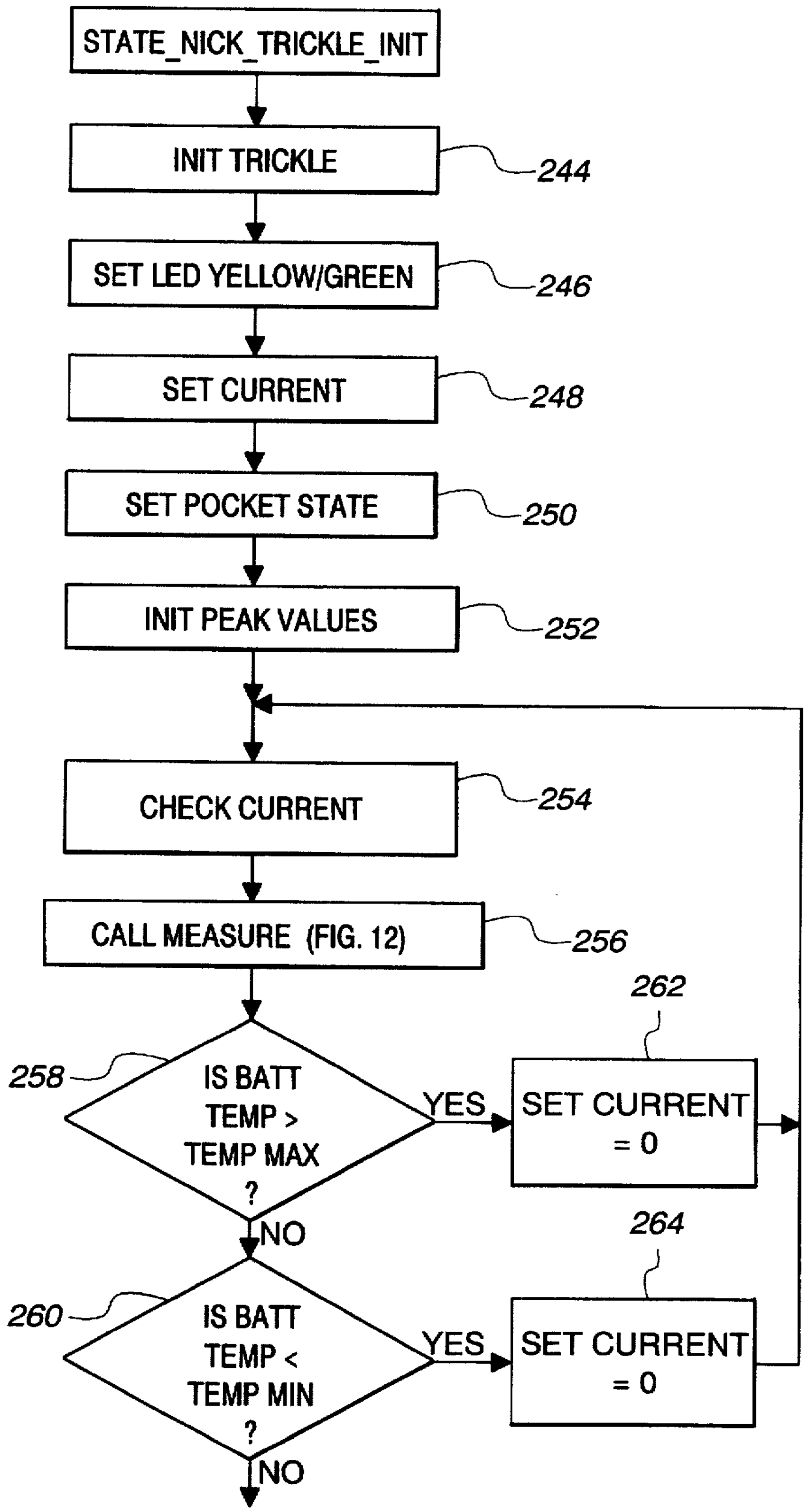
Figure 10B:
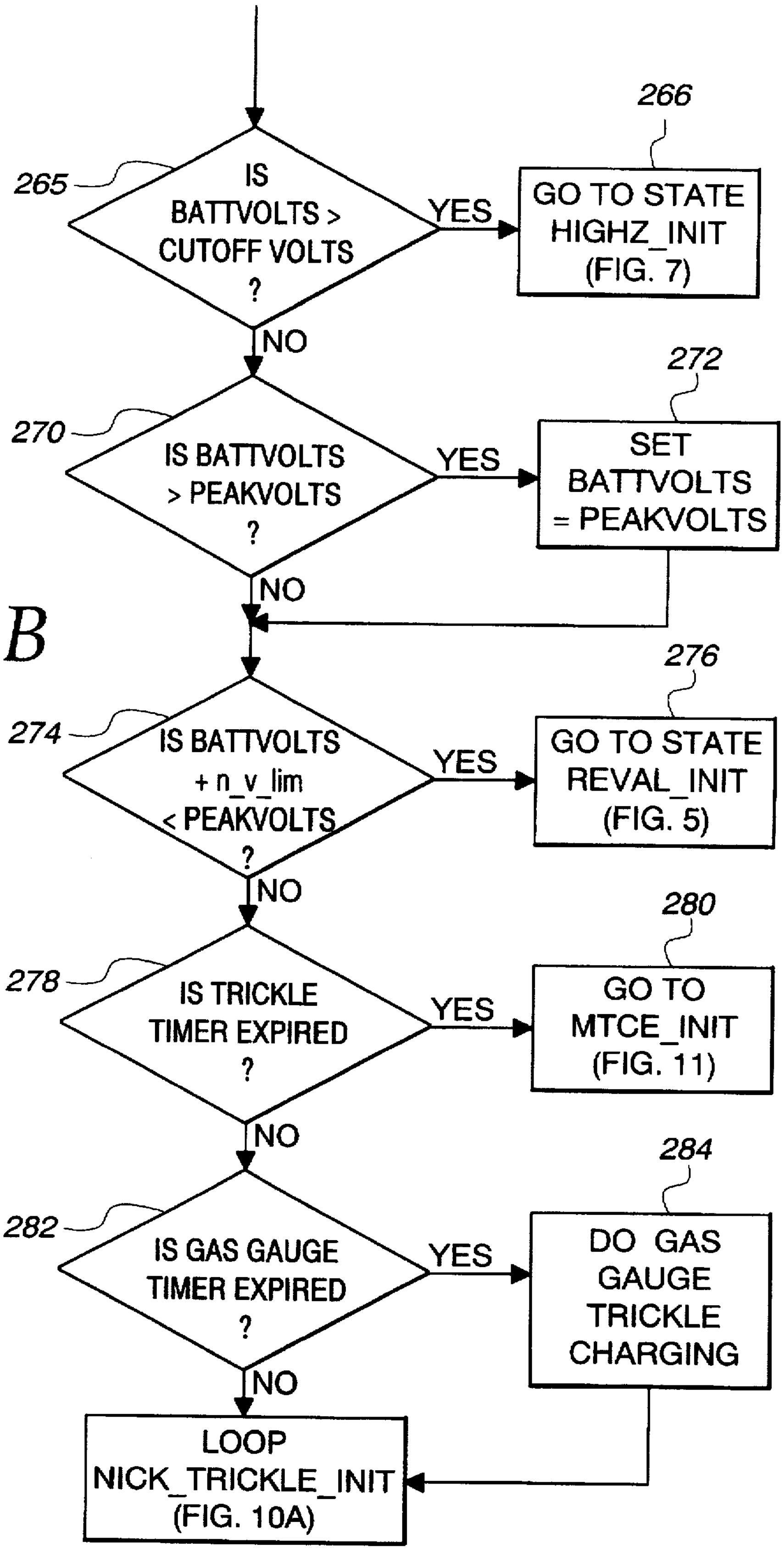
Figure 10:
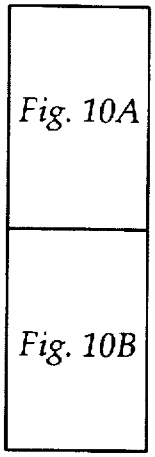

The flow chart for the NICK_TRICKLE_INIT state is illustrated in FIGS. 10A and 10B. Initially, in step 244, the trickle timer is initiated. After the trickle timer is initiated, the yellow LED2, LED5 and green LED3 and LED6 LEDs are set in step 246 to indicate trickle charge. After the LEDs are set, the current level for trickle charging of the battery is set in step 248. The current level is retrieved from a table value. In step 250, the pocket state is set to NICK_TRICKLE_INIT.

The system normally tracks the peak voltage of the battery and stores this voltage as PEAK VOLTS. In order to determine if the battery voltage is dropping, the PEAK VOLTS value is cleared in step 252. The system next enters into a trickle charge loop in which the current is checked in steps 254 and 256. In steps 258 and 260, the battery temperature BATT TEMP is checked to determine if it has gone above the maximum temperature permissible, TEMP MAX, or below the minimum temperature permissible, TEMP MIN. If the battery temperature is greater than the maximum temperature permissible, TEMP MAX, or less than the minimum temperature permissible, TEMP MIN, the battery current is turned off in steps 262 and 264, respectively, and the system loops back to step 254 and checks the current and continuously loops until the battery temperature is within range. After the battery temperature is checked in steps 250 and 260 and found to be within the minimum and maximum temperature range, the battery voltage is checked in step 266 to determine if the current battery voltage is greater than the cut-off voltage CUT-OFF VOLTS, a stored table value for the trickle charge state indicating the maximum allowable voltage. If the battery voltage is greater than the cut-off voltage CUT-OFF VOLTS, the system goes to the HIGHZ state, as indicated in step 266. If the battery voltage is not greater than the cut-off voltage CUT-OFF VOLTS, the system next checks in step 270 to determine if the battery voltage is greater than the peak voltage PEAK VOLTS. If so, the battery voltage VBATT is set to equal the peak voltage PEAK VOLTS in step 272. If not, the system checks in step 274 to determine if the battery voltage VBATT is less than the peak voltage PEAK VOLTS. If so, the system goes to the REVAL_INIT state in step 276. If not, the system proceeds to step 278 to determine if the trickle timer has expired. If so, the system goes to a maintenance charge state MTCE_INIT in step 280. If not, the system checks to see if the gas gauge timer expired in step 282. If so, the system does a gas gauge as discussed above and continues trickle charging in step 284.

MTCE_INIT STATE

Figure 11A:
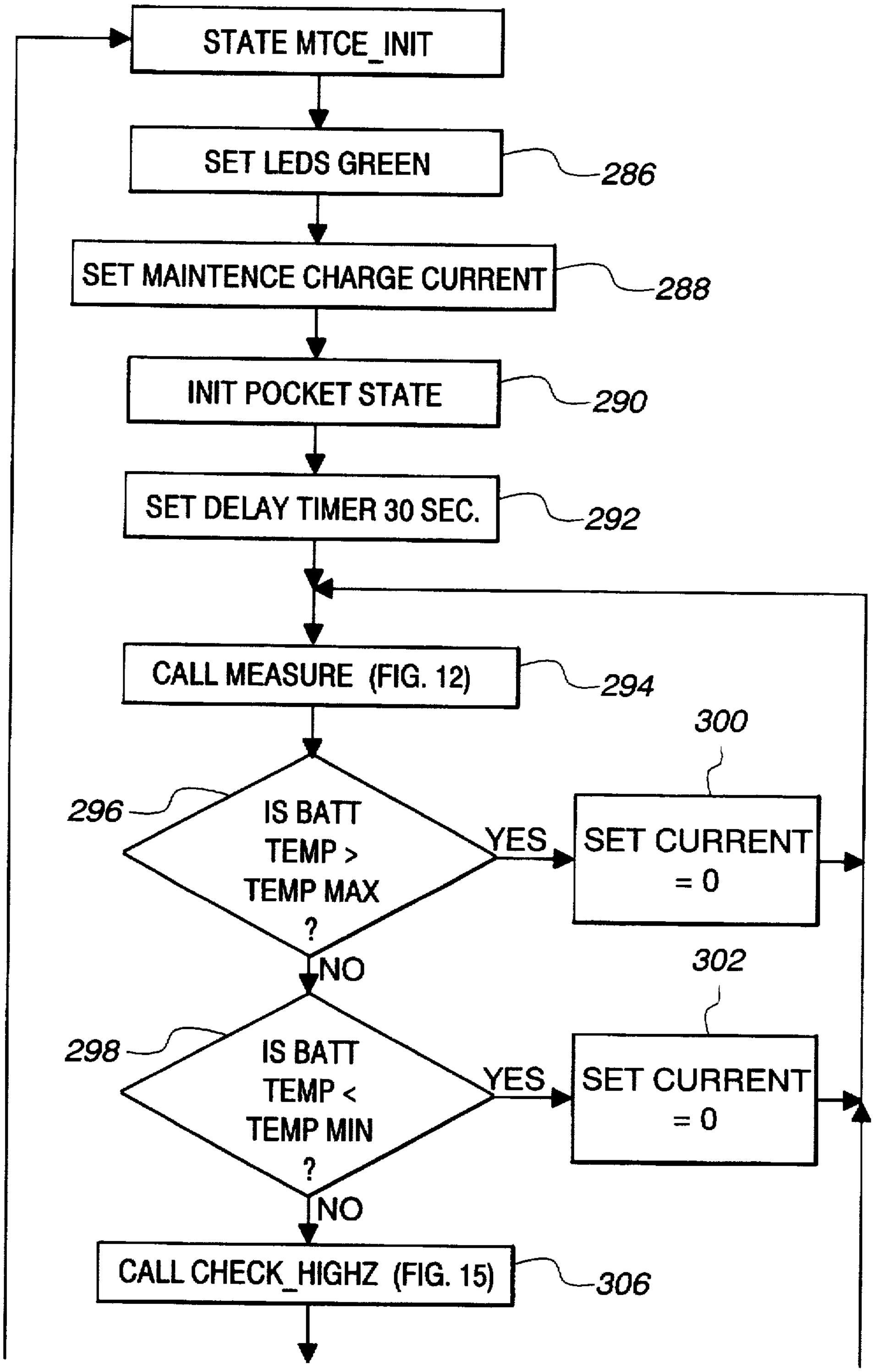
Figure 11B:
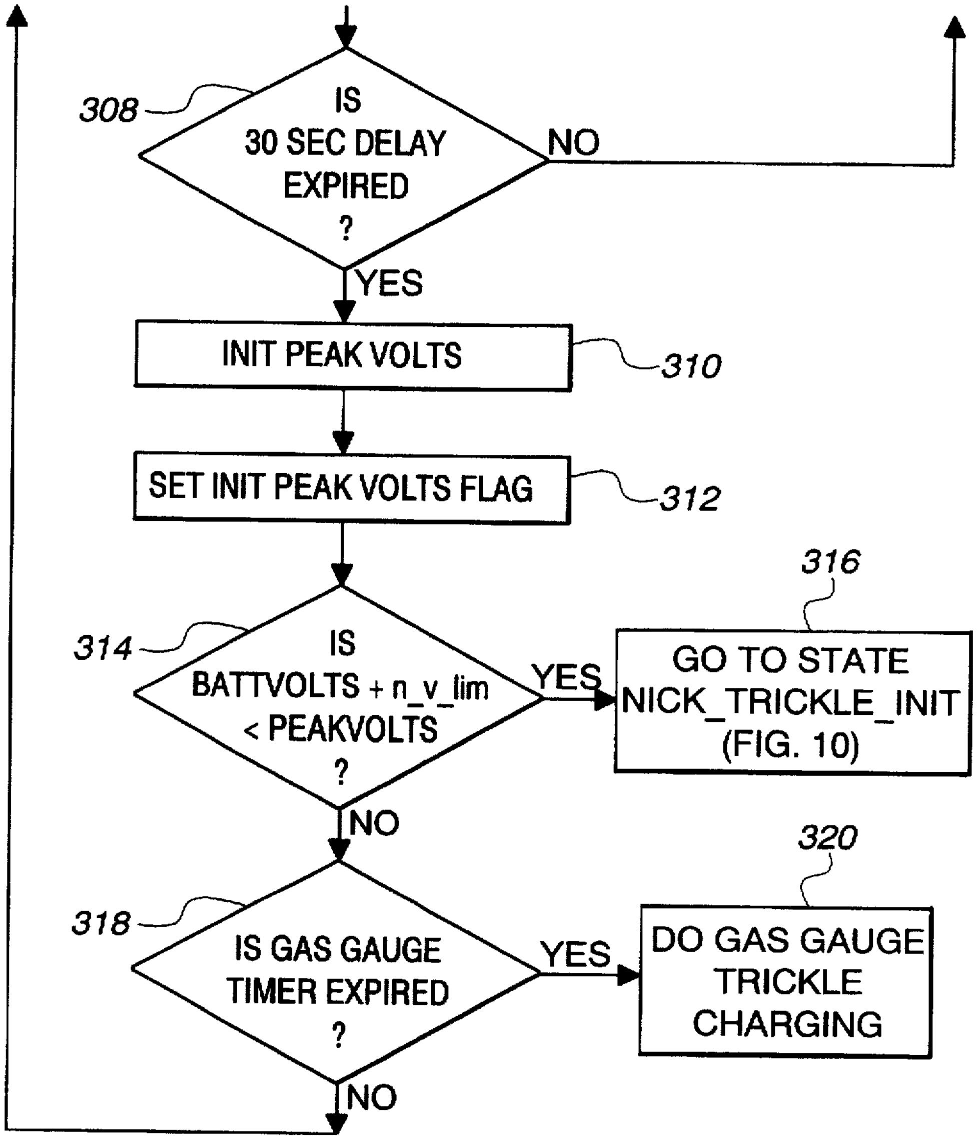
Figure 11B:
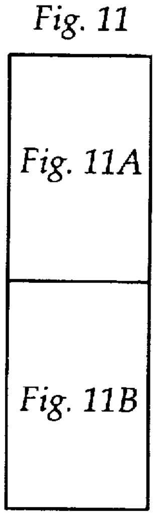

The flow chart for the maintenance charge state MTCE_INIT of the battery is illustrated in FIGS. 11A and 11B. Initially, in this state, the green LEDs, LED3 and LED6, are set in step 286 to indicate that the charger is in a maintenance charge mode. After the green LEDs are set, the maintenance current level is set in step 288 and the pocket state is initiated for maintenance state in step 290. After the pocket state is set in step 290, a maintenance timer is initiated for 30 seconds, for example, in step 292. The battery temperature in the front and rear pockets 24, 26 is measured in step 294 by way of the F-THERM and R-THERM signals, applied to the A-D input ports on the microcontroller 30 in step 294. The measured values of the battery temperature BATT TEMP are then compared with the minimum and maximum values from the table in steps 296 and 298. Should the battery temperature BATT TEMP either exceed the maximum temperature, TEMP MAX or be less than the minimum temperature TEMP MIN, the current is immediately set to zero in steps 300 and 302, respectively, and the system loops back to step 294 until the temperature returns to the recommended range between the maximum TEMP MAX and minimum TEMP MIN temperature values. Once the battery temperature is within the recommended temperature range, the system proceeds to step 306 and checks if the battery is in a HIGHZ condition in which the current is turned off and the thermistors are checked to determine if they are applicable (see FIG. 15). After the thermistors are checked, the system then checks in step 308 to determine if the 30-second maintenance timer delay has expired. If not, the system loops back to step 294 and continues checking the temperature. Once the maintenance timer has expired, the system initializes the peak voltage value in step 310 and sets a peak voltage flag in step 312. After the peak voltage value is initialized, the system checks in step 314 to determine if the battery voltage is less than the peak voltage minus a value from the battery or default tables. If so, the battery voltage is assumed to drop to a level requiring trickle charging and the system proceeds to the nickel charge mode NICK_TRICKLE_INIT in step 316. If not, the system proceeds to step 318 and determines if the gas gauge timer is expired. If not, the system loops back to step 294 and continues a maintenance charge on the battery while checking the temperature level. If so, charging is discontinued in step 320.

MEASURE

Figure 12A:
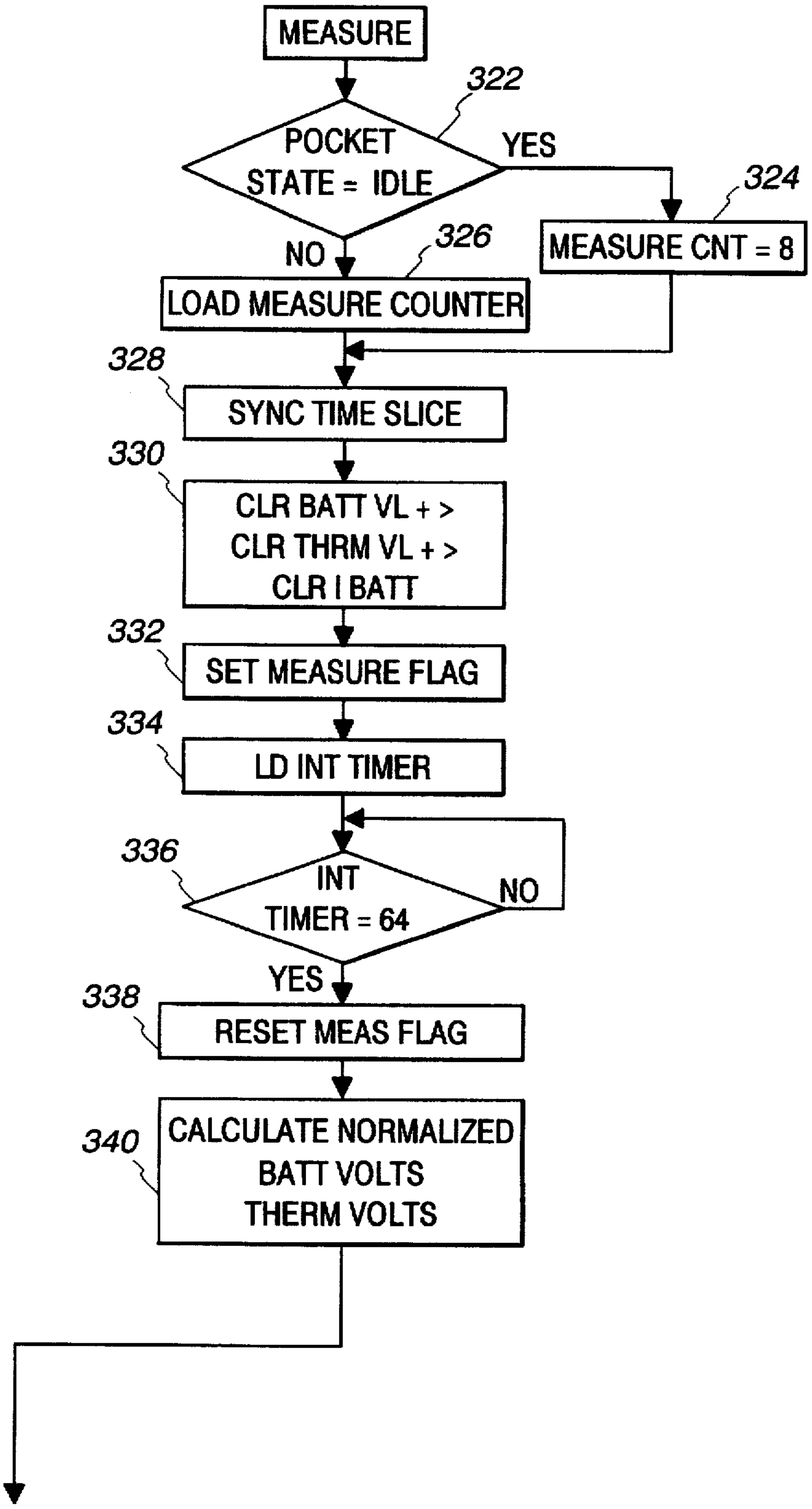
Figure 12B:
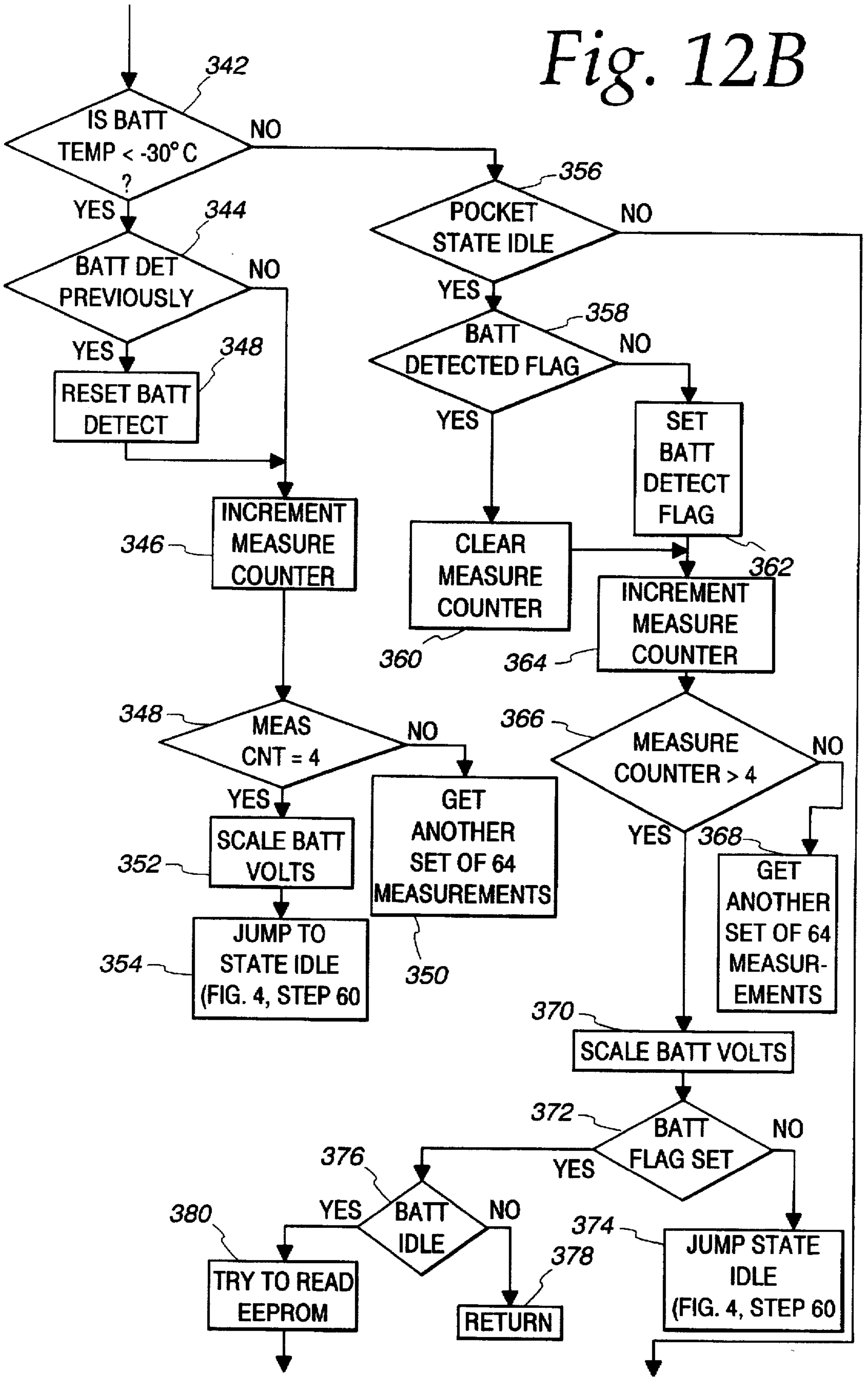
Figure 12C:
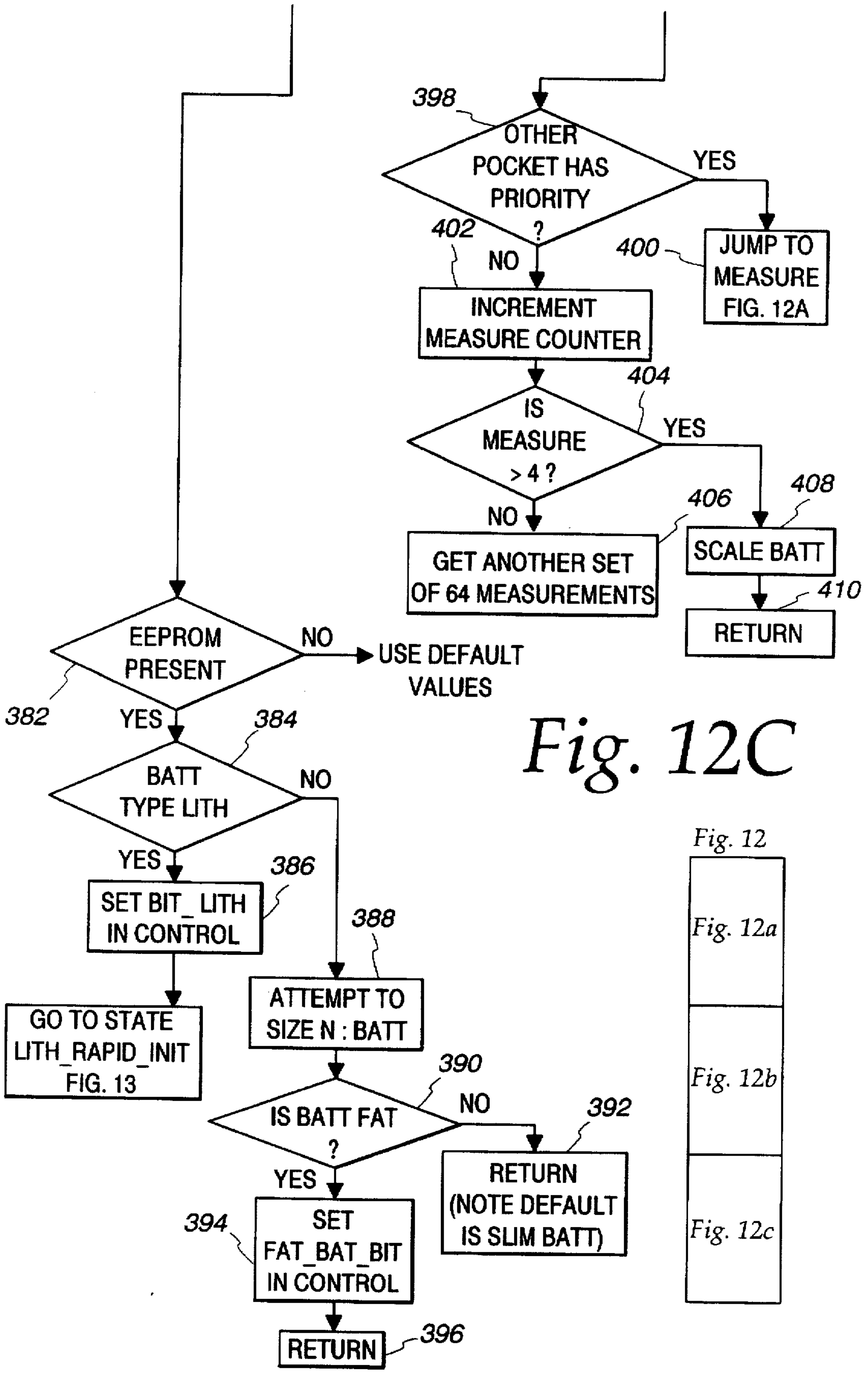

The flow chart for the subroutine MEASURE is illustrated in FIGS. 12A–12C. As mentioned above, the system is interrupt-driven by way of an internal hardware counter on board the microcontroller 30. The interrupt counter is used to interrupt the microcontroller 30 and read the battery parameter values for the front and rear pockets 24, 26, respectively. In particular, the battery voltage VBATT, current IBATT, and temperature level BATT TEMP for each of the pockets 24, 26 is continuously and alternatively read by the system on an interrupt level. In addition to requesting the various battery values, thermistor and currents to be read, the MEASURE subroutine also swaps contexts (alternates between pockets on a time division multiplex basis) at predetermined time slices, for example, every 62.5 milliseconds.

Referring to FIG. 12, the MEASURE subroutine first checks the pocket state to determine whether it is in an idle state in step 322. If the system is in an idle state, the measure counter is set to 8 in step 324 to enable four measurements to be made for each of the front and rear pockets 24, 26 to be made in a row in order to determine whether there are batteries in these pockets. If the system is not in an idle state, the measure counter is set to zero in step 326. As mentioned above in connection with the idle state, the system ascertains whether a battery is present in each of the front and rear pockets 24, 26.

Measurements are made on an interrupt basis. An interrupt is generated at every predetermined interrupt period, for example, 244 μsec. As will be discussed in more detail below, the MEASURE subroutine initiates battery parameter measures at every interrupt for a predetermined number of interrupts; for example, 64 sets of measurements are taken to provide an average value. Each time a set of 64 measurements is made, a measure counter is incremented. Measurements are made for a predetermined number of counts on the measure counter, for example, 4. Thus, with the exemplary parameters discussed above, a time slice is defined as 64 measurements×4 loops×0.244 μsec., or about 62.5 milliseconds; the amount of time allotted to each pocket 24, 26. Since base level measurements will be alternatively made in both the front and rear pockets 24, 26, the time slices for the particular pockets are synchronized in step 328. In other words, the interrupt counter for the active pocket is set to zero and the contexts (i.e. pockets) are swapped. After the time slice is initialized in step 328, previously read battery values, such as the voltage, thermistor and current values, are cleared from the system RAM in step 330. Once the previously read values are cleared, a measure flag is set in step 332 to indicate that the thermistor measurements for that context or pocket are to be taken. Once the measure flag is set, the interrupt counter is loaded in step 334. The interrupt counter is used for the A-D conversions. In particular, the interrupt timer allows 64 sets of A-D conversions to be made in step 336. The system continues looping until all 64 A-D conversion measurements have been made. Subsequently, in step 338, the measure flag is reset and the normalized values for the measured battery voltage and temperature are calculated in step 340. The constants from the EEPROM 32 (i.e., slope and offset values) (32) are factored into the measurements of the battery voltage VBATT and temperature measurements. Subsequently, in step 342, the system determines whether the battery temperature is less than −30° C. If so, the system determines in step 344 whether a battery was detected previously for the active pocket, by checking the battery detection flag indicating a battery present for that pocket. If no batteries have previously been detected, the system proceeds to step 346. If a battery was previously detected, the system resets the battery detection flag in step 348 before proceeding to step 346. As mentioned above, the system normally makes four loops to detect if a battery is present. Thus, once a battery is detected, the battery detection loops are reset. As mentioned above, the system makes loops for about four measurements. Thus, in step 346, the measure counter is incremented. In step 348, the system determine whether four sets of measurements have been taken. If not, an additional 64 A-D conversions are made in step 350. If all the measurements have been made, the battery voltage measurements are scaled in step 352 and the system goes to the idle state in step 354.

Figure 13A:
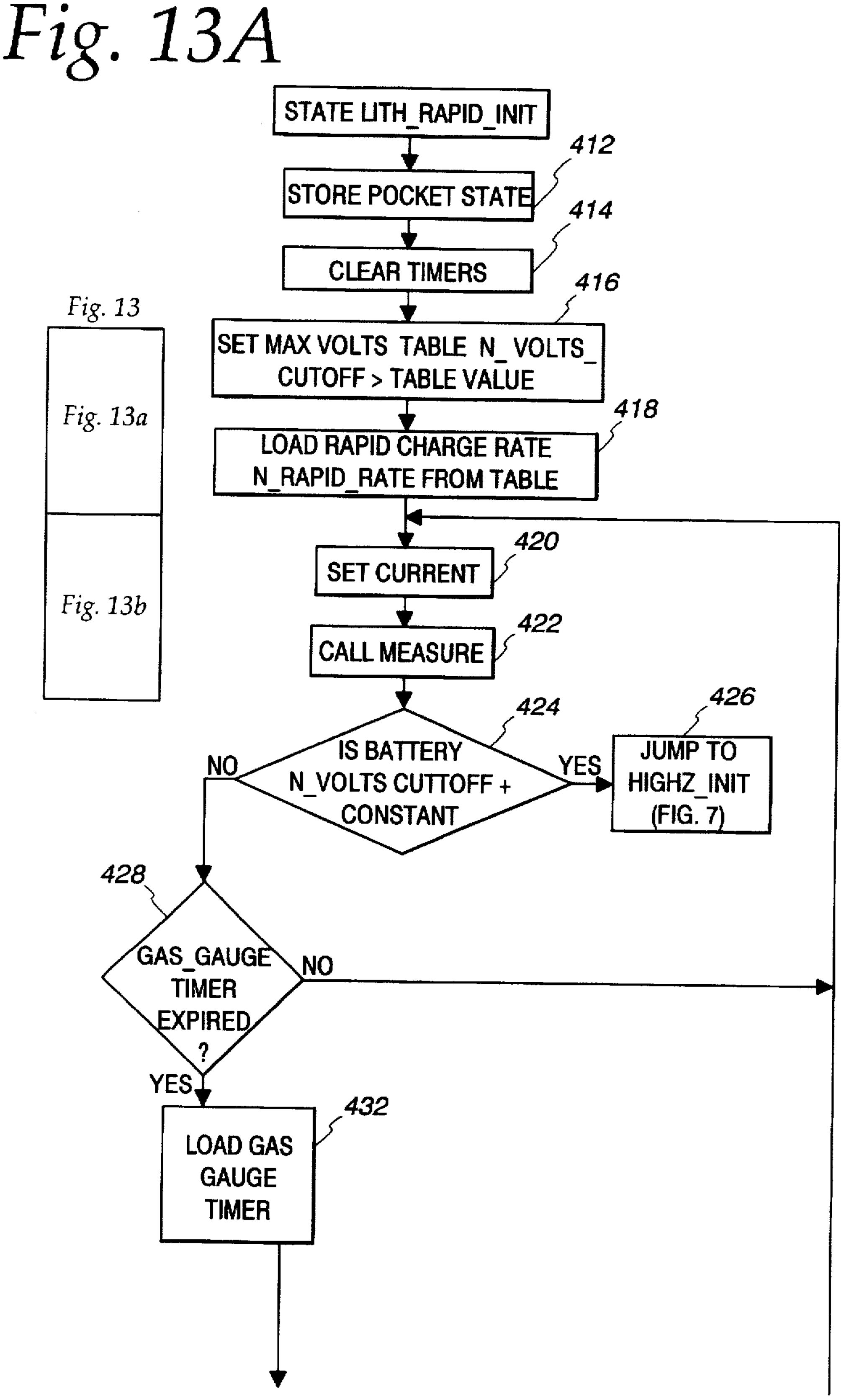

If the system determine in step 342 that the battery temperature is ≧−30° C., the system checks the pocket state in step 356 to determine if the system is in an idle state. If the system is in an idle state, the system checks in step 358 whether the battery detection flag has been set. If the battery detection flag has been set, the measure counter is cleared in step 360. If the battery detection flag has not been set, it is set in step 362 and the measure counter is incremented in step 364 to enable additional sets of 64 A-D measurements to be taken, until four sets of measurements have been taken, as indicated in steps 366 and 368, as discussed above. Once all the measurements are taken, the battery voltage is scaled in step 370. After the battery voltage measurements are scaled, the system checks in step 372 to determine whether the battery flag has been set. If not, the system goes to the idle state in step 374. If so, the system checks in step 376 whether the system is in the idle state. If not, the system returns in step 378. If the battery is in the idle state, a reading of the EEPROM in the battery pack is attempted in step 380. As indicated above, the battery pack EEPROM contains various information regarding the battery type and size available to the system over the −COMM and −SIZE terminals. Thus, in step 382, the system checks whether the battery pack EEPROM is present. If the battery pack EEPROM is present, the system checks whether the battery is a lithium type battery in step 384. If so, a bit is set in step 386 to indicate that the battery is a lithium type and the system goes to the LITH_RAPID_INIT state (FIG. 13A). If it is ascertained from the data read from the battery packEEPROM that the battery is not a lithium type, the system assumes that the battery is a nickel cadmium (NiCd) nickel metal hydride (NiMH) type battery and then attempts to read the size of the battery in step 388. As mentioned above, for smart battery packs, the battery charger 22 communicates with the battery pack by way of the −SIZE and −COMM terminals. Thus, once it is determined in step 388 that the battery is a nickel type battery, the system determines in step 390 whether the nickel battery is a large battery i.e., a battery where the −SIZE pin is shorted to the −BAT-+ line. If it is determined that the battery is not a large battery, a slim battery is assumed, and the system returns in step 392. If the battery is a large battery, a bit indicating a large battery is set in step 394, after which the program returns in step 396.

As mentioned above, the system determines the pocket state of the charger in step 356. If the pocket state is determined to not be in an idle state in step 356, the system checks in step 398 whether the other battery pocket or context has priority. If so, the system jumps back to the beginning of the measure subroutine in step 400, i.e., will not return from measure if the other pocket has priority. If the current pocket has priority, the measure counter is incremented in step 402. As mentioned above, four sets of measurements are made for the active pocket. Thus, in step 404, the system determines whether or not all four sets of measurements have been made. If not, the system gets additional measurements in step 406. If all of the measurements have been made, they are scaled in step 408, and the values are returned in step 410. The process is then repeated for the other pocket.

LITH_RAPID_INIT STATE

Figure 13B:
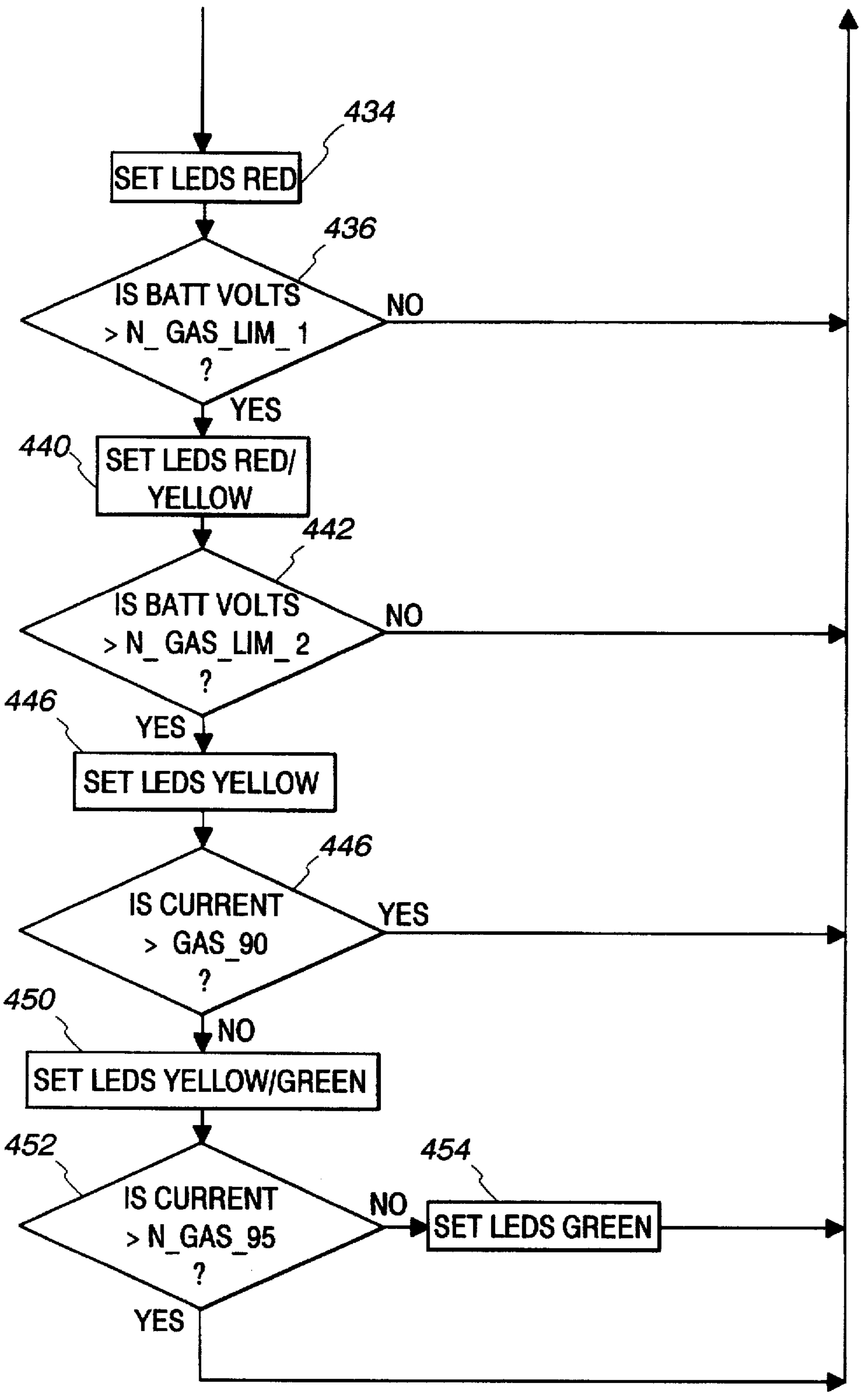
Figure 14:
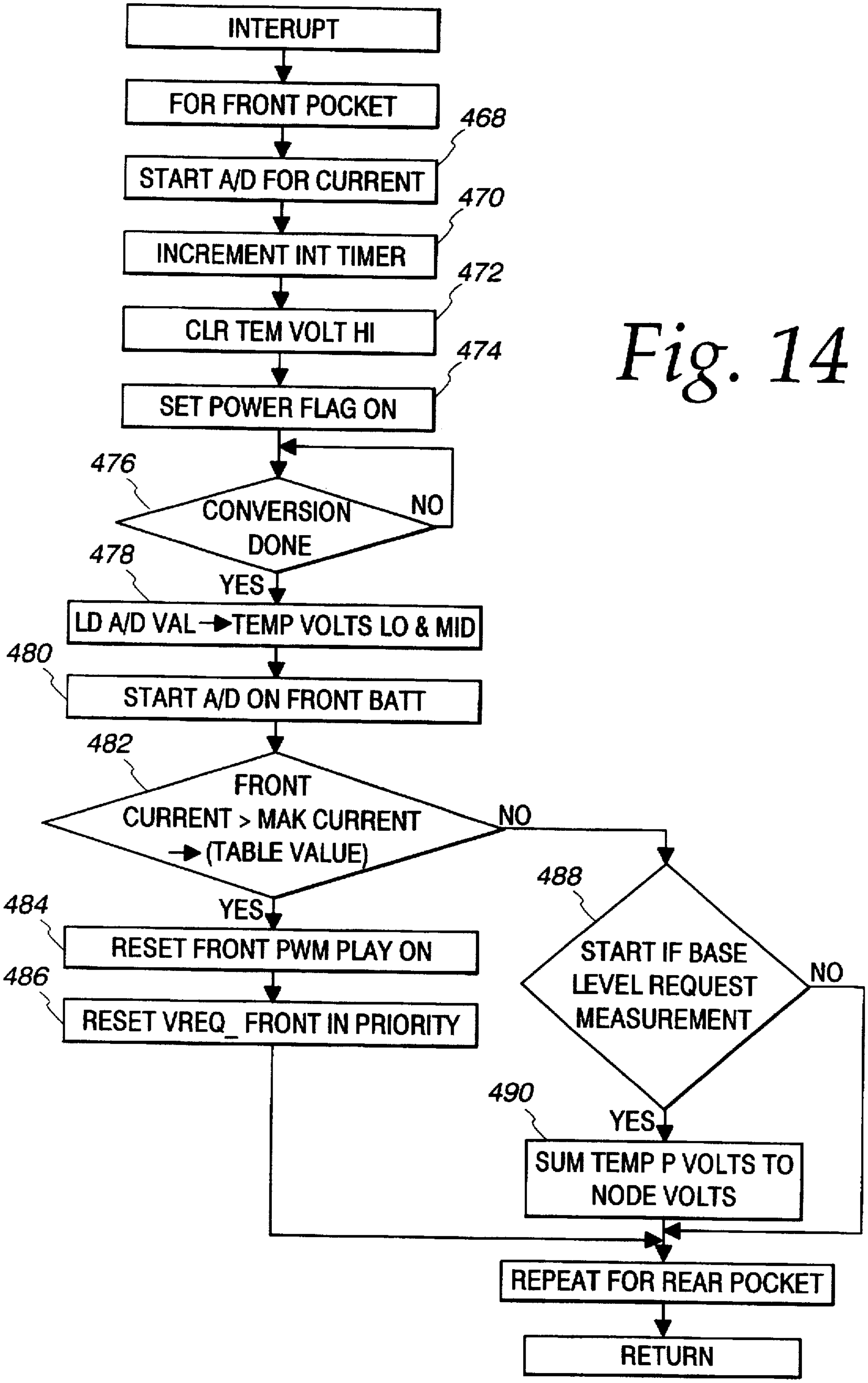

The flow charts for the LITH_RAPID_INIT STATE are illustrated in FIGS. 13A–13B. Referring first to FIG. 13A, the pocket state for the LITH_RAPID_INIT STATE is loaded initially in step 412. After the pocket state is loaded in step 412, all timers are cleared in step 414, and the maximum voltage for the lithium battery is selected from the tables stored in the battery EEPROM 32 in step 416. The charge rate N_RAPID_INIT obtained from the table in the EEPROM 32 is also read from the table in step 418. After the voltage and the charge rate have been selected, the current is set in step 420. Once the charging rate is set, the system calls the MEASURE subroutine in step 420 to make measurements, as discussed above, in order to enable the system to check whether the battery voltage VBATT is greater than the cut-off volts plus a constant in step 424. If the battery voltage is greater than the cut-off volts plus a constant, the system goes to the HIGHZ state in step 426. Otherwise, the system checks the gas gauge timer to determine whether it has expired in step 428. If the gas gauge timer has not expired, the system loops back to step 412. Otherwise, the time constant from the table for the gas gauge timer is loaded in step 432. Once the gas gauge timer is loaded, the red LED is turned on in step 434. The system then checks whether the battery voltage is greater than a constant N_GAS_LIM1. If not, the system loops back in step 436. If the battery voltage is not greater than the constant N_GAS_LIM1, the system loops back to step 412. Otherwise, the red and yellow LEDs are set in step 440, after which the system checks in step 442 whether the battery voltage is greater than a second constant N_GAS_LIM2. If the battery voltage is less than the second voltage limit N_GAS_LIM2, the system loops back to step 412. Otherwise, the yellow LEDs are set in step 446, after which the system checks the current. More particularly, in step 446, the system checks whether the current is greater than a predetermined value. If so, the system loops back to step 412. Otherwise, the yellow and green LEDs are set in step 450. Once the yellow and green LEDs are set, the system checks in step 452 whether the current is greater than a second constant N_GAS_95. If not, the green LEDs are set in step 454, and the system loops back to step 412. If the current is greater than the constant N_GAS_95, the system loops back to step 412 and step 458.

INTERRUPT

The flow chart for the interrupt routine is shown in FIGS. 14A and 14B. As mentioned above, the system is interrupt driven. Referring first to FIG. 14A, the battery voltage and current inputs are connected to the A-D ports on the microcontroller 30. The interrupt routine does both current and voltage regulation for both the front and rear pockets 24, 26, respectively. The interrupt routine also causes voltage measurements for the battery, as well as thermistor and resistor node measurements to be made for each of the pockets. After the A-D process is initiated, the interrupt counter is incremented in step 470. The TEMP VOLTS_HIGH value, which represents A-D conversion result registers is cleared in step 472 and a flag to turn on the A-D converters, as discussed above, is set in step 474. The system then continues looping in step 476 until the A-D conversion process is complete. Once the A-D process is complete, the A-D results registers values are stored as TEMP_VOLTS_LOW and TEMP_VOLTS_MID in step 478 after the conversion process for the front pocket in step 480. The system then checks in step 482 whether the current for the front pocket 24 is greater than the MAX current read from the table in the battery pack EEPROM in step 482. If so, the PWM flag is reset in step 484, thereby turning off the PWMS, which, in turn, disconnects the charging current from the battery source. Subsequently, in step 486, the front pocket priority flag is reset in step 486 to reset. If the current is greater than the maximum current from the table, any requested base level measurements are made in step 488 and converted to battery voltage in step 490, by summing it with the node volts. The process as described above is repeated for the rear pocket 26.

CHECK HIGHZ

Figure 15:
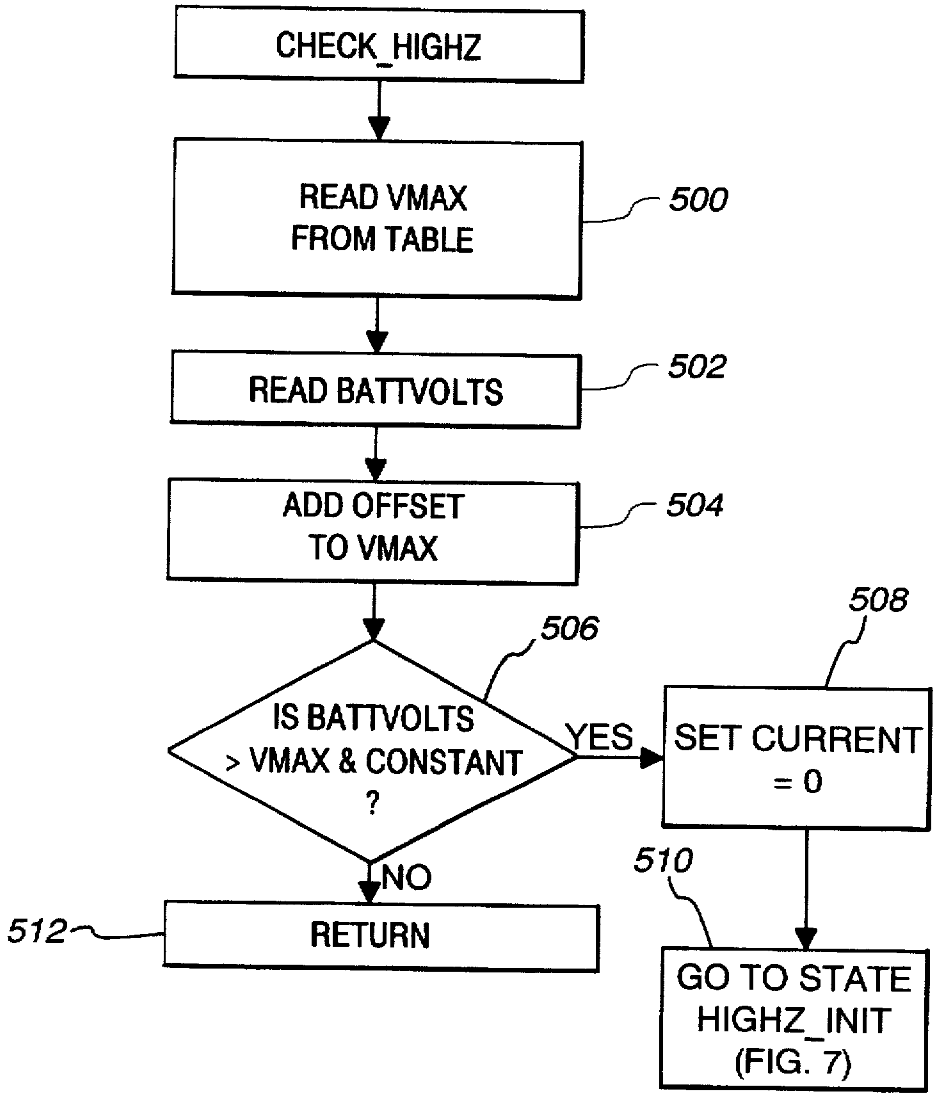

As discussed above, during certain conditions, a CHECK_HIGHZ subroutine is called in order to determine whether the thermistors are still providing accurate output levels. The CHECK_HIGHZ subroutine is illustrated in FIG. 15. Initially, in step 500, a value for the maximum battery voltage VMAX is read from the table in step 500. Once the value from the table for VMAx is read in step 500, the actual battery voltage is measured in step 502 in a manner as discussed above. An offset is added to VMAX in step 504, after which the battery voltage is compared with VMAX in step 506. If the battery voltage is greater than VMAX plus a constant, the system is assumed to be in a HIGHZ state. As such, the current is shut off in step 508 and the system goes to the HIGHZ_INIT state in step 510. Alternatively, the system returns in step 512.

SOURCE CODE

The source code for the system is provided in an Appendix. It should be understood that the flow charts are merely simplified representations of the source code for purposes of describing and illustrating the operation of the system. In the event of a conflict between the source code and the flow charts, the source code prevails.

Obviously, many modifications and variations of the present invention are possible in light of the above teachings. Thus, it is to be understood that, within the scope of the appended claims, the invention may be practiced otherwise than as specifically described above.

APPENDIX

```
bpl     macro
        call   SET_PWMS_OFF
L_bpl          nop
        endm
bpl     macro
        call   SET_PWMS_OFF
L_bpl          nop
        endm
dott    macro mVolts
        li       (mVolts)/625)
        lxyi     (mVolts)%64)
        endm
SET_LEDS       macro
LedControlBits
        leai   LedControlBits
        call   SET_LED_CONTROL
        endm
SW_COUNT              equ     183
HW_COUNT              equ
(1250 - SW_COUNT)
STACK_SAVE_START      equ
x'd0'
STACK_SAVE_SIZE               equ
8
CURR_START            equ
x'70'
WAIT_START            equ
((STACK_SAVE_START +
CURR_START)   2)
N_CRITICAL_SIZE               equ
6
SWAP_SIZE             equ
(CURR_START - WAIT_START)
CMD_READ_DATA_CRC     equ
x'c3'
CMD_SKIP_ROM                  equ
x'cc'
TYPE_LITH             equ     1
x_batt_mult           equ     0
x_batt_offset                 equ
2
x_therm_mult                  equ
4
x_therm_offset                equ
6
n_rom_cksum           equ     0
d_type_id             equ     1
n_volts_cutoff                equ
2
n_v_tcomp_hot                 equ
3
n_v_tcomp_cold                equ
4
n_temp_cut_in                 equ
5
n_temp_cut_off                equ
6
n_capacity            equu    7
n_rapid_rate_hi               equ
8
n_rapid_rate_lo               equ
9
td_rapid              equ     10
n_dtdt_lim            equ     11
td_dtdr                       equ
12
n_v_min                       equ
15
n_v_lim_lt            equ     16
n_gas_gage_lim_1      equ     17
n_gas_gage_lim_2      equ     18
n_gas_gage_90_hi      equ     19
n_topoff_rate_hi      equ     19
n_gas_gage_90_lo      equ     20
n_topoff_rate_lo      equ     20
n_gas_gage_95                 equ
21
n_maint_rate_lo               equ
21
td_gg_period                  equ
22
td_gas_gage           equ     23
n_v_limit_hi                  equ
24
CHAN_NODE_FRONT               equ
0
CHAN_THERM_FRONT      equ     1
CHAN_THERM_REAR               equ
2
CHAN_BATT_FRONT               equ
3
CHAN_BATT_REAR                equ
4
CHAN_NODE_REAR                equ
5
BITNUM_PRIORITY_FRONT         equ
3
BITNUM_PRIORITY_REAR          equ
2
BITNUM_VREG_FRONT     equ     1
BITNUM_VREG_REAR      equ     0
MASK_PRIORITY_FRONT           equ
b'1000'
MASK_PRIORITY_REAR            equ
b'0100'
MASK_VREG_FRONT               equ
b'0010'
MASK_VREG_REAR                equ
b'0001'
BITNUM_FRONT_FLAG     equ     3
BITNUM_MEASURE_FLAG           equ
2
BITNUM_ADL_FLAG               equ
1
BITNUM_SIGN_BIT               equ
MASK_SIGN_BIT                 equ
MASK_FRONT_FLAG               equ
b'1000'
BITNUM_DELTAT_ENABLED         equ
.
BITNUM_5MIN_FLAG      equ     0
MASK_BATT_CNT                 equ
b'0011'
BITNUM_BATT_FAT               equ
3
BITNUM_BATT_EEPROM    equ     2
BITNUM_BATT_LITH      equ     1
BITNUM_LED_HHZ_CONTROL        equ
0
BITNUM_LED_2HZ_CONTROL        equ
3
BITNUM_LED_RED_CONTROL        equ
2
BITNUM_LED_YEL_CONTROL        equ
1
BITNUM_LED_GRN_CONTROL        equ
0
LED_HHZ                       equ
b'00010000'
LED_2HZ                       equ
b'00001000'
LED_4HZ                       equ
b'00011000'
LED_RED                       equ
b'00000100'
LED_YEL                       equ
b'00000010'
LED_GRN                       equ
b'00000001'
STATE_IDLE            equ
b'0000'
STATE_NICK_RAPID      equ
b'0001'
STATE_NICK_TRICKLE            equ
b'0010'
STATE_NICK_MTCE               equ
b'0011'
STATE_HIGHZ           equ
b'1000'
STATE_VMIN            equ
b'1001'
STATE_TPEND           equ
b'1010'
STATE_CALIB           equ
b'1011'
STATE_LITH_RAPID      equ
b'1100'
STATE_REVAL           equ
b'1111'
MASK_LED_GRN_REAR     equ
b'0001'
MASK_LED_YEL_REAR     equ
b'0010'
MASK_LED_GRN_FRONT            equ
b'1000'
MASK_LED_YEL_FRONT            equ
b'0001'
MASK_LED_RED_FRONT            equ
b'0010'
MASK_LED_RED_REAR     equ
b'0100'
MASK_EEPROM_DATA      equ
b'1000'
MASK_PWM_REAR                 equ
b'0001'
MASK_PWM_FRONT                equ
b'0010'
BITNUM_SIZE_FRONT     equ     0
BITNUM_SIZE_REAR      equ     1
MASK_SIZE_FRONT               equ
b'0001'
MASK_SIZE_REAR                equ
b'0010'
MASK_EEPROM_CLOCK     equ
b'0100'
MASK_COMM_REAR                equ
b'0100'
MASK_COMM_FRONT               equ
b'1000'
OtherBPlusLo                  equ
x'02'
OtherBPlusMid                 equ
x'03'
OtherBPlusHi                  equ
x'04'
MyMaxCurLo            equ
x'02'
MyMaxCurMid           equ
x'03'
MyMaxCurHi            equ
x'04'
BattTCLo              equ
x'02'
BattTCMid             equ
x'03'
BattTCHi              equ
x'04'
Cnt                   equ
x'05'
Priority              equ
x'06'
OFlags                        equ
x'07'
IntTimerLo            equ
x'48'
IntTimerHi            equ
x'49'
SyncTimerLo           equ
x'4a'
SyncTimerMid                  equ
x'4b'
SyncTimerHi           equ
x'4c'
TmpLo                 equ
x'4d'
TmpMid                        equ
x'4e'
TmpHi                 equ
x'4f'
BattVoltsFrac                 equ
x'4d'
ThermVoltsFrac                equ
x'4e'
NodeVoltsFrac                 equ
x'4f'
FarmLo                        equ
x'50'
FarmMid                       equ
x'51'
FarmHi                        equ
x'52'
BattVoltsLo           equ
x'53'
BattVoltsMid                  equ
x'54'
BattVoltsHi           equ
x'55
ThermVoltsLo                  equ
x'56'
ThermVoltsMid                 equ
x'57'
ThermVoltsHi                  equ
x'58'
NodeVoltsLo           equ
x'59'
NodeVoltsMid                  equ
x'5a'
NodeVoltsHi           equ
x'5b'
JmdLo                 equ
x'5c'
JmdMid                        equ
x'5d'
JmdHi                 equ
x'5e'
DataLo                        equ
x'5c'
DataHi                        equ
x'5d'
CrcLo                 equ
x'5e'
CrcHi                 equ
x'5f
Int12Lo                       equ
x'60'
Int12Mid              equ
x'61'
Int12Hi                       equ
x'62'
AllowCurLo            equ
x'60'
AllowCurMid           equ
x'61'
AllowCurHi            equ
x'62'
TempVoltsLo           equ
x'63'
TempVoltsMid                  equ
x'64'
TempVoltsHi           equ
x'65'
F_MaxCurrentLo                equ
x'66'
F_MaxCurrentHi                equ
x'67
R_MaxCurrentLo                equ
x'68'
R_MaxCurrentHi                equ
x'69'
F_MaxVoltageLo                equ
x'6a
F_MaxVoltageMid               equ
x'6b
F_MaxVoltageHi                equ
x'6c'
R_MaxVoltageLo                equ
x'6d
R_MaxVoltageMid               equ
x'6e'
R_MaxVoltageHi                equ
x'6f'
ReqCurrentLo                  equ
x'70'
ReqCurrentMid                 equ
x'71'
ReqCurrentHi                  equ
x'72'
MeasCnt                       equ
x'72'
PocketState           equ
x'73'
ControlLo             equ
x'74'
ControlHi             equ
x'75'
OldLo                 equ
x'76'
OldMid                        equ
x'77'
OldHi                 equ
x'78'
PeakVoltsLo           equ
x'76'
PeakVoltsMid                  equ
x'77'
PeakVoltsHi           equ
x'78'
RecentLo              equ
x'79'
RecentMid             equ     x'7a'
RecentHi              equ
x'7b'
SaveCurLo             equ
x'79'
SaveCurMid            equ
x'7a'
SaveCurHi             equ
x'7b'
Timer1SecLo           equ
x'7c'
Timer1SecHi           equ
x'7d'
TimerGasLo            equ
x'7e'
TimerGasHi            equ
x'7f'
XB2Lo                 equ
x'80'
XB2Mid                        equ
x'81'
XB2Hi                 equ
x'82'
XT2Lo                 equ
x'83'
XT2Mid                        equ
x'84'
XT2Hi                 equ
x'85
MultLo                        equ
x'86
MultMid                       equ
x'87
MultHi                        equ
x'88'
OffsetLo              equ
x'89'
OffsetMid             equ
x'8a
OffsetHi              equ
x'8b
Buf1Lo                        equ
x'80
Buf1Hi                        equ
x'81
Buf2Lo                        equ
x'82'
Buf2Hi                        equ
x'83'
Buf3Lo                        equ
x'84'
Buf3Hi                        equ
x'85'
Buf4Lo                        equ
x'86'
Buf4Hi                        equ
x'87'
Buf5Lo                        equ
x'89'
Buf5Hi                        equ
x'89'
Buf6Lo                        equ
x'8a'
Buf6Hi                        equ
x'8b'
Buf7Lo                        equ
x'8c'
Buf7Hi                        equ
x'8d'
Buf8Lo                        equ
x'8e'
Buf8Hi                        equ
x'8f'
Timer256SecLo                 equ
x'90'
Timer256SecHi                 equ
x'91'
MyFlags                       equ
x'92'
Buf9Lo                        equ
x'94'
Buf9Hi                        equ
x'95'
Buf10Lo                       equ
x'96'
Buf10Hi                       equ
x'97'
Buf11Lo                       equ
x'98'
Buf11Hi                       equ
x'99'
Buf12Lo                       equ
x'9a'
Buf12Hi                       equ
x'9b'
Buf13Lo                       equ
x'9c'
Buf13Hi                       equ
x'9d'
Buf14Lo                       equ
x'9e'
Buf14Hi                       equ
x'9f'
        absolute    x'000'
        jmp    START
ERROR1:        jmp    ERROR1
ERROR2:        jmp    ERROR2
ERROR3:        jmp    ERROR3
ERROR4:        jmp    ERROR4
ERROR5:        jmp    ERROR5
        org    x'00c'
        jmp    HDW_TIMER_INT
SYNC:
        lxyi   SyncTimerLo
        call   INC12
        call   CALC_BPLUS_VOLTS
        lxyi   OtherBPlusLo
        call   COPY12
```

```
        li      b'1100'
        nd      SyncTimerLo
        jnz     DONE_TIMERS
        call    CHECK_TIMER1
        jz      CHTGAS
        lxyi    Timer1SecLo
        call    DEC8
CHTGAS          call
CHECK_TIMERGAS
        jz      SYNC_A
        call    CHECK_PRIORITY
        jz      SYNC_A
        lxyi    TimerGasLo
        call    DEC8
SYNC_A
        ld      SyncTimerMid
        jnz     DONE_TIMERS
        call    CHECK_TIMERGAS
        jz      SYNC_B
        call    CHECK_PRIORITY
        jnz     SYNC_B
        lxyi    TimerGasLo
        call    DEC8
SYNC_B
        ld      SyncTimerHi
        jnz     DONE_TIMERS
        call    CHECK_TIMER256
        jz      DONE_TIMERS
        lxyi    Timer256SecLo
        call    DEC8
DONE_TIMERS:
SYLP    call    WATCHDOG
        lbd     IntTimerLo
        ceai    x'f0'
        jnz     SYLP
        ld      GFlags
        jbz
BITNUM_FRONT_FLAG, SYNC_C
        call    SERVICE_LEDS
SYNC_C
        edi     7,0
        lxyi    WAIT_START
        exax
        exay
        lxyi    CURR_START
        leai    (N_CRITICAL_SIZE
- 1)
        call    SWAP_NIBBLES
        li      MASK_FRONT_FLAG
        xd      GFlags
        std     GFlags
        edi     0,2
        ld      GFlags
        jbnz
BITNUM_FRONT_FLAG  SYNC_D
        call    SERVICE_LEDS
SYNC_D:
        leai    (WAIT_START -
CURR_START - N_CRITICAL_SIZE
- 1)
        call    SWAP_NIBBLES
        lxyi    (256 -
STACK_SAVE_SIZE)
        leai    (STACK_SAVE_SIZE
- 1)
        call    SWAP_NIBBLES
SYLOOP:         call    WATCHDOG
        lbd     IntTimerLo
        acea
        jnc     SYLOOP
        leai    (256 - SW_COUNT)
        stbd    IntTimerLo
        ret
SERVICE_LEDS:
        li      7
        std     Cnt
        ld      ControlLo
        jbz
BITNUM_LED_2HZ_CONTROL,
CHKHHZ
        ld      ControlHi
        jbnz
BITNUM_LED_HHZ_CONTROL,
DO4HZ
        ld      SyncTimerLo
        jbz     2, CHKHHZ
        rmd     Cnt
CHKHHZ:         ld      ControlHi
        jnz
BITNUM_LED_HHZ_CONTROL,
LEDMSK
        ld      SyncTimerMid
        jbz     0, LEDMSK
        rmd     Cnt
        jmp     LEDMSK
DO4HZ   ld      SyncTimerLo
        jbz     1  LEDMSK
        rmd     Cnt
LEDMSK          ld      ControlLo
        nd      Cnt
        exe
        ld      GFlags
        jbnz
BITNUM_FRONT_FLAG, F_LEDS
R_LEDS  exe
        sout    port0,
(MASK_LED_GRN_REAR |
MASK_LED_YEL_REAR)
        sout    port1,
MASK_LED_RED_REAR
CHKR_G:         jbz
BITNUM_LED_GRN_CONTROL,
CHKR_Y
        rout    port0,
MASK_LED_GRN_REAR
CHKR_Y:         jbz
BITNUM_LED_YEL_CONTROL,
CHKR_R
```

```
        rout    port0
MASK_LED_YEL_REAR
CHKR_R          jbz
BITNUM_LED_RED_CONTROL,
RLDONE
        rout    port1,
MASK_LED_RED_REAR
RLDONE:         ret
F_LEDS  exe
        sout    port0,
MASK_LED_GRN_FRONT
        sout    port1,
(MASK_LED_YEL_FRONT |
MASK_LED_RED_FRONT)
CHKF_G:         jbz
BITNUM_LED_GRN_CONTROL
CHKF_Y
        rout    port0
MASK_LED_GRN_FRONT
CHKF_Y:         jbz
BITNUM_LED_YEL_CONTROL,
CHKF_R
        rout    port1,
MASK_LED_YEL_FRONT
CHKF_R          jbz
BITNUM_LED_RED_CONTROL
FLDONE
        rout    port1,
MASK_LED_RED_FRONT
FLDONE          ret
START:
        li      x'f'
        out     port0, b'1111'
        out     port1, b'1111'
        out     port2, b'1100'
        out     port4, b'1100'
        out     port5, b'1111'
        out     portd, b'0000'
        out     porte, b'0000'
        out     portf, b'0110'
        lxyi    x'48'
CLR_A:          li      0
CR_LOOP:
        sticy
        jnz     CR_LOOP
        lx
        ai      1
        stx
        jnz     CLR_A
        sticy
        sticy
        sticy
        sticy
        sticy
        sticy
        sticy
        sticy
        leai    (256-HW_COUNT)
        wttb
        leai    x'18'
        wttc
        leai
(STACK_SAVE_START +
STACK_SAVE_SIZE)
        wtsp
        call    SW_INIT1
MAIN:
        call    DUMP_EEPROM
DUMP:   nop
STATE_IDLE_INIT
        rmd     PocketState
        rmd     ControlLo
        rmd     ControlHi
        call    SET_ZERO_CURRENT
        li      x_batt_mult
        lxyi    ParmLo
EELOOP:         call    WATCHDOG
        call    X_READ12
        pshea
        jz      CHK10
        call    INIT_EEPROM
        SET_LEDS (LED_4HZ |
LED_RED | LED_YEL | LED_GRN)
        jmp     CWDG
CHK10           l
        od      ParmMid
        jnz     CWDG
        li      ~
        nd      ParmHi
        jnz     CWDG
        SET_LEDS (LED_4HZ |
LED_RED | LED_YEL | LED_GRN)
CWDG:   popea
        call    WATCHDOG
        ai      2
        ci      6
        jnz     EELOOP
        li      9
        std     OldLo
MEEP:   call    MEASURE
        ld      ControlLo
        ci      x'f'
        jz      STATE_IDLE_INIT
        SET_LEDS (LED_RED)
        ld      ControlHi
        jbnz
BITNUM_BATT_EPROM, BUFFEM
        dcmd    OldLo
        jnz     MEEP
        jmp     STATE_REVAL_INIT
BUFFEM:
        leai    25
BUFF_LOOP:
        pshea
        lxyi
TABLE_BUF_POINTER
        call    READ_TABLE_BYTE
        ceai    0
```

```
        jz      BDEC
        pshea
        popxy
        popea
        pshea
        pshxy
        call    DS2502_READ_BYTE
        jz      BUFIT
        call    CLEAN_STACK
        jmp     STATE_IDLE_INIT
BUFIT           popxy
        sticy
        exe
        st
BDEC    popea
        dcea
        jnc     BUFF_LOOP
STATE_REVAL_INIT:
        li      STATE_REVAL
        std     PocketState
        li      0
        call    CHECK_HIGHZ
AAAA.   call    CALC_BATT_TC
        leai    n_v_min
        call    READ_PARM
        call    COMPARE12
        jc      STATE_VMIN_INIT
        lxyi    ThermVoltsLo
        leai    n_temp_cut_in
        call    READ_PARM
        call    COMPARE12
        jnc     STATE_TPEND_INIT
        call    TCUTOFFS
        jc      STATE_TPEND_INIT
        ld      ControlHi
        jbz
BITNUM_BATT_LITH, NRAP
        jmp
STATE_LITH_RAPID_INIT
NRAP    jmp
STATE_NICK_RAPID_INIT
STATE_TPEND_INIT:
        li      STATE_TPEND
        std     PocketState
        SET_LEDS (LED_2HZ |
LED_YEL)
        call    SET_ZERO_CURRENT
TPLOOP  call            MEASURE
        lxyi    ThermVoltsLo
        leai    n_temp_cut_in
        call    READ_PARM
        call    COMPARE12
        jnc     TPLOOP
        call    TCUTOFFS
        jc      TPLOOP
        jmp     STATE_REVAL_INIT
STATE_HIGHZ_INIT:
        li      STATE_HIGHZ
        std     PocketState
        SET_LEDS (LED_GRN)
        call    SET_ZERO_CURRENT
LLHZ    call    MEASURE
        jmp     LLHZ
STATE_VMIN_INIT:
        li      STATE_VMIN
        std     PocketState
        SET_LEDS (LED_2HZ |
LED_YEL)
        leai    n_volts_cutoff
        call    READ_PARM
        call    SET_MAX_VOLTAGE
        leai    n_gas_gage_90_hi
        call    READ_PARM
        call    SET_CURRENT
LVMIN:          call
CHECK_CURRENT
        call    MEASURE
        call    CHECK_VREG_FLAG
        jnz     STATE_HIGHZ_INIT
        leai    n_v_min
        call    READ_PARM
        li      3
        ad      ParmMid
        std     ParmMid
        jnc     CBP
        icmd    ParmHi
CBP:    call    CALC_BATT_TC
        leai    ParmLo
        call    COMPARE12
        jc      LVMIN
        jmp     STATE_REVAL_INIT
        org     x'202'
STATE_LITH_RAPID_INIT:
        li      STATE_LITH_RAPID
        std     PocketState
        SET_LEDS (LED_RED)
        call    CLEAR_TIMER1
        leai    n_volts_cutoff
        call    READ_PARM
        call    SET_MAX_VOLTAGE
        leai    n_rapid_rate_hi
        call    READ_PARM
        call    SET_CURRENT
LRAPID_LOOP:
        call    CHECK_CURRENT
        call    MEASURE
        li      8
        call    CHECK_HIGHZ
CHKTM1          call
CHECK_TIMER1
        jnz     LRAPID_LOOP
        leai    td_gas_gage
        call    READ_PARM
        call    LOAD_TIMER1
        SET_LEDS (LED_RED)
        lxyi    BattVoltsLo
        leai    n_gas_gage_lim_1
        call    READ_PARM
```

```
        call    COMPARE12
        jc      LRAPID_LOOP
        SET_LEDS (LED_RED |
LED_YEL)
        leai    n_gas_gage_lim_2
        call    READ_PARM
        call    COMPARE12
        jc      LRAPID_LOOP
        SET_LEDS (LED_YEL)
        lxyi    NodeVoltsLo
        leai    n_gas_gage_90_hi
        call    READ_PARM
        call    COMPARE12
        jnc     LRAPID_LOOP
        SET_LEDS (LED_YEL
LED_GRN)
        leai    n_gas_gage_95
        call    READ_PARM
        call    COMPARE12
        jnc     LRAPID_LOOP
        SET_LEDS (LED_GRN)
        jmp     LRAPID_LOOP
STATE_NICK_RAPID_INIT
        li      STATE_NICK_RAPID
        std     PocketState
        rmd     MyFlags
        sbmd
BITNUM_SMIN_FLAG, MyFlags
        leai    19
        stbd    TimerGasLo
        leai    NEG_30DEGC
        lxyi    OldLo
        call    READ_TABLE12
        lxyi    RecentLo
        call    READ_TABLE12
        leai    td_dtdt
        call    READ_PARM
        call    LOAD_TIMER1
        SET_LEDS (LED_RED)
        leai    td_rapid
        call    READ_PARM
        call    LOAD_TIMER256
        leai    n_volts_cutoff
        call    READ_PARM
        call    SET_MAX_VOLTAGE
        leai    n_rapid_rate_hi
        call    READ_PARM
        call    SET_CURRENT
        call    CHECK_CURRENT
GASGIT
        call    SET_PRIORITY
        call    CHECK_CURRENT
        jnc     SETGAS
        SET_LEDS (LED_HHZ
LED_YEL)
        jmp     ENDGAG
SETGAS          leai
td_gas_gage
        call    READ_PARM
        call    LOAD_TIMERGAS
LPGAGE
        call    MEASURE
        call    CHECK_TIMERGAS
        jnz     LPGAGE
        call    CLEAR_PRIORITY
        SET_LEDS (LED_RED)
        lxyi    BattVoltsLo
        leai    n_gas_gage_lim_1
        call    READ_PARM
        call    COMPARE12
        jc      ENDGAG
        SET_LEDS (LED_RED
LED_YEL)
        leai    n_gas_gage_lim_2
        call    READ_PARM
        call    COMPARE12
        jc      ENDGAG
        SET_LEDS (LED_YEL)
ENDGAG:         call    MEASURE
        call    CHECK_CURRENT
        jnc     SETTG
        sbmd
BITNUM_LED_HHZ_CONTROL,
ControlHi
SETTG           leai
td_gg_period
        call    READ_PARM
        call    LOAD_TIMERGAS
NRAPID_LOOP:
        call    MEASURE
        call    CHECK_CURRENT
        sbmd
BITNUM_LED_HHZ_CONTROL,
ControlHi
        jc      NRAPID_LOOP
CHKST           rbmd
BITNUM_LED_HHZ_CONTROL,
ControlHi
        call    CHECK_TIMER256
        jnz     CHIH
        jmp
STATE_NICK_TRICKLE_INIT
CHIH:   li      8
        call    CHECK_HIGHZ
        call    CALC_BATT_TC
        leai    n_v_min
        call    READ_PARM
        call    COMPARE12
        jnc     CHNVL
        jmp     STATE_VMIN_INIT
CHNVL           leai
n_v_limit_hi
        call    READ_PARM
        call    COMPARE12
        jc      CHDLTA
        ld      MyFlags
```

```
        jbz
BITNUM_5MIN_FLAG,
STATE_NICK_TRICKLE_INIT
        jmp     STATE_MTCE_INIT
CHDLTA          call
CHECK_DELTA_T
        leai    n_temp_cut_off
        call    READ_PARM
        lxyi    ThermVoltsLo
        call    COMPARE12
        jnc     CHKIN
        jmp
STATE_NICK_TRICKLE_INIT
CHKIN           leai
n_temp_cut_in
        call    READ_PARM
        call    COMPARE12
        jc      CGAS
        jmp     STATE_TREND_INIT
CGAS    call    CHECK_TIMERGAS
        jc      CL5M
        jmp     NRAPID_LOOP
CL5M    rbmd
BITNUM_5MIN_FLAG, MyFlags
        jmp     GASGIT
STATE_NICK_TRICKLE_INIT
        rmd     MyFlags
        sbmd
BITNUM_5MIN_FLAG, MyFlags
        leai    19
        stbd    TimerGasLo
        SET_LEDS (LED_YEL |
LED_GRN)
        leai    30
        call    LOAD_TIMER1
        leai    n_topoff_rate_hi
SAVCUR  call            READ_PARM
        lxyi    SaveCurLo
        call    COPY12
        li
STATE_NICK_TRICKLE
        std     PocketState
        lxyi    PeakVoltsLo
        call    CLEAR12
NTRICKLE_LOOP
        leai    SaveCurLo
        lxyi    ParmLo
        call    COPY12
NO_CUR_LOOP
        call    SET_CURRENT
        call    CHECK_CURRENT
        call    MEASURE
        leai    n_temp_cut_off
        lxyi    ThermVoltsLo
        call    READ_PARM
        call    COMPARE12
        jc      CUROFF
        leai    n_temp_cut_in
        call    READ_PARM
        call    COMPARE12
        jc      NHI2
CUROFF          lxyi    ParmLo
        call    CLEAR12
        jmp     NO_CUR_LOOP
NHI2    li
        call    CHECK_HIGH2
        lxyi    PeakVoltsLo
        leai    BattVoltsLo
        call    COMPARE12
        jnc     CPBPNV
        call    COPY12
CPBPNV          leai    n_v_lim_lt
        call    READ_PARM
        call    COMPLEMENT12
        lxyi    ParmLo
        call    INC12
        leai    PeakVoltsLo
        call    ADD12
        leai    BattVoltsLo
        call    COMPARE12
        jc      SETRV
        call    CHECK_TIMER1
        jnz     C2GAS
        jmp     STATE_REVAL_INIT
SETRV           leai    30
        call    LOAD_TIMER1
C2GAS           call
CHECK_TIMERGAS
        jnz     JNTL
        ld      MyFlags
        jbnz
BITNUM_5MIN_FLAG,
STATE_MTCE_INIT
        leai    n_gas_gage_lim_2
        call    READ_PARM
        li      4
        ad      ParmMid
        std     ParmMid
        jnc     STMV
        icmd    ParmHi
STMV    call    SET_MAX_VOLTAGE
STPR    call    SET_PRIORITY
        leai    n_rapid_rate_hi
        call    READ_PARM
        call    SET_CURRENT
        call    CHECK_CURRENT
        jc      ENDGAT
        leai    td_gas_gage
        call    READ_PARM
        call    LOAD_TIMERGAS
LPGAT:          call    MEASURE
        call    CHECK_TIMERGAS
        jnz     LPGAT
        call    CLEAR_PRIORITY
ENDGAT  leai
td_gg_period
        call    READ_PARM
        call    LOAD_TIMERGAS
        leai    n_volts_cutoff
        call    READ_PARM
        call    SET_MAX_VOLTAGE
JNTL    jmp     NTRICKLE_LOOP
STATE_MTCE_INIT:
        SET_LEDS (LED_GRN)
        rmd     MyFlags
        leai    n_maint_rate_lo
        jmp     SAVCUR
CHECK_HIGH2:
        pshea
        leai    n_volts_cutoff
        call    READ_PARM
        popea
        ad      ParmMid
        std     ParmMid
        jnc     CPIT
        icmd    ParmHi
CPIT:   lxyi    ParmLo
        leai    BattVoltsLo
        call    COMPARE12
        jnc     NOTHI2
        call    CLEAN_STACK
        jmp     STATE_HIGH2_INIT
NOTHI2:         ret
CALC_BATT_TC:
        lxyi    BattTcLo
        call    CLEAR12
        ld      BattVoltsHi
        jz      ADDBV
        li      4
        std     BattTcHi
        leai    ThermVoltsLo
        call    SUB12
        jc      LESS25
        leai    x'4a'
        stbd    ParmLo
        li      1
        std     ParmHi
        leai    ParmLo
        call    MULT12
        jmp     ADDBV
LESS25:         pshxy
        popea
        call    COMPLEMENT12
        call    INC12
        leai    x'71'
        stbd    ParmLo
        li      5
        std     ParmHi
        leai    ParmLo
        call    MULT12
        pshxy
        popea
        call    COMPLEMENT12
        call    INC12
ADDBV:          leai
BattVoltsLo
        call    ADD12
        ret
CALC_BPLUS_VOLTS
        rc
        ld      NodeVoltsHi
        ror
        std     Int12Hi
        ld      NodeVoltsMid
        ror
        std     Int12Mid
        ld      NodeVoltsLo
        ror
        std     Int12Lo
        leai    BattVoltsLo
        lxyi    Int12Lo
        call    ADD12
        leai    Int12Lo
        ret
CHECK_CURRENT
        rmd     ReqCurrentHi
        call    CALC_BPLUS_VOLTS
        lxyi    OtherBPlusLo
        call    COMPARE12
        jnc     SUBEM
        call    COPY12
SUBEM           call    SUB12
        li      7
        ad      OtherBPlusMid
        std     OtherBPlusMid
        li      1
        acd     OtherBPlusHi
        std     OtherBPlusHi
        rmd     AllowCurHi
        leai    x'29'
        stbd    AllowCurLo
        lxyi    AllowCurLo
        leai    OtherBPlusLo
        call    DIV12
        call    CHECK_PRIORITY
        jz      STEP3
        lxyi    AllowCurLo
        leai    ReqCurrentLo
        call    COMPARE12
        jnc     YES100
        call    CLEAR_PRIORITY
        sc
        ret
YES100: lbd     ReqCurrentLo
        jmp     STEP9A
STEP3:          ld      GFlags
        jbnz
BITNUM_FRONT_FLAG, STEP4
        li      x'c'
        sd      F_MaxCurrentLo
        std     OtherBPlusLo
        li      x'6'
        sbd     F_MaxCurrentHi
        std     OtherBPlusMid
        rmd     OtherBPlusHi
        lxyi    AllowCurLo
        leai    OtherBPlusLo
        call    COMPARE12
        jc      STEP4
        call    COPY12
STEP4           ld      ControlHi
        jbnz
BITNUM_BATT_LITH, STEP5
        rmd     OtherBPlusLo
        li      b'0110'
        std     OtherBPlusHi
        call    TEST_MAX_CURRENT
        jnz     SETMID
        li      x'6'
        jmp     STDOB
SETMID          li      0
STDOB           std
OtherBPlusMid
        lxyi    OtherBPlusLo
        leai    ReqCurrentLo
        call    MULT12
        leai    OtherBPlusLo
        lxyi    AllowCurLo
        call    COMPARE12
        jnc     STEP5
        leai    0
        call    SET_MAX_CURRENT
        sc
        ret
STEP5           rmd     MyMaxCurHi
        ld      GFlags
        jbnz
BITNUM_FRONT_FLAG, STEP5F
STEP5R:         lbd
R_MaxCurrentLo
        stbd    MyMaxCurLo
        jmp     STEP6R
STEP5F          lbd
F_MaxCurrentLo
        stbd    MyMaxCurLo
STEP6F          ld      Priority
        jbz
BITNUM_VREG_FRONT, HALFWAY
        jmp     ISVREG
STEP6R          ld      Priority
        jbz
BITNUM_VREG_REAR, HALFWAY
ISVREG:         lxyi    MyMaxCurLo
        leai    NodeVoltsLo
        call    COPY12
        call    DIV_BY4
        li      3
        ad      MyMaxCurLo
        std     MyMaxCurLo
        jnc     TO7
        icmd    MyMaxCurMid
TO7:    jmp     STEP7
HALFWAY:
        lxyi    MyMaxCurLo
        leai    ReqCurrentLo
        call    ADD12
        call    INC12
        rc
        ld      MyMaxCurMid
        ror
        std     MyMaxCurMid
        ld      MyMaxCurLo
        ror
        std     MyMaxCurLo
STEP7           lxyi    MyMaxCurLo
        leai    ReqCurrentLo
        call    COMPARE12
        jc      STEP8
        call    COPY12
        jmp     STEP8
STEP8           leai    AllowCurLo
        lxyi    MyMaxCurLo
        call    COMPARE12
        jc      STEP9
        call    COPY12
STEP9           lbd     MyMaxCurLo
STEP9A:         call
SET_MAX_CURRENT
        rc
        ret
SET_MAX_CURRENT:
        pshea
        li      GFlags
        jbz
BITNUM_FRONT_FLAG, SMCRE
        popea
        stbd    F_MaxCurrentLo
        ret
SMCRE           popea
RRRR:   stbd    R_MaxCurrentLo
        ret
TEST_MAX_CURRENT:
        ld      GFlags
        jbz
BITNUM_FRONT_FLAG, TREAR
        lbd     F_MaxCurrentLo
        jmp     CHFOR0
TREAR:          lbd
R_MaxCurrentLo
CHFOR0:         ceai    0
        ret
ADD12:
        exsx
        exsy
        pshea
        popxy
        pshxy
        licy
        exsx
        exsy
        a
        sticy
        exsx
        exsy
        licy
        exsx
        exsy
        ac
        sticy
        exsx
        exsy
        l
        exsx
        exsy
        ac
        stdcy
        dcy
        popea
        ret
CHECK_TIMER1
        pshea
        lbd     Timer1SecLo
        jmp     TIMCOM
CHECK_TIMERGAS
        pshea
        lbd     TimerGasLo
        jmp     TIMCOM
CHECK_TIMER256
        pshea
        lbd     Timer256SecLo
TIMCOM:         dcea
        jc      INCA
        li      0
INCA    ai      1
        popea
        ret
LOAD_TIMER1
        call    EAPARM
        jmp     TIM1
LOAD_TIMERGAS
        call    EAPARM
        jmp     TIM15
LOAD_TIMER256
        call    EAPARM
        jmp     TIM256
CLEAR_TIMER1
        leai
TIM1    stbd    Timer1SecLo
        ret
CLEAR_TIMERGAS
        leai    0
TIM15           stbd    TimerGasLo
        ret
CLEAR_TIMER256
        leai    0
TIM256:         stbd
Timer256SecLo
        ret
CLEAN_STACK:
        popxy
        exsx
        exsy
        popxy
        leai    x'20'
        wtsp
        pshxy
        exsx
        exsy
        pshxy
        ret
CLEAR12:
        pshea
        li      0
        sticy
        sticy
        stdcy
        dcy
        popea
        ret
COMPARE12:
        pshxy
        pshea
        icy
        icy
        ldcy
        exsx
        exsy
        popxy
        pshxy
        icy
        icy
        c
        jnz     DONE_COMP
        dcy
        exsx
        exsy
        ldcy
        exsx
        exsy
        c
        jnz     DONE_COMP
        dcy
        exsx
        exsy
        l
        exsx
        exsy
        c
DONE_COMP
        popea
        popxy
        ret
COMPLEMENT12
        pshxy
        pshea
        popxy
        pshea
        l
        cpl
        sticy
        l
        cpl
```

```
        sticy
        1
        cpl
        st
        popea
        popxy
        ret
COPY12
        exsx
        exsy
        pshea
        popxy
        pshxy
        licy
        exsx
        exsy
        sticy
        exsx
        exsy
        licy
        exsx
        exsy
        sticy
        exsx
        exsy
        l
        exsx
        exsy
        stdcy
        dcy
        popea
        ret
DEC12:
        dcm
        jnc     DEC_A
        icy
        dcm
        jnc     DEC_B
        icy
        dcm
        dcy
DEC_B
        dcy
DEC_A
        ret
DEC8
        pshxy
        dcm
        jnc     CHKF0
        icy
        dcm
        dcy
        jmp     CHKNIB
CHKF0           inz     END8
        icy
CHKNIB:         icm
        dcm
END8    popxy
        ret
EAPARM:
        ld      ParmHi
        exe
        ld      ParmMid
        ret
DIV12:
        call    WATCHDOG
        pshea
        licy
        std     TmpLo
        licy
        std     TmpMid
        ldcy
        std     TmpHi
        dcy
        call    CLEAR12
        li      13
        std     Cnt
        rbmd    BITNUM_ADD_FLAG,
GFlags
        rbmd    BITNUM_SIGN_BIT,
GFlags
LOOP_DIV:
        ld      GFlags
        jbz     BITNUM_ADD_FLAG,
SUB_SRC
ADD_SRC
        popea
        pshxy
        lxyi    TmpLo
        call    ADD12
        jmp     CHK_CARRY
SUB_SRC
        popea
        pshxy
        lxyi    TmpLo
        call    SUB12
CHK_CARRY
        popxy
        pshea
        jnc     CHK_SIGN
        li      MASK_SIGN_BIT
        xd      GFlags
        std     GFlags
CHK_SIGN:
        ld      GFlags
        sbmd    BITNUM_ADD_FLAG,
GFlags
        jbnz    BITNUM_SIGN_BIT,
SHIFT_TOP
INC_RESULT:
        rbmd    BITNUM_ADD_FLAG,
GFlags
        call    INC12
SHIFT_TOP:
        pshxy
        rc
        lxyi    TmpLo
        call    LEFT12
        popxy
        rbmd    BITNUM_SIGN_BIT,
GFlags
        jnc     CHK_CNT_EQ2
        sbmd    BITNUM_SIGN_BIT,
GFlags
CHK_CNT_EQ2
        li      2
        cd      Cnt
        jnc     CHK_DIV_CNT
        rc
        call    LEFT12
CHK_DIV_CNT
        dcmd    Cnt
        jnz     LOOP_DIV
        popea
        ret
INC12:
        pshxy
        icm
        jnc     INC_DONE
        icy
        icm
        jnc     INC_DONE
        icy
        icm
INC_DONE
        popxy
        ret
LEFT12:
        pshea
        l
        rol
        sticy
        l
        rol
        sticy
        l
        rol
        stdcy
        dcy
        popea
        ret
MEASURE:
        call    WATCHDOG
        ld      PocketState
        jz      STMC
        li      b'1000'
STMC    std     MeasCnt
MLOOP
        call    SYNC
        li      6
        std     BattVoltsFrac
        std     ThermVoltsFrac
        std     NodeVoltsFrac
        rmd     BattVoltsLo
        rmd     BattVoltsMid
        rmd     BattVoltsHi
        rmd     NodeVoltsLo
        rmd     NodeVoltsMid
        rmd     NodeVoltsHi
        rmd     ThermVoltsLo
        rmd     ThermVoltsMid
        rmd     ThermVoltsHi
        sbmd
BITNUM_MEASURE_FLAG, GFlags
MILOOP          call    WATCHDOG
        lbd     IntTimerLo
        ceai    (256 - SW_COUNT
+ 64)
        jnz     MILOOP
        rbmd
BITNUM_MEASURE_FLAG, GFlags
        lxyi    ThermVoltsLo
        leai    NodeVoltsLo
        call    SUB12
        leai    NodeVoltsLo
        call    COMPLEMENT12
        call    DIV12
        call    COMPLEMENT12
        li      x_therm_mult
        lxyi    ParmLo
        call    X_READ12
        lxyi    ThermVoltsLo
        leai    ParmLo
        call    MULT12
        li      x_therm_offset
        lxyi    ParmLo
        call    X_READ12
        lxyi    ThermVoltsLo
        leai    ParmLo
        call    ADD12
        leai    NEG_30DEGC
        lxyi    Int12Lo
        call    READ_TABLE12
        leai    ThermVoltsLo
        call    COMPARE12
        jc      NOBAT
        ld      GFlags
        jbnz
BITNUM_FRONT_FLAG, ONFRO
ONREA:          ld      Priority
        jbz
BITNUM_PRIORITY_FRONT,
CHMCNT
REMEAS:         jmp     MEASURE
ONFRO:          ld      Priority
        jbnz
BITNUM_PRIORITY_REAR, REMEAS
CHMCNT:         ld      MeasCnt
        jbnz    3, IMCNT
        li      b'1000'
        std     MeasCnt
        jmp     IMCNT
NOBAT:          ld      MeasCnt
        jbz     3, IMCNT
        rmd     MeasCnt
IMCNT:          icmd    MeasCnt
        ld      MeasCnt
        jbz     2, MLOOP
SCALE_BATT
        li      x_batt_mult
        lxyi    ParmLo
        call    X_READ12
        lxyi    BattVoltsLo
        leai    ParmLo
        call    MULT12
        li      x_batt_offset
        lxyi    ParmLo
        call    X_READ12
        lxyi    BattVoltsLo
        leai    ParmLo
        call    ADD12
        call    CHECK_ABORT
        ld      MeasCnt
        jbnz    3, CHKIDLE
        call    CLEAN_STACK
        jmp     STATE_IDLE_INIT
CHKIDLE
        ld      PocketState
        jz      YESIDL
        ret
YESIDL:         leai    d_type_id
        call    DS2502_READ_BYTE
        jz      CHKLI
        ceai    x'56'
        jnz     CHKFAT
CALIB:          call
CLEAN_STACK
        jmp     STATE_CALIB_INIT
CHKLI:          sbmd
BITNUM_BATT_EPROM, ControlHi
        ceai    TYPE_LITH
        jnz     CHKFAT
        sbmd
BITNUM_BATT_LITH, ControlHi
CHKFAT
        ld      GFlags
        jbnz
BITNUM_FRONT_FLAG, F_CSZ
        sout    port4,
MASK_SIZE_REAR
        in      port4,
MASK_SIZE_REAR
        rout    port4,
MASK_SIZE_REAR
SSSS    jbnz
BITNUM_SIZE_REAR, ENDMEA
        jmp     SETFAT
F_CSZ:          sout    port4,
MASK_SIZE_FRONT
        in      port4,
MASK_SIZE_FRONT
        rout    port4,
MASK_SIZE_FRONT
        jbnz
BITNUM_SIZE_FRONT, ENDMEA
SETFAT:         sbmd
BITNUM_BATT_FAT, ControlHi
ENDMEA:         ret
CHECK_ABORT:
        edi     0,2
        call    READ_COMM
        jz      BEGABORT
        ret
BEGABORT
        edi     7,0
        call    SET_PWMS_OFF
        nop
ENDABORT
        jmp     CHECK_ABORT
SET_PWMS_OFF:
        rout    port2,
MASK_PWM_FRONT
        sout    port2,
MASK_PWM_REAR
        ret
MULT12
        call    WATCHDOG
        pshxy
        lxyi    TmpLo
        call    CLEAR12
        std     Cnt
        li      13
        exd     Cnt
LOOP_MULT
        rc
        lxyi    TmpLo
        call    LEFT12
        popxy
        call    LEFT12
        pshxy
        jnc     CHK_CNT
        lxyi    TmpLo
        call    ADD12
        jnc     CHK_CNT
        popxy
        call    INC12
        pshxy
CHK_CNT:
        dcmd    Cnt
        jnz     LOOP_MULT
        popxy
        exd     TmpHi
        jbz     3,M_END
        call    INC12
M_END:
        exd     TmpHi
        ret
DIV_BY4:
        li      b'0010'
        std     JmdHi
        leai    0
        stbd    JmdLo
        leai    JmdLo
        call    MULT12
        ret
SET_LED_CONTROL
        std     ControlLo
        exe
        sbmd
BITNUM_LED_HHC_CONTROL,
ControlHi
        jbz
BITNUM_LED_HHC_CONTROL,
SLCRET
        sbmd
BITNUM_LED_HHC_CONTROL,
ControlHi
SLCRET          ret
SET_CURRENT
        lxyi    ParmLo
        call    DIV_BY4
        lbd     ParmLo
        stbd    ReqCurrentLo
        ret
SET_PRIORITY
        ld      GFlags
        jbnz
BITNUM_FRONT_FLAG, SFPRI
        leai    0
        stbd    F_MaxCurrentLo
        sbmd
BITNUM_PRIORITY_REAR,
Priority
        ret
SFPRI:
        sbmd
BITNUM_PRIORITY_FRONT,
Priority
        leai    0
        stbd    R_MaxCurrentLo
        ret
CLEAR_PRIORITY
        ld      GFlags
        jbnz
BITNUM_FRONT_FLAG, RFPRI
        rbmd
BITNUM_PRIORITY_REAR,
Priority
        ret
RFPRI
        rbmd
BITNUM_PRIORITY_FRONT,
Priority
        ret
CHECK_PRIORITY
        ld      GFlags
        jbnz
BITNUM_FRONT_FLAG, CHFPRI
        li
MASK_PRIORITY_REAR
        jmp     ANDPRI
CHFPRI          li
MASK_PRIORITY_FRONT
ANDPRI          nd      Priority
        ret
CHECK_VREG_FLAG
        ld      GFlags
        jbnz
BITNUM_FRONT_FLAG, CHFVRE
        li      MASK_VREG_REAR
        jmp     ANDVRE
CHFVRE:         li
MASK_VREG_FRONT
ANDVRE:         nd      Priority
        ret
SET_MAX_VOLTAGE:
        lxyi    Int12Lo
        li      x_batt_offset
        call    X_READ12
        lxyi    ParmLo
        leai    Int12Lo
        call    SUB12
        lxyi    Int12Lo
        li      x_batt_mult
        call    X_READ12
        lxyi    ParmLo
        leai    Int12Lo
        call    DIV12
        call    DIV_BY4
        ld      GFlags
        edi     7,0
        lxyi    F_MaxVoltageLo
        jbnz
BITNUM_FRONT_FLAG, DOCPY
        lxyi    R_MaxVoltageLo
DOCPY           leai    ParmLo
        call    COPY12
        edi     0,2
        ret
SUB12
        pshea
        l
        exsx
        exsy
        popxy
        pshxy
        s
        icy
        exsx
        exsy
        sticy
        l
        exsx
        exsy
        sb
        icy
        exsx
        exsy
        sticy
        l
        exsx
        exsy
```

```
        ld
        exsx
        exsy
        stdcy
        scy
        popea
        ret
SWAP_NIBBLES
        pshea
        l
        exsx
        exsy
        ex
        icy
        jnz     SWAP_A
        exe
        lx
        ai      1
        stx
        exe
SWAP_A  exsx
        exsy
        sticy
        jnz     SWAP_B
        lx
        ai
        stx
SWAP_B  popea
        dcea
        jnc     SWAP_NIBBLES
        ret
SW_INIT1
        call    SW_INIT2
        ret
SW_INIT2
        leai    x'c0'
        wtsp
        edi     1,2
        jmp     MAIN
        org     x'510'
HDW_TIMER_INT
        pshea
        li      CHAN_NODE_FRONT
        out     port8  b'1111'
        out     port7  b'0000'
        icmd    IntTimerLo
        jnz     CLRHI
        icmd    IntTimerHi
CLRHI   rmd
TempVoltsHi
        rmd     TempVoltsMid
        leai    x'1c'
        pshxy
        ld      GFlags
        sty
FNLOOP          in      port7,
b'1111'
        jbz     1  FNLOOP
        in      porta,x'f'
        ai      1
        std     TempVoltsLo
        in      portb x'f
        acd     TempVoltsMid
        std     TempVoltsMid
        li      CHAN_BATT_FRONT
        out     port8, b'1111'
        out     port7, b'0000'
        ld      TempVoltsLo
        sd      F_MaxCurrentLo
        ld      TempVoltsMid
        sbd     F_MaxCurrentHi
        jc      FBCONT
        leai    0
        rbmd
BITNUM_VREG_FRONT, Priority
FBCONT          ld
TempVoltsLo
        ad      NodeVoltsFrac
        cyij    b'1100', FBREAD
        std     NodeVoltsFrac
        ld      TempVoltsMid
        acd     NodeVoltsLo
        std     NodeVoltsLo
        jnc     FBREAD
        icmd    NodeVoltsMid
        jnc     FBREAD
        icmd    NodeVoltsHi
FBREAD:
FBLOOP          in      port7
b'1111'
        jbz     1  FBLOOP
        in      porta  x'f'
        sd      TempVoltsLo
        std     TempVoltsLo
        in      portb  x'f
        sbd     TempVoltsMid
        std     TempVoltsMid
        in      portc  x'3'
        sbd     TempVoltsHi
        std     TempVoltsHi
        li      CHAN_NODE_REAR
        out     port8, b'1111'
        out     port7, b'0000'
        ld      TempVoltsLo
        sd      F_MaxVoltageLo
        ld      TempVoltsMid
        sbd     F_MaxVoltageMid
        ld      TempVoltsHi
        sbd     F_MaxVoltageHi
        jnc     FRONT_PWM_VREG
        exe
        jbz     0, FRONT_PWM_OFF
FRONT_PWM_ON.
        ld      Priority
        jbnz
BITNUM_PRIORITY_REAR,
FRONT_PWM_OFF
        sout    port2,
MASK_PWM_FRONT
        jmp     CHKFM
FRONT_PWM_VREG:
        sbmd
BITNUM_VREG_FRONT, Priority
FRONT_PWM_OFF:
        rout    port2,
MASK_PWM_FRONT
CHKFM:          cyij    b'1100',
RNCONT
        ld      TempVoltsLo
        ad      BattVoltsFrac
        std     BattVoltsFrac
        ld      TempVoltsMid
        acd     BattVoltsLo
        std     BattVoltsLo
        ld      TempVoltsHi
        acd     BattVoltsMid
        std     BattVoltsMid
        jnc     RNCONT
        icmd    BattVoltsHi
RNCONT:
RNLOOP:         in      port7
b'1111'
        jbz     1, RNLOOP
        rmd     TempVoltsMid
        in      porta x'f'
        ai      1
        std     TempVoltsLo
        in      portb,x'f'
        acd     TempVoltsMid
        std     TempVoltsMid
        li      CHAN_BATT_REAR
        out     port8, b'1111'
        out     port7, b'0000'
        rmd     TempVoltsHi
        leai    x'20'
        ld      TempVoltsLo
        sd      R_MaxCurrentLo
        ld      TempVoltsMid
        sbd     R_MaxCurrentHi
        jc      RBCONT
        leai    0
        rbmd
BITNUM_VREG_REAR, Priority
RBCONT          cyij    b'0100'
RBREAD
        ld      TempVoltsLo
        ad      NodeVoltsFrac
        std     NodeVoltsFrac
        ld      TempVoltsMid
        acd     NodeVoltsLo
        std     NodeVoltsLo
        jnc     RBREAD
        icmd    NodeVoltsMid
        jnc     RBREAD
        icmd    NodeVoltsHi
RBREAD:
RBLOOP:         in      port7
b'1111'
        jbz     1, RBLOOP
        in      porta, x'f'
        sd      TempVoltsLo
        std     TempVoltsLo
        in      portb, x'f'
        sbd     TempVoltsMid
        std     TempVoltsMid
        in      portc, x'3'
        sbd     TempVoltsHi
        std     TempVoltsHi
        cyij    b'1100', CHKRTM
        li      CHAN_THERM_FRONT
        jmp     STCONV
CHKRTM          cyij    b'0100',
CHKFV
        li      CHAN_THERM_REAR
STCONV          out     port8,
b'1111'
        out     port7, b'0000'
CHKFV           ld
TempVoltsLo
        sd      R_MaxVoltageLo
        ld      TempVoltsMid
        sbd     R_MaxVoltageMid
        ld      TempVoltsHi
        sbd     R_MaxVoltageHi
        jnc     REAR_PWM_VREG
        exe
        jbz     0  REAR_PWM_OFF
REAR_PWM_ON:
        ld      Priority
        jbnz
BITNUM_PRIORITY_FRONT,
REAR_PWM_OFF
        sout    port2,
MASK_PWM_REAR
        jmp     CHKFT
REAR_PWM_VREG
        sbmd
BITNUM_VREG_REAR, Priority
REAR_PWM_OFF:
        rout    port2,
MASK_PWM_REAR
CHKFT:          cyij    b'1100',
CHKRM
        jmp     ADDTHERM
CHKRM:          cyij    b'0100',
IEND
        ld      TempVoltsLo
        ad      BattVoltsFrac
        std     BattVoltsFrac
        ld      TempVoltsMid
        acd     BattVoltsLo
        std     BattVoltsLo
        ld      TempVoltsHi
        acd     BattVoltsMid
        std     BattVoltsMid
        jnc     ADDTHERM
        icmd    BattVoltsHi
ADDTHERM:
TLOOP:          in      port7
b'1111'
        jbz     1, TLOOP
        in      porta, x'f'
        ad      ThermVoltsFrac
        std     ThermVoltsFrac
        in      portb, x'f
        acd     ThermVoltsLo
        std     ThermVoltsLo
        in      portc, x'3'
        acd     ThermVoltsMid
        std     ThermVoltsMid
        jnc     IEND
        icmd    ThermVoltsHi
IEND    popxy
        popea
        edi     0,2
        reti
X_READ12
        pshea
        pshea
        ld      GFlags
        jbnz
BITNUM_FRONT_FLAG, FXR12
        popea
        jmp     RFBEE
FXR12   popea
        ai      8
RFBEE           call
X_READ_BYTE
        icy
        exe
        ex
        exe
        ai      1
        call    X_READ_BYTE
        exe
        ex
        icy
        a
        dcy
        a
        dcy
        a
        ci      5
        popea
        ret
X_READ_BYTE:
        pshea
        exe
        li      2
        exe
        slea
        slea
        ai      3
        call    X_START
        call    X_SEND_BYTE
        pshxy
        lxyi    8
RDLOOP:         slea
        pshea
        in      port1,
MASK_EEPROM_DATA
        ai      0
        sout    port4,
MASK_EEPROM_CLOCK
        rout    port4,
MASK_EEPROM_CLOCK
        popea
        jz      WAS0
        ai      1
WAS0:   dcy
        jnz     RDLOOP
        popxy
        sticy
        exe
        stdcy
        popea
        ret
X_SEND_BYTE:
        pshxy
        lxyi    8
SEND_LOOP:
        slea
        jc      YEP1
        rout    port1,
MASK_EEPROM_DATA
        jmp     CLKHI
YEP1    sout    port1,
MASK_EEPROM_DATA
CLKHI:          sout    port4,
MASK_EEPROM_CLOCK
        rout    port4,
MASK_EEPROM_CLOCK
        dcy
        jnz     SEND_LOOP
        popxy
        ret
X_START
        sout    port1,
MASK_EEPROM_DATA
        sout    port4,
MASK_EEPROM_CLOCK
        rout    port1,
MASK_EEPROM_DATA
        rout    port4,
MASK_EEPROM_CLOCK
        ret
X_WRITE12:
        pshea
        pshea
        ld      GFlags
        jbnz
BITNUM_FRONT_FLAG, FXW12
        popea
        jmp     WFBEE
FXW12   popea
        ai      8
WFBEE           call
X_WRITE_BYTE
        ai      1
        exe
        l
        icy
        a
        icy
        a
        cpi
        ai      6
        dcy
        ex
        exe
        call    X_WRITE_BYTE
        exe
        ex
        exe
        dcy
        popea
        ret
X_WRITE_BYTE
        pshea
        exe
        li      2
        exe
        slea
        slea
        ai      2
        call    X_START
        call    X_SEND_BYTE
        icy
        ldcy
        exe
        l
        call    X_SEND_BYTE
        call    DELAY_5MS
        popea
        ret
DELAY_5MS
        pshea
        leai    x'ff
LOOP5M.         call    WATCHDOG
        dcea
        jnc     LOOP5M
        popea
        ret
        org     x'c13'
TABLE_SLIM_DEFAULT              equ
(*%256)
        dc      x'd4'
        dc      x'02
        dc      x'e8'
        dc      x'80'
        dc      x'80'
        dc      x'bc'
        dc      x'53'
        dc      x'00'
        dc      x'01'
        dc      x'eb'
        dc      x'3b'
        dc      x'04
        dc      x'ab'
        dc      x'07'
        dc      x'01
        dc      x'70'
        dc      x'19
        dc      x'ae'
        dc      x'bb'
        dc      x'00
        dc      x'1e'
        dc      x'1e'
        dc      x'14
        dc      x'26'
        dc      x'ce'
        dc      x'00'
TABLE_FAT_DEFAULT  equ
(*%256)
        dc      x'b9'
        dc      x'02'
        dc      x'e6'
        dc      x'80'
        dc      x'80'
        dc      x'bc'
        dc      x'53'
        dc      x'00'
        dc      x'03'
        dc      x'd9'
        dc      x'3f
        dc      x'04'
        dc      x'ab'
        dc      x'07'
        dc      x'02'
        dc      x'70'
        dc      x'19
        dc      x'b8'
        dc      x'bc'
        dc      x'00
        dc      x'27
        dc      x'21'
        dc      x'14
        dc      x'26'
        dc      x'db'
        dc      x'00
TABLE_BUF_POINTER  equ
(*%256)
        dc      0
        dc      0
        dc      Buf1Lo
        dc      0
        dc      0
        dc      Buf2Lo
        dc      Buf3Lo
        dc      0
        dc      0
```

```
        dc      0
        dc      0
        dc      0
        dc      0
        dc      0
        dc      0
        dc      Buf4Lo
        dc      Buf5Lo
        dc      Buf6Lo
        dc      Buf7Lo
        dc      Buf8Lo
        dc      Buf9Lo
        dc      Buf10Lo
        dc      0
        dc      Buf11Lo
        dc      Buf12Lo
        dc      0
TABLE_PARM_ADJUST_INDEX   equ
(*$256)
        dc      ADJUST_NONE
        dc      ADJUST_NONE
        dc      ADJUST_0392
        dc      ADJUST_2004
        dc      ADJUST_680
        dc      ADJUST_7124
        dc      ADJUST_7124
        dc      ADJUST_NONE
        dc      ADJUST_814_2BYTE
        dc      ADJUST_814_2BYTE
        dc      ADJUST_4053
        dc      ADJUST_NONE
        dc      ADJUST_1048
        dc      ADJUST_131
        dc      ADJUST_814
        dc      ADJUST_0392
        dc      ADJUST_0392
        dc      ADJUST_0392
        dc      ADJUST_0392
        dc      ADJUST_814_2BYTE
        dc      ADJUST_814_2BYTE
        dc      ADJUST_814
        dc      ADJUST_15
        dc      ADJUST_131
        dc      ADJUST_0392
        dc      ADJUST_NONE
TABLE_PARM_ADJUSTMENTS
ADJUST_NONE  equ     (*$256)
        dc      x'08'
        dc      x'00'
ADJUST_680   equ     (*$256)
        dc      x'05'
        dc      x'71'
ADJUST_2004  equ     (*$256)
        dc      x'01'
        dc      x'9a'
ADJUST_0392  equ     (*$256)
        dc      x'08'
        dc      x'07'
ADJUST_814_10BIT equ
(*$256)
        dc      x'00'
        dc      x'ab'
ADJUST_4053  equ     (*$256)
        dc      x'07'
        dc      x'99'
ADJUST_15    equ     (*$256)
        dc      x'07'
        dc      x'80'
ADJUST_814_2BYTE equ
(*$256)
        dc      x'02'
        dc      x'ab'
ADJUST_814   equ     (*$256)
        dc      x'08'
        dc      x'2b'
ADJUST_131   equ     (*$256)
        dc      x'01'
        dc      x'0c'
ADJUST_7124  equ     (*$256)
        dc      x'03'
        dc      x'90'
ADJUST_1048  equ     (*$256)
NEG_30DEGC   equ     (*$256)
        dc      x'07'
        dc      x'5f'
BATT_SPEC_HIGH   equ
(*$256)
        dc      x'0d'
        dc      x'4d'
BATT_SPEC_LOW    equ
(*$256)
        dc      x'0d'
        dc      x'44'
THERM_SPEC_HIGH    equ
(*$256)
        dc      x'05'
        dc      x'c1'
THERM_SPEC_LOW     equ
(*$256)
        dc      x'05'
        dc      x'ba'
READ_TABLE_BYTE:
        stbd    Int12Lo
        pshxy
        popea
        ad      Int12Lo
        exe
        acd     Int12Mid
        exe
        rdtbl
        ret
LOAD_PARM_FROM_TABLE
        pshxy
        lxyi    ParmLo
        call    READ_TABLE12
        leai    ParmLo
        popxy
        ret
READ_TABLE12
        pshea
        rdtbl
        icy
        icy
        stdcy
        popea
        icea
        rdtbl
        exe
        stdcy
        exe
        st
        pshxy
        popea
        ret
READ_PARM
        pshxy
        rmd     ParmLo
PRLOOP:         pshea
        ld      ParmLo
        std     ParmHi
        ld      ControlHi
        jbz
BITNUM_BATT_EPROM, TSTFAT
        popea
        pshea
        lxyi
TABLE_BUF_POINTER
        call    READ_TABLE_BYTE
        ceai    0
        jz      DSREAD
        pshea
        popxy
        licy
        exe
        l
        exe
        jmp     SAVBYT
DSREAD:         popea
        pshea
        call    DS2502_READ_BYTE
        jz      SAVBYT
        call    CLEAN_STACK
        jmp     STATE_IDLE_INIT
TSTFAT:         lxyi
TABLE_SLIM_DEFAULT
        jbz     BITNUM_BATT_FAT,
ISSLIM
        lxyi
TABLE_FAT_DEFAULT
ISSLIM:         popea
        pshea
        call    READ_TABLE_BYTE
SAVBYT:         stbd    ParmLo
        popea
        icea
        ceai    6
        jz      PRLOOP
        ceai    20
        jz      PRLOOP
        ceai    10
        jz      HHH
        ceai    21
        jz      HHH
        pshea
        ld      ParmMid
        std     ParmHi
        ld      ParmLo
        std     ParmMid
        rmd     ParmLo
        popea
HHH     dcea
        pshea
        lxyi
TABLE_PARM_ADJUST_INDEX
        call    READ_TABLE_BYTE
        lxyi    Int12Lo
        call    READ_TABLE12
        lxyi    ParmLo
        call    MULT12
        popea
        ceai    5
        jz      CNTFIX
        ceai    6
        jz      CNTFIX
        jmp     PMEND
CNTFIX
        rmd     Int12Hi
        ld      ParmHi
        std     Int12Mid
        ld      ParmMid
        std     Int12Lo
        leai    x'ed'
        stbd    DmdLo
        li      3
        std     DmdHi
        lxyi    Int12Lo
        leai    DmdLo
        call    DIV12
        leai    Int12Lo
        call    COMPLEMENT12
        rbmd    3, Int12Hi
        lxyi    ParmLo
        leai    Int12Lo
        call    DIV12
PMEND:          leai    ParmLo
        popxy
        ret
DUMP_EEPROM
        ld      GFlags
        lxyi    x'c0'
        jbnz
BITNUM_FRONT_FLAG, FDUMP
        lxyi    x'b0'
FDUMP:          li      0
XLOOP:          call    X_READ12
        icy
        icy
        icy
        icy
        call    WATCHDOG
        ai      2
        ci      8
        jnz     XLOOP
        ret
DS2502_READ_BYTE:
        pshea
        call    DS2502_RESET
        jz      RDEPRM
        popea
        ret
RDEPRM:         leai
CMD_SKIP_ROM
        call    DS2502_SEND_BYTE
        rmd     CrcLo
        rmd     CrcHi
        leai
CMD_READ_DATA_CRC
        call    DS2502_SEND_BYTE
        popea
        call    DS2502_SEND_BYTE
        leai    0
        call    DS2502_SEND_BYTE
        call    DS2502_GET_BYTE
        ld      CrcLo
        od      CrcHi
        jnz     LRET
        call    DS2502_GET_BYTE
LRET    lbd     DataLo
        ret
SET_COMM_LOW
        ld      GFlags
        jbnz
BITNUM_FRONT_FLAG, F_COML
        rout    port5,
MASK_COMM_REAR
        ret
F_COML          rout    port5,
MASK_COMM_FRONT
        ret
SET_COMM_HIGH
        ld      GFlags
        jbnz
BITNUM_FRONT_FLAG, F_COMH
        sout    port5,
MASK_COMM_REAR
        ret
F_COMH:         sout    port5,
MASK_COMM_FRONT
        ret
READ_COMM
        ld      GFlags
        jbnz
BITNUM_FRONT_FLAG, F_ROOM
        in      port5
MASK_COMM_REAR
        jmp     AI0
        ai      0
        ret
F_ROOM:         in      port5,
MASK_COMM_FRONT
AI0:    ai      0
        li      x'f'
        out     port5, x'f'
        ret
DELAY_15US
        pshea
        leai    2
L15     dcea
        jnc     L15
        popea
        ret
DELAY_480US
        call    WATCHDOG
        pshea
        leai    120
L480    dcea
        jnc     L480
        popea
        call    WATCHDOG
        ret
DELAY_60US
        pshea
        leai    15
L60     dcea
        jnc     L60
        popea
        ret
DS2502_GET_BYTE
        call    WATCHDOG
        lxyi    8
        rmd     DataLo
        rmd     DataHi
LOOPDSGB:
        edi     7,0
        call    SET_COMM_LOW
        call    SET_COMM_HIGH
        call    READ_COMM
        edi     0,2
        jz      RORB
        sbmd    0, DataLo
RORB:   call    DELAY_15US
        rc
        ld      DataHi
        ror
        std     DataHi
        ld      DataLo
        ror
        std     DataLo
        jnc     NOCYG
        sbmd    3, DataHi
NOCYG:          call
COMPUTE_CRC
        dcy
        jz      ENDDSGB
        jmp     LOOPDSGB
ENDDSGB
        ret
COMPUTE_CRC
        rc
        ld      CrcHi
        ror
        std     CrcHi
        ld      CrcLo
        ror
        std     CrcLo
        ror
        xd      DataHi
        jbz     3, CRCEND
        sbmd    3, CrcHi
        li      x'c'
        xd      CrcLo
        std     CrcLo
CRCEND:         ret
DS2502_SEND_BYTE
        call    WATCHDOG
        stbd    DataLo
        lxyi    8
LOOPDSSB
        ld      DataLo
        edi     [illegible]
        jbnz    0, SEND1
        call    SET_COMM_LOW
        jmp     DM0
SEND1           call
SET_COMM_LOW
        call    SET_COMM_HIGH
DM0     call    DELAY_60US
        call    SET_COMM_HIGH
        edi     [illegible]
        rc
        ld      DataHi
        ror
        std     DataHi
        ld      DataLo
        ror
        std     DataLo
        jnc     NOCYS
        sbmd    3, DataHi
NOCYS           call
COMPUTE_CRC
        dcy
        jnz     LOOPDSSB
        ret
DS2502_RESET
        call    SET_COMM_LOW
        call    DELAY_480US
        edi     7,0
        call    SET_COMM_HIGH
        leai    6
HLOOP           pshea
        call    READ_COMM
        popea
        jz      DOLOP
        dcea
        jnc     HLOOP
        li      1
        jmp     DSDONE
DOLOP           leai    24
LLOOP:          pshea
        call    READ_COMM
        popea
        jnz     DSDN
        dcea
        jnc     LLOOP
        li      2
        jmp     DSDONE
DSDN:   li      0
DSDONE          edi     [illegible]
        call    DELAY_480US
        ai      0
        ret
CHECK_DELTA_T
        call    CHECK_TIMER1
        jz      RLDT1
        ret
RLDT1           leai    [illegible]
        call    READ_PARM
        call    LOAD_TIMER1
        lxyi    OtherBPlusLo
        leai    OldLo
        call    COPY12
        leai    ThermVoltsLo
        call    SUB12
        leai    n_dtdt_lim
        call    READ_PARM
        call    COMPARE12
        jc      LESSTHAN
        ld      MyFlags
        jbz
BITNUM_DELTAT_ENABLED, SHIFT
        lxyi    OldLo
        leai    RecentLo
        call    SUB12
        leai    5
        std     Int12Lo
        li      0
        std     Int12Hi
        leai    Int12Lo
        call    ADD12
        lxyi    Int12Lo
        leai    RecentLo
        call    COPY12
        leai    ThermVoltsLo
        call    SUB12
        leai    OldLo
        call    COMPARE12
        jc      SHIFT
        call    CLEAN_STACK
        jmp
STATE_NICK_TRICKLE_INIT
LESSTHAN
```

```
        sbmd
BITNUM_DELTAT_ENABLED,
MyFlags
SHIFT:          lxyi    OldLo
        leai    RecentLo
        call    COPY12
        leai    ThermVoltsLo
        lxyi    RecentLo
        call    COPY12
        ret
WATCHDOG
        edi
        pshea
        li      15
        out     portf, b'0110
        out     portf, b'0100
        popea
        edi     0 3
        ret
TCUTOFFS
        leai    n_temp_cut_off
        call    READ_PARM
        li      4
        ad      ParmLo
        std     ParmLo
        li      5
        acd     ParmMid
        std     ParmMid
        jnc     COMPT
        icmd    ParmHi
COMPT           leai    ParmLo
        call    COMPARE12
        ret
        nop
INIT_EEPROM
        lxyi    ParmLo
        call    CLEAR12
        li      x_batt_offset
        call    X_WRITE12
        li      x_therm_offset
        call    X_WRITE12
        li      8
        std     ParmHi
        li      x_batt_mult
        call    X_WRITE12
        li      x_therm_mult
        call    X_WRITE12
        ret
STATE_CALIB_INIT
        li      STATE_CALIB
        std     PocketState
        call    SET_ZERO_CURRENT
        leai    41
        call    DS2502_READ_BYTE
        jz      JSII
        ceai    x'79
        jz      EEINIT
JSII    jmp     STATE_IDLE_INIT
EEINIT          call
INIT_EEPROM
        SET_LEDS (LED_4HZ |
LED_RED)
        call    MEASURE
        leai    BattVoltsLo
        lxyi    XB2Lo
        call    COPY12
        leai    ThermVoltsLo
        lxyi    XT2Lo
        call    COPY12
        leai    1
        call    DS2502_READ_BYTE
        ceai    x'56'
        jnz     JSII
        call    MEASURE
        lxyi    BattVoltsLo
        leai    XB2Lo
        call    SUB12
        lxyi    MultHi
        li      
        stdcy
        li      
        stdcy
        li      x'f'
        st
        leai    BattVoltsLo
        call    DIV12
        li      x_batt_mult
        call    X_WRITE12
        li      4
        std     OffsetHi
        rmd     OffsetMid
        rmd     OffsetLo
        lxyi    BattVoltsLo
        leai    XB2Lo
        call    ADD12
        call    ADD12
        leai    OffsetLo
        jc      BOVER
        call    MULT12
        jmp     BMULT
BOVER:          call    MULT12
        sbmd    3, BattVoltsHi
BMULT:          leai    MultLo
        call    MULT12
        lxyi    OffsetHi
        li      x'a'
        stdcy
        li      9
        stdcy
        li      1
        st
        leai    BattVoltsLo
        call    SUB12
        li      x_batt_offset
        call    X_WRITE12
        lxyi    ThermVoltsLo
        leai    XT2Lo
        call    SUB12
        lxyi    MultHi
        li      0
        stdcy
        li      4
        stdcy
        li      x'f'
        st
        leai    ThermVoltsLo
        call    DIV12
        li      x_therm_mult
        call    X_WRITE12
        li      4
        std     OffsetHi
        rmd     OffsetMid
        rmd     OffsetLo
        lxyi    ThermVoltsLo
        leai    XT2Lo
        call    ADD12
        call    ADD12
        leai    OffsetLo
        call    MULT12
        leai    MultLo
        call    MULT12
        lxyi    OffsetHi
        li      x'4'
        stdcy
        li      1
        stdcy
        li      6
        st
        leai    ThermVoltsLo
        call    SUB12
        li      x_therm_offset
        call    X_WRITE12
        SET_LEDS (LED_4HZ |
LED_YEL)
        call    MEASURE
        lxyi    BattVoltsLo
        leai    BATT_SPEC_HIGH
        call
LOAD_PARM_FROM_TABLE
        call    COMPARE12
        jnc     OUT_OF_SPEC
        leai    BATT_SPEC_LOW
        call
LOAD_PARM_FROM_TABLE
        call    COMPARE12
        jc      OUT_OF_SPEC
        lxyi    ThermVoltsLo
        leai    THERM_SPEC_HIGH
        call
LOAD_PARM_FROM_TABLE
        call    COMPARE12
        jnc     OUT_OF_SPEC
        leai    THERM_SPEC_LOW
        call
LOAD_PARM_FROM_TABLE
        call    COMPARE12
        jnc     GOGRN
OUT_OF_SPEC:
        call    INIT_EEPROM
        jmp     STATE_CALIB_INIT
GOGRN           SET_LEDS
(LED_4HZ | LED_GRN)
        call    MEASURE
        jmp     GOGRN
SET_ZERO_CURRENT
        pshea
        leai    0
        stbd    ReqCurrentLo
        call    SET_MAX_CURRENT
        popea
        ret
```

What is claimed and desired to be secured by Letters Patent of the United States is:

1. A battery charger connected to a predetermined power supply for providing constant current and constant voltage charging, the battery charger comprising:

a power transistor connected between the power supply and a battery to be charged;

means for sensing the power dissipation of said power transistor; and means for controlling said power transistor to provide constant current and constant voltage to said battery to be charged as a function of the power dissipation of said power transistor.

2. A battery charger as recited in claim 1, wherein said sensing means includes means for sensing the power dissipation of said power supply and wherein said controlling means includes means for controlling said power transistor as a function of the power dissipation of said power supply.

3. A battery charger connected to a predetermined power supply for providing constant current and constant voltage charging, the battery charger comprising:

a power transistor connected between the power supply and a battery to be charged;

means for sensing the power dissipation of said power transistor, said sensing means including means for sensing the power dissipation of said power supply; and means for controlling said power transistor to provide constant current and constant voltage to said battery to be charred as a function of the power dissipation of said power transistor, wherein said controlling means includes a pulse width modulator (PWM) and means for receiving a predetermined input signal.

4. The battery charger as recited in claim 3, wherein said controlling means includes a transistor having base, collector and emitter terminals, a resistor and a capacitor, said resistor and capacitor defining an RC time constant.

5. The battery charger as recited in claim 3, wherein said predetermined input signal is a signal generated at predetermined time periods.

6. The battery charger as recited in claim 5, wherein said RC time constant is selected to be relatively larger than said predetermined time period.

7. A multipocket battery charger connected to a predetermined power supply, the battery charger comprising:

a first pocket for receiving a first battery;

a first power transistor connected between said power supply and said first pocket;

means for controlling said first power transistor to provide a constant current output to said first pocket;

a second pocket for receiving a second battery;

a second power transistor connected between said power supply and said second pocket;

means for sensing the power dissipation of said power supply; and means for controlling said first power transistor and said second power transistor so that the electrical power to said first pocket and said second pocket as a function of the power dissipation of said power supply.

8. The multipocket battery charger as recited in claim 7, wherein said sensing means includes means for sensing the power dissipation of said first power transistor or said second power transistor, said controlling means including means for controlling said first power transistor or said second power transistor as a function of the power dissipation of said first power transistor or said second power transistor, respectively.

9. The multipocket battery charger as recited in claim 7, further including means for controlling said first power transistor to provide a constant voltage output to said first pocket.

10. A multipocket battery charger connected to a predetermined power supply, the battery charger comprising:

a first pocket for receiving a first battery;

a first power transistor connected between said power supply and said first pocket;

a second pocket for receiving a second battery;

a second power transistor connected between said power supply and said second pocket;

means for sensing the power dissipation of said power supply; and means for controlling said first power transistor and said second power transistor so that the electrical power supplied to said first Docket and said second pocket is a function of the power dissipation of said power supply, wherein said controlling means includes a pulse width modulator (PWM), said PWM having means for receiving a predetermined input signal.

11. The battery charger as recited in claim 10, wherein said controlling means includes a transistor having base, collector and emitter terminals, a resistor and a capacitor, said resistor and capacitor defining an RC time constant.

12. The battery charger as recited in claim 10, wherein said predetermined input signal is a signal generated at predetermined time periods.

13. The battery charger as recited in claim 11, wherein said RC time constant is selected to be relatively larger than said predetermined time period.

14. A battery charger connected to a predetermined power supply for providing constant current and constant voltage charging, the battery charger comprising:

a power transistor connected between the power supply and a battery to be charged;

means for sensing the power dissipation of said power supply; and means for controlling said power transistor to provide constant current and constant voltage to said battery to be charged as a function of the power dissipation of said power supply.

15. A battery charger connected to a predetermined power supply for providing constant current and constant voltage charging, the battery charger comprising:

a power transistor connected between the power supply and a battery to be charged;

means for sensing the power dissipation of said power supply; and means for controlling said power transistor to provide constant current and constant voltage to said battery to be charged as a function of the power dissipation of said power supply, wherein said controlling means includes a pulse width modulator (PWM) and means for receiving a predetermined input signal.

16. The battery charger as recited in claim 15, wherein said controlling means includes a transistor having base, collector and emitter terminals, a resistor and a capacitor, said resistor and capacitor defining an RC time constant.

17. The battery charger as recited in claim 15, wherein said predetermined input signal is a signal generated at predetermined time periods.

18. The battery charger as recited in claim 16, wherein said RC time constant is selected to be relatively larger than said predetermined time period.

* * * * *

UNITED STATES PATENT AND TRADEMARK OFFICE
CERTIFICATE OF CORRECTION

PATENT NO. : 5,764,030
DATED : June 9, 1998
INVENTOR(S) : Gaza, Brian S.

It is certified that error appears in the above-identified patent and that said Letters Patent is hereby corrected as shown below:

Title Page, [54] Amend the title to "Microcontrolled Battery Charger Providing Constant Current or Contstant Voltage Charging"
Column 33, line 29, change "charred" to --charged--.
Column 34, line 17, change "pocket" to --pocket--.

Signed and Sealed this

Eighth Day of September, 1998

Attest:

Bruce Lehman

BRUCE LEHMAN

*Attesting Officer* *Commissioner of Patents and Trademarks*

UNITED STATES PATENT AND TRADEMARK OFFICE
CERTIFICATE OF CORRECTION

PATENT NO. : 5,764,030
DATED : June 9, 1998
INVENTOR(S) : Gaza

Figure 2C:
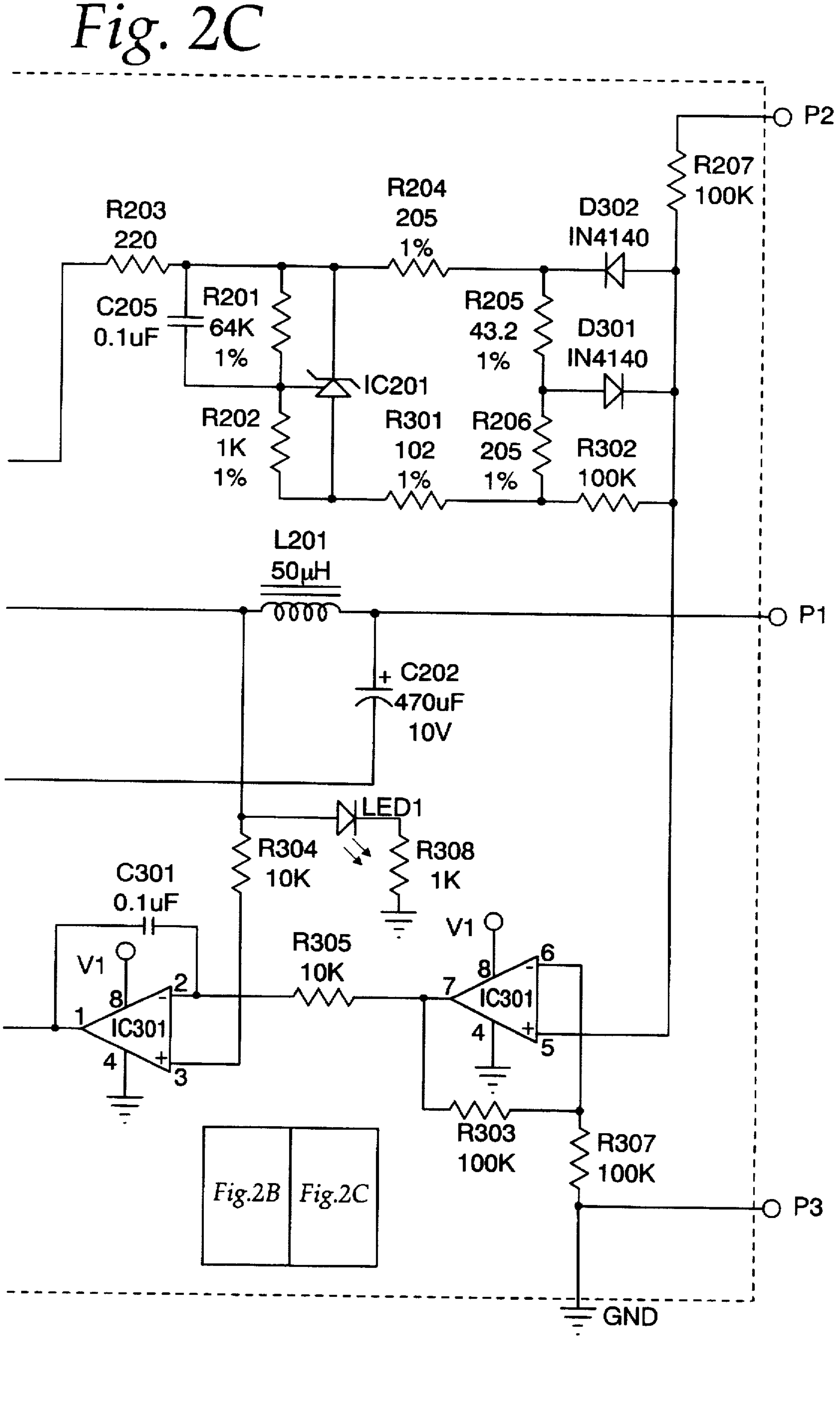

It is certified that error appears in the above-identified patent and that said Letters Patent is hereby corrected as shown below:

Column 2, line 56, change "FIG. 2 is" to – FIG. 2A is an output voltage characteristic curve for a DC-DC converter circuit wherein FIGS. 2B and 2C are --.

Column 3, line 56, change "FIG. 2" to – FIGS. 2B and 2C--.

Column 4, line 27, change "FIG. 2B" to – FIGS. 2B and 2C--.

Signed and Sealed this

Sixteenth Day of March, 1999

*Attest:*

Q. TODD DICKINSON

*Attesting Officer* *Acting Commissioner of Patents and Trademarks*